(12) United States Patent
Sato et al.

(10) Patent No.: US 11,843,809 B2
(45) Date of Patent: Dec. 12, 2023

(54) MOVIE DISTRIBUTION SYSTEM

(71) Applicant: Avex Technologies Inc., Tokyo (JP)

(72) Inventors: Yuki Sato, Tokyo (JP); Jun Kumano, Tokyo (JP)

(73) Assignee: AVEX TECHNOLOGIES INC., Tokyo (JP)

(*) Notice: Subject to any disclaimer, the term of this patent is extended or adjusted under 35 U.S.C. 154(b) by 0 days.

(21) Appl. No.: 17/419,646

(22) PCT Filed: Dec. 26, 2019

(86) PCT No.: PCT/JP2019/051327
§ 371 (c)(1),
(2) Date: Jun. 29, 2021

(87) PCT Pub. No.: WO2020/138375
PCT Pub. Date: Jul. 2, 2020

(65) Prior Publication Data
US 2022/0070508 A1 Mar. 3, 2022

(30) Foreign Application Priority Data

Dec. 29, 2018 (JP) .................................. 2018-248787
Dec. 29, 2018 (JP) .................................. 2018-248798
(Continued)

(51) Int. Cl.
*H04N 21/234* (2011.01)
*G06F 16/78* (2019.01)
(Continued)

(52) U.S. Cl.
CPC ... *H04N 21/23424* (2013.01); *G06F 16/7867* (2019.01); *H04N 21/23439* (2013.01); *H04N 21/258* (2013.01)

(58) Field of Classification Search
None
See application file for complete search history.

(56) References Cited

U.S. PATENT DOCUMENTS

| 4,107,735 A | * | 8/1978 | Frohbach | ............ | H04N 21/6582 |
| | | | | | 455/67.11 |
| 9,712,587 B1 | * | 7/2017 | Alfishawi | .............. | A61B 5/165 |

(Continued)

FOREIGN PATENT DOCUMENTS

| JP | 2014-82582 A | 5/2014 |
| JP | 6426258 B1 | 11/2018 |
| WO | 2016051620 A1 | 4/2016 |

OTHER PUBLICATIONS

International Search Report dated Mar. 24, 2020 for International Patent Application No. PCT/JP2019/051327.

*Primary Examiner* — James R Marandi

(57) ABSTRACT

[Technical Problem] To enable video delivery tailored to the viewer's response.
[Solution to Problem] The video delivery system includes a video library for storing a plurality of video data. The video distribution system further includes a video distributing unit for distributing the video data and a reaction acquiring unit for acquiring reaction information indicative of a reaction from a plurality of viewers during playback of at least a first video data. The video distribution system further includes a switch determining unit that determines a second video data to be distributed next to the first video data in response to the reaction information.

8 Claims, 66 Drawing Sheets

(30) Foreign Application Priority Data

| Dec. 29, 2018 | (JP) | ................................ | 2018-248800 |
| Jan. 25, 2019 | (JP) | ................................ | 2019-010752 |
| Jan. 25, 2019 | (JP) | ................................ | 2019-010753 |
| May 13, 2019 | (JP) | ................................ | 2019-091008 |
| May 13, 2019 | (JP) | ................................ | 2019-091010 |

(51) Int. Cl.
  *H04N 21/2343* (2011.01)
  *H04N 21/258* (2011.01)

(56) References Cited

U.S. PATENT DOCUMENTS

| 2002/0120925 A1* | 8/2002 | Logan | A61Q 19/00 |
| | | | 725/135 |
| 2003/0093790 A1* | 5/2003 | Logan | H04N 21/6125 |
| | | | 348/E7.071 |
| 2012/0150997 A1* | 6/2012 | McClements, IV | ........................ |
| | | | G06Q 10/101 |
| | | | 709/217 |
| 2016/0098759 A1* | 4/2016 | Lien | G06Q 30/0269 |
| | | | 705/14.64 |
| 2020/0112769 A1* | 4/2020 | Potluru | H04N 21/4826 |

* cited by examiner

Video Library

| Video ID |
|---|
| Video Data |
| ... |

FIG. 4

Condition Storage Unit

| Scenario ID |
|---|
| Determination Period |
| Condition |
| Next Video ID |

FIG. 6

Comment Storage Unit

| Comment ID |
|---|
| Viewer ID |
| Submit Datetime |
| Comment |
| ... |

FIG. 7

Material Library

| Material ID |
|---|
| Material Data |
| ... |

FIG. 13

Action Storage Unit

| Action ID |
|---|
| Determining Period |
| Condition |
| Action |

FIG. 14

Condition Storage Unit

| Playlist ID |
| --- |
| Determining Period |
| Condition |
| Next Music ID |

FIG. 22

Comment Storage Unit

| Comment ID |
| --- |
| Viewer ID |
| Post Datetime |
| Comment |
| ... |

FIG. 23

(a)
Count the number of music name

If "Fairy Empire" is most posted

If no comments on scheduled music name or the number of posts is less than a predetermined number (b)

(c)

Condition Storage Unit

| Scenario ID |
| --- |
| Determination Period |
| Condition |
| Next Video ID. |

FIG. 31

Comment Storage Unit

| Comment ID |
|---|
| Viewer ID |
| Post Datetime |
| Comment |
| Charged Amount |
| ... |

FIG. 32

Viewer Information Storage Unit

| Viewer ID |
| --- |
| Status Information |
| Total Amount of Charge |
| Item Name |
| Posted Comment History |
| ... |

FIG. 33

Material Library

| Material ID |
|---|
| Material Data |
| ... |

FIG. 40

Action Storage Unit

| Action ID |
|---|
| Determining Period |
| Condition |
| Action |

FIG. 41

MOVIE DISTRIBUTION SYSTEM

BACKGROUND ART

Video distribution systems are popular. There are two types of video distribution: streaming, in which a passive continuous video is played back, and on-demand, in which an active intended video is played back. In the on-demand method, the order of playback is set to the user (see, for example, PTL 1).

CITATION LIST

Patent Literature

[PTL 1] Japanese Patent No. 5350728 Specification

SUMMARY OF INVENTION

Technical Problem

However, in the case of streaming video distribution, in the case of live video, it is possible to change the development of the live video while watching the response of the viewer. However, when using recorded video, the development of the video is decisive and it is difficult to distribute the video according to the response of the viewer.

The present invention has been made in view of this background, and is intended to provide a technology capable of delivering video tailored to the response of the viewer.

Solution to Problem

The principal invention for solving the above-described problem includes a video distribution system, comprising, a video library for storing a plurality of video data, a video distributing unit tor distributing the video data, a reaction acquiring unit for acquiring reaction information indicating an reaction front a plurality of viewers during playback of the at least a first video data; and a switch decision unit tor determining the second video data tor next distributing the first video data in accordance with the reaction information.

The other problems disclosed in the present application and the method for solving them are clarified in the sections and drawings of the embodiments of the invention.

BRIEF DESCRIPTION OF DRAWINGS

FIG. 4 is a figure illustrating a structural example of a video library 331.

FIG. 6 is a figure illustrating an example of a configuration of a condition storage unit 333.

FIG. 7 is a figure illustrating an example of a configuration of a comment storage unit 334.

FIG. 13 is a figure illustrating a structural example of a material library 331.

FIG. 14 is a figure illustrating an example of a configuration of an action storage unit 333.

FIG. 22 is a figure illustrating an example of a configuration of a condition storage unit 333.

FIG. 23 is a figure illustrating an example of a configuration of a continent storage unit 334.

FIG. 31 is a figure illustrating an example of a configuration of a condition storage unit 333.

FIG. 32 is a figure illustrating an example of a configuration of a comment storage unit 334.

FIG. 33 is a figure illustrating an example of a configuration of a viewer information storage unit 335.

FIG. 40 shows a structural example of a material library 331.

FIG. 41 is a figure illustrating an example of a configuration of an action storage unit 333.

DESCRIPTION OF EMBODIMENTS

First Embodiment

The video distribution system according to the first embodiment can include the following configuration.

[Item 1]

A video distribution system comprising:
- a video library that stores multiple video data;
- a video distributing unit that distributes the video data;
- a reaction acquiring unit that acquires reaction information indicating a reaction from a plurality of viewers during the reproduction of at least a first video data; and
- a switch determining unit that determines the second video data to be distributed next to the first video data in accordance with the reaction information.

[Item 2]

The video distribution system according to Item 1, wherein
- the video distributing unit transmits the first video data to a video distribution server that distributes the video data to each of the viewer terminals of the viewers;
- the plurality of viewer terminals transmit comments input from the viewers to the video distribution server;
- the reaction acquiring unit acquires the comments from the video distribution server as the reaction information; and
- the switch determining unit determines the second video data according to the number of predetermined words included m the comment or the number of viewers who submitted the comment including the predetermined words.

[Item 3]

The video distribution system described in item 1, further comprising:
- a scenario storage unit that stores information representing next video data to be distributed for each of the video data;
- a condition storage unit that stoics information representing a condition for the reaction information and the next video data to be distributed,
- wherein
- the switch determining unit determines the animated data to be distributed next to the first animated data corresponding to the condition satisfying the reaction information when the condition satisfies the reaction information is present as the second animated data, and when the condition satisfying the reaction information is not present, determines the animated data to be distributed next to the first animated data from the scenario storage unit as the second animated data.

Hereinafter, a video distribution system according to the first embodiment will be described. The video distribution system according to the first embodiment is intended to dynamically chance the development (story) of the video in response to the reaction of the viewer to the streamed video. In the first embodiment, a reaction to a video is assumed to be a comment from a viewer submitted when viewing the video. That is the video to be played will change depending on the content of the comment submitted during playback of the video. For example, when two characters appear in a video, a story may be branched into a story with a character who a large number of comments were posted to as a main feature. Details will be described below.

Figure 1:
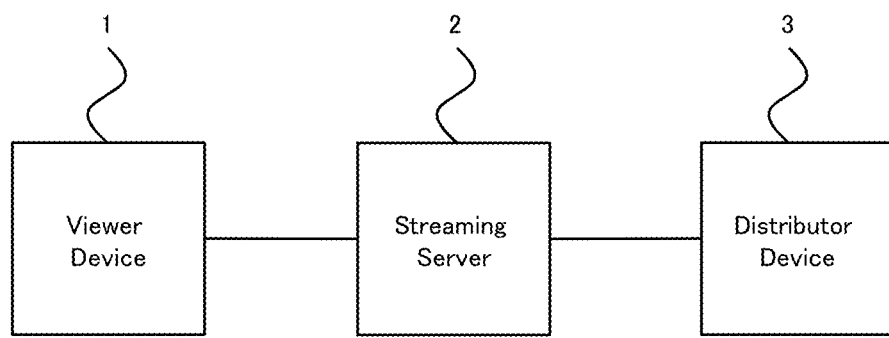
FIG. 1 is a figure illustrating an example of an overall configuration of a video distribution system according to the present embodiment.

FIG. 1 is a figure illustrating an example of the overall configuration of the video distribution system according to the first embodiment. The video distribution system of the first embodiment includes a distributor device 3, wherein the distributor device 2 is communicatively connected with the streaming server 2 and the streaming server 2 is communicatively connected with the viewer terminal. Distributor device 3 is a computer that transmits video, such as a personal computer, tablet computer, or smartphone. The distributor device 3 may be, for example, a home computer operated by a general user who wishes to distribute video. From the distributor device 3, video data is sent to the streaming server 2 by a streaming method. The streaming server 2 is a computer, such as a workstation, personal computer, or a virtual computer provided by cloud computing, that distributes video data received from the distributor device 3 to the viewer terminal 1. The streaming server 2 can distribute video data to a plurality of viewer terminals 1 at the same time. The viewer terminal 1 is a computer operated by a viewer, such as a personal computer, a tablet computer, or a smartphone. The viewer can access the streaming server 2 by operating the viewer terminal 1, and the viewer terminal 1 can receive and play back video data transmitted from the streaming server 2. The viewer may also operate the viewer terminal 1 to post comments on the video to the streaming server 2. The streaming server 2 sends comment data to the viewer terminal 1 in addition to the video data, and in addition to playing the video, a comment on the video is also displayed on the viewer terminal 1.

In the following explanation, the entire video that is streamed and played linearly is referred to as the "distribution video." Die distribution video may be a format in which images and sounds captured by a camera or a microphone are encoded into video data in real time and transmitted. However, in the first embodiment, a is assumed that the distribution video is prepared in advance as a part video data (hereinafter referred to as the "part video data"), and a scenario in which the part video data is arranged is prepared, and the part video data is transmitted in accordance with the scenario, so that the overall distribution video is transmitted.

Figure 2:
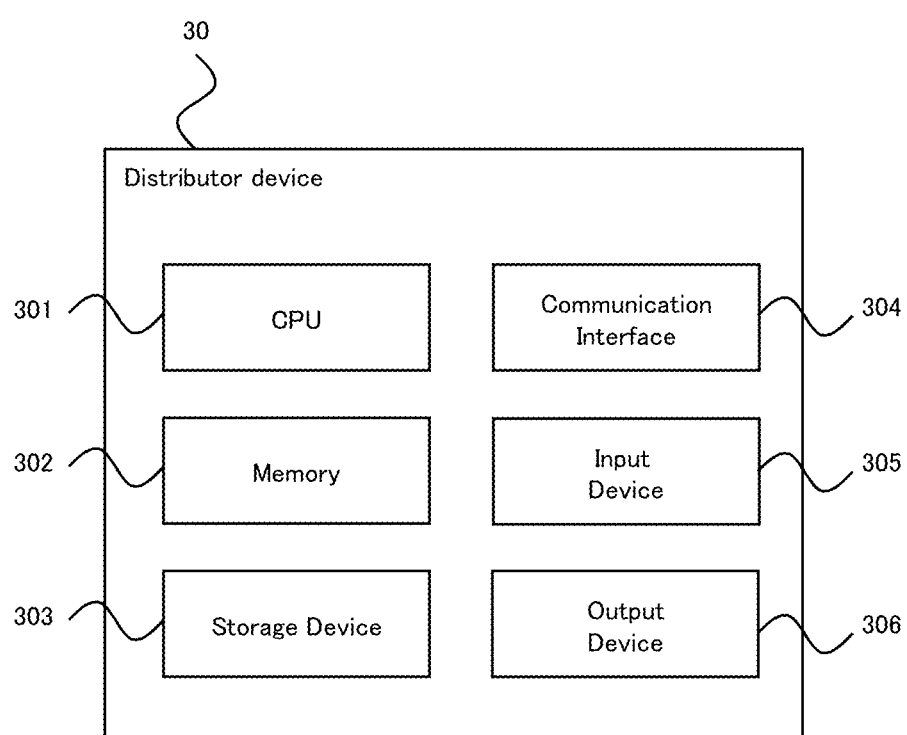
FIG. 2 is a figure illustrating an example of a hardware configuration of a distributor device 3.

FIG. 2 is a figure illustrating an example of a hardware configuration of the distributor device 3. The distributor device 3 includes a CPU 301, a memory 302, a storage device 303, a communication interface 304, an input device 305, and an output device 306. Storage device 303 may be, for example, a hard disk drive, a solid state drive, a flash memory, or the like, for storing various types of data or programs. The communication interface 304 is an interface for connecting to the communication network 30, such as an adapter for connecting to the Ethernet (registered trademark), a modem for connecting to a public telephone network, a wireless communication device for performing wireless communication, a USB (Universal Serial Bus) connector for serial communication, or an RS232C connector. The input device 305 may be, for example, a keyboard or mouse, a touch panel, a button, a microphone, or the like, for inputting data. Output device 306 may be, for example, a display, a printer, a speaker, or the like, which outputs data.

Figure 3:
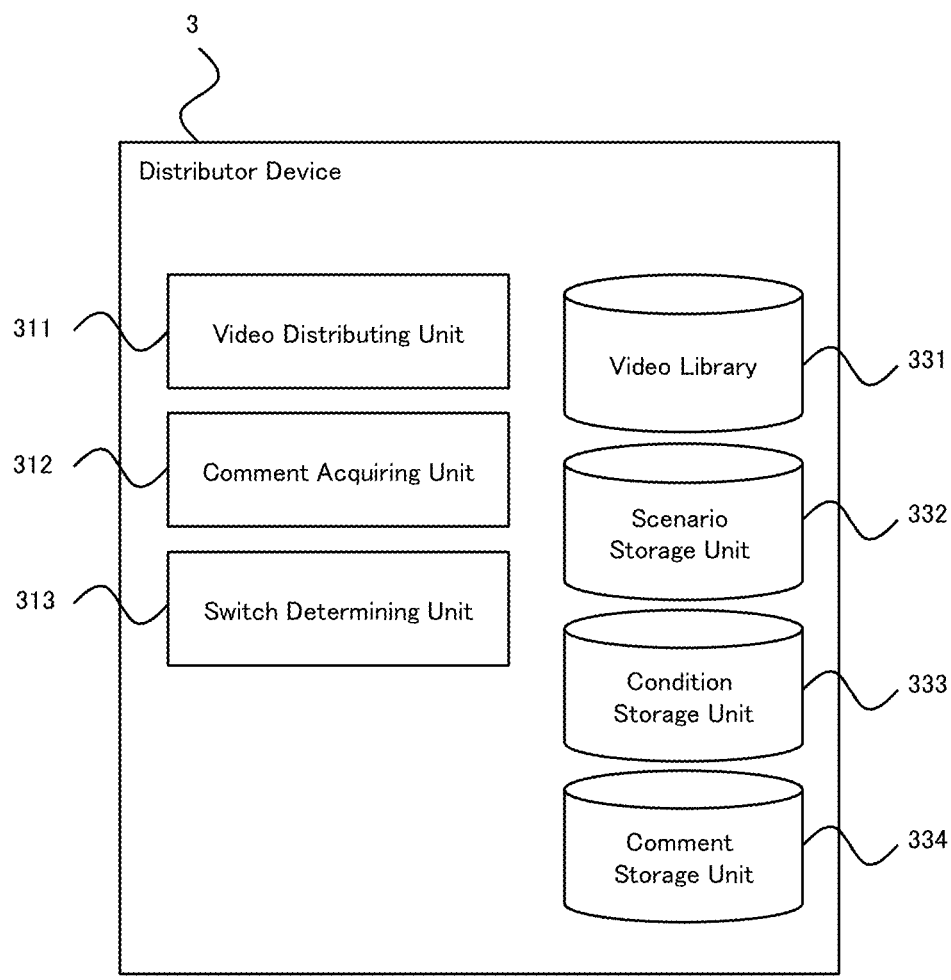
FIG. 3 is a figure illustrating an example of a software configuration of a distributor device 3.

FIG. 3 is a figure illustrating an example of a software configuration of a distributor device 3. As illustrated in the FIG. 2, the distributor device 3 includes a video distributing unit 311, a comment acquiring unit 312, a switch determining unit 313, a video library 331, a scenario storage unit 332, a condition storage unit 333, and a comment storage unit 334.

The video distributing unit 311, the comment acquiring unit 312, and the switch determining unit 313 are realized by reading and executing a program stored in the storage device 303 to the memory 302. The video library 331, the scenario storage unit 332, the condition storage unit 333, and the comment storage unit 334 are realized as part of a storage area provided by at least one of the memory 302 and the storage device 303 provided by the distributor device 3.

Figure 4:
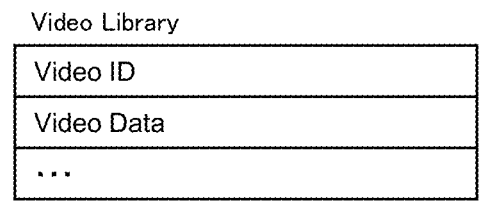

The video library 331 stores part video data. The part video data may be saved as files encoded in any form, such as MPEG4, MPEG2, AVI, MOV, and the like. FIG. 4 is a figure illustrating a structural example of the video library 331. As shown in the same figure, the video library 331 corresponds to information (video ID) for identifying the part video data and stores the part video data.

Figure 5:
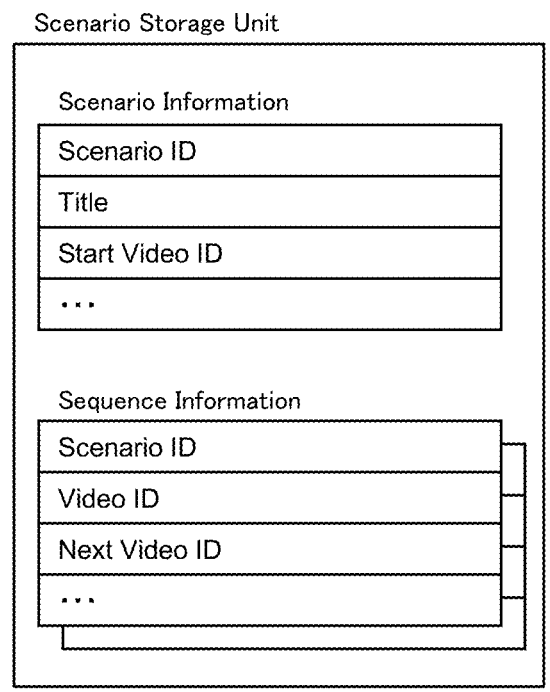
FIG. 5 is a figure illustrating an example of a configuration of a scenario storage unit 332.

The scenario storage unit 332 stores a scenario of the distribution video. FIG. 5 is a figure illustrating an example of a configuration of a scenario storage unit 332. As illustrated in the figure, the scenario storage unit 332 stores the scenario information and the sequence information. Scenario information is information about a scenario, and in the example of FIG. 5, for example, corresponding to information (scenario ID) identifying the scenario, the name of the scenario (title), information indicating the part video data to be played back at the begriming of the scenario (start video ID), and the like are included therein. The sequence information is information indicating the order in winch parts video is played by default in the scenario. The sequence information includes the scenario ID, a video ID representing the part video data included in the scenario indicated by the scenario ID, and the next video ID representing the part video data to lie played after the part video data indicated by the video ID. As described above, in the video distribution system of the first embodiment, the part video data to be played next according to the reaction (comment) of the viewer is changed. However, if the reaction (comment) of the viewer does not satisfy the predetermined condition, the component video data to be played next based on the sequence information is determined as the default scenario.

The condition storage unit 333 stores information (hereinafter referred to as the condition information) indicating the condition for performing a branching according to the reaction (comment) of the viewer. FIG. 6 is a figure illustrating an example of a configuration of a condition storage unit 333. An illustrated in the figure, the condition information stored in the condition storage unit 333 includes a scenario ID, a determination period, a condition, and a next video ID. Scenario ID is information indicating a scenario. The determining period is information indicating the period for determining whether the viewer's reaction (comment) meets the requirements. The determining period may be specified relative to, for example, five minutes before the current time or absolutely from 00:00 to 00:10 on December 25th. The delivery device 3 determines whether a viewer's reaction, i.e., a comment from a viewer submitted during the period specified by the determining period, matches the condition. The condition is for the viewer's reaction (comment posted by the viewer) on the basis of, for example, the number of comments submitted within the above-mentioned period, including predetermined keywords, the number of comments submitted by the viewer for each legion of the viewer who submitted comments or the number of viewers who submitted comments, for example, the aggregate amount (mean, median, maximum, minimum, etc.) submitted by the viewer to question the viewer's opinion on the amount in the video, the number of viewers who are pitied for the viewer's feelings as determined by the text analysis, etc., exceeds a predetermined threshold, and no comment containing a predetermined keyword has been submitted.

The video distributing unit 311 distributes video. By accepting a designation from a user, the video distributing unit 311 can retrieve the scenario information corresponding to the prespecified scenario from the scenario storage unit 332 and retrieve the part video data corresponding to the starting video ID included in the read scenario information from the video library 331 (encodes or converts the video format to be delivered as necessary), and transmit the read-out part video data to the streaming server 2. In this way, the video distributing unit 311 can transmit the video to the streaming server 2. The video distributing unit 311 acquires the next video ID corresponding to the scenario ID and the video ID representing the part video data from the sequence information of the scenario storage unit 332 when the read-out part video data is finished, reads the part video data corresponding to the next video ID from the video library 331, and transmits the same data to the streaming server 2. When the next video ID does not exist, the video distributing unit 311 may terminate the video distribution process. When the next video ID is determined by the switch determining unit 313 described later, the transmission of the currently executing part video data is interrupted, and the story can be changed by reading the pan video data corresponding to the next video ID determined by the switch determination unit 313 and sending it to the streaming server 2.

The comment storage unit 334 stores comments submitted by the viewer. FIG. 7 is a figure illustrating an example of a configuration of a comment storage unit 334. The continent storage unit 334 may correspond to the information (comment ID) that identifies the comment and store the viewer ID that indicates the viewer who submitted the comment, the date tune when the comment was submitted, the content of the comment, and the like.

The comment acquiring unit 312 acquires comments submitted by the viewer using the viewer terminal 1. Tot example, when the streaming server 2 provides an API for obtaining a submitted comment, the comment acquiring unit 312 may retrieve the submitted comment by calling the API. The comment acquiring unit 312 can register the acquired comment in the comment storage unit 334.

The switch determining unit 313 determines to switch the video. The switch determining unit 313 reads out a comment corresponding to the period from the comment storage unit 334 and aggregates each of the condition information stored m the condition storage unit 333 to determine whether or not the condition is satisfied. When the condition is satisfied, the switch determining unit 313 can transmit the part video data represented by the next video ID of the condition information to the video distributing unit 311.

Figure 8:
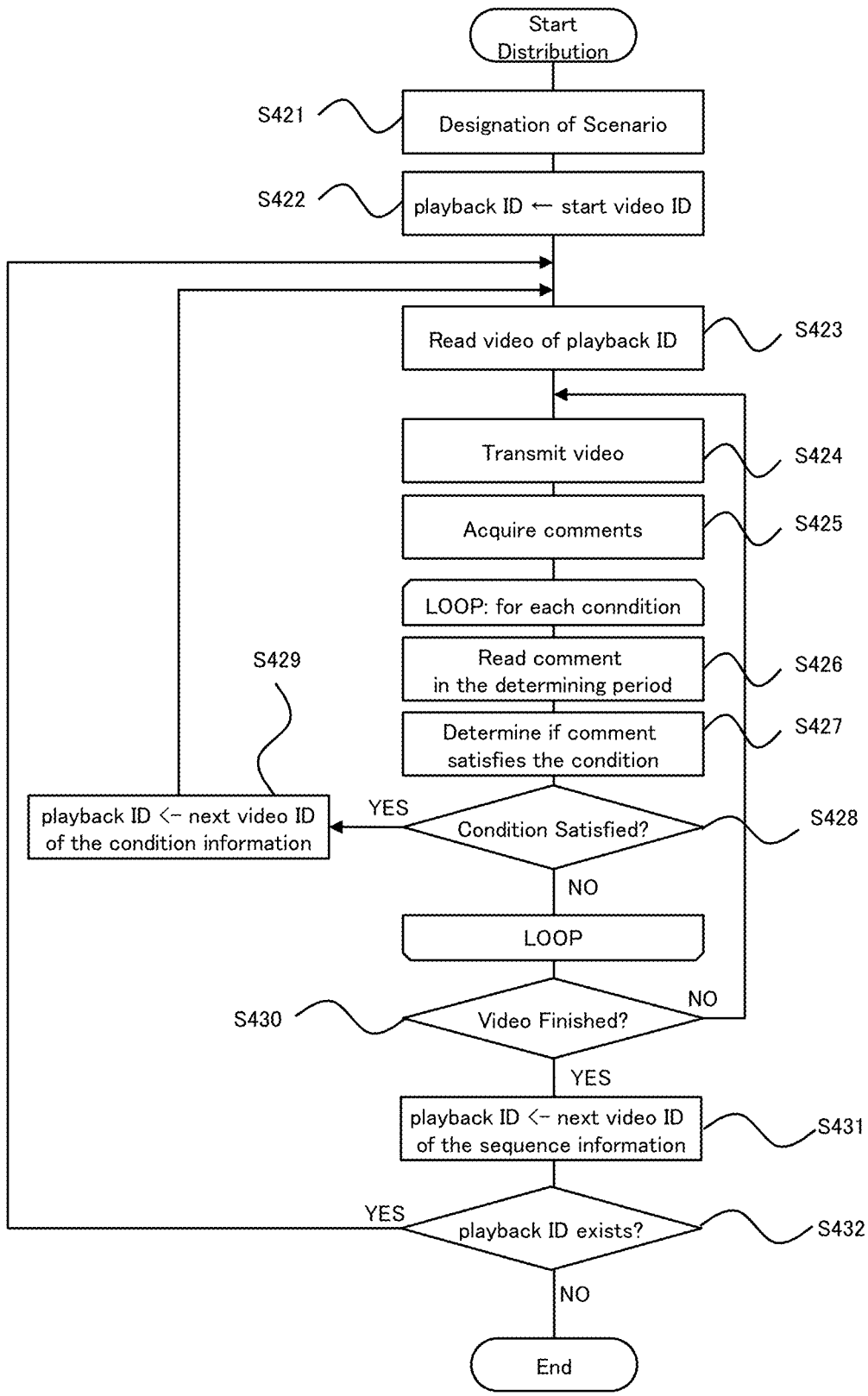
FIG. 8 is a figure illustrating a flow of processing executed by the video distribution system according to the present embodiment.

FIG. 8 is a figure illustrating a flow of processing performed by the video distribution system according to the first embodiment.

The video distributing unit 311 receives (lie designation of a scenario (S421) and assumes the playback ID as the starting video ID included in the scenario information of the specified scenario (S422). The video distributing unit 311 rends the part video data corresponding to the playback ID from the video library 331 (S423) and transmits the read part video to the streaming server 2 (S424). As a result, the streaming server 2 streams the video to each viewer terminal 1.

The comment acquiring unit 312 acquires comments submitted by the viewer using the viewer terminal 1 from the streaming server 2 (S425). The comment can be retrieved, for example, by invoking an API provided by the streaming server 2.

The switch determining unit 313 reads a comment submitted in the determining period from the comment storage unit 334 (S426) for each of the condition information stored in die condition storage unit 333, and determines whether or not the read comment satisfies the condition of the condition information (S427). Whether a comment meets a condition can be determined, for example, by counting the number included in the comment for each keyword and determining whether the number counted exceeds a predetermined threshold.

When the comment satisfies the condition (S428:YES), the switch determining unit 313 sets the next video ID included in the condition information to the playback ID (S429), returns to step S423, and the video distributing unit 311 transmits the part video data corresponding to the playback ID. As a result, the flow of the part video data can be changed according to the comments.

When the video being played finished (S430:YES), the switch determining unit 313 sets the next video ID of the sequence information to the playback ID (S431) when the comment does not satisfy the condition for all the condition information. When the video ID is set next to the sequence information (S432:YES), back to step S423, and the video distributing unit 311 transmits the part video data corresponding to the playback ID. If the next video ID is not set to sequence information (S432: NO), processing is terminated.

Figure 9:
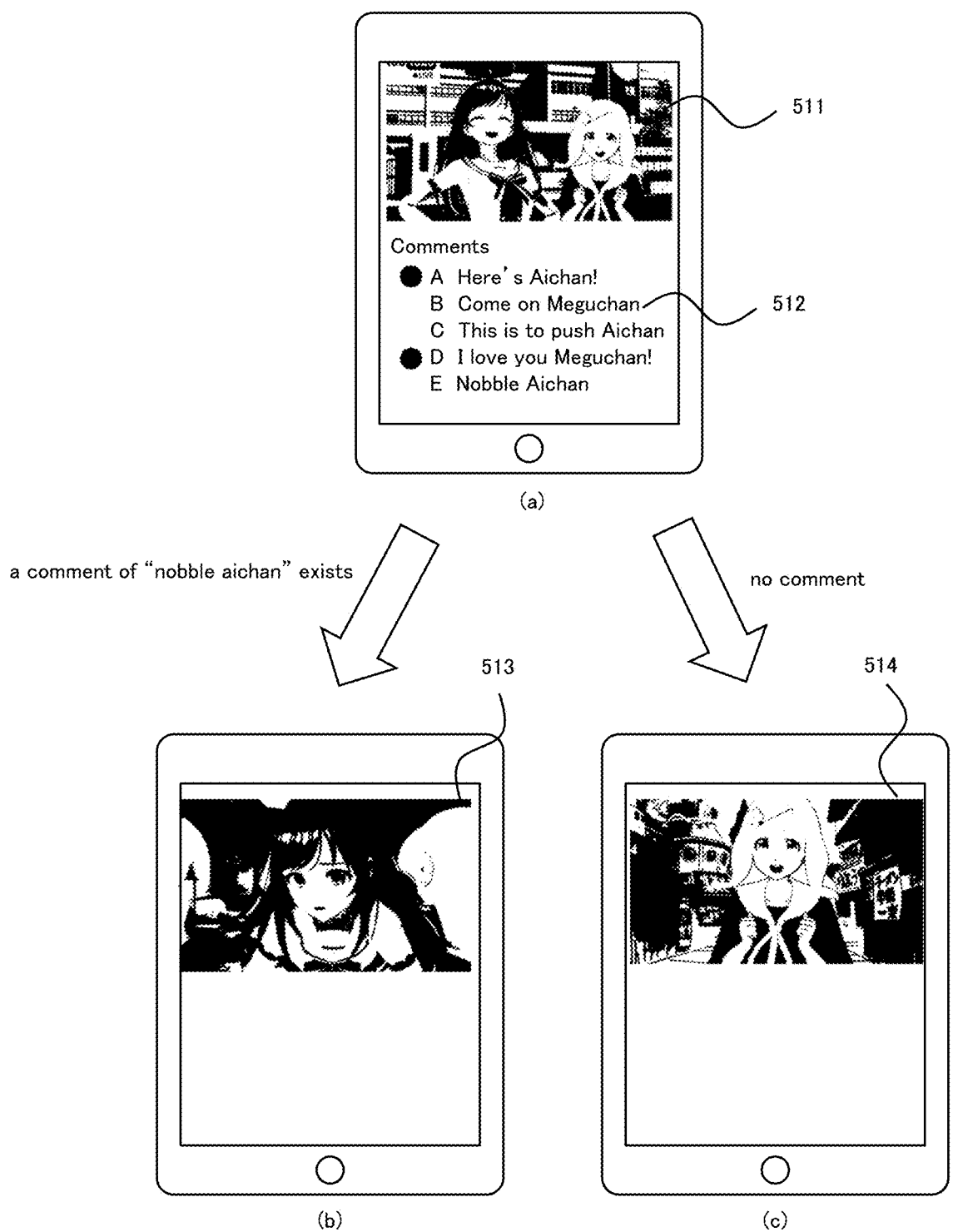
FIG. 9 is a figure illustrating an example of a screen displayed on a viewer terminal 1.

FIG. 9 is a figure illustrating an example of a screen displayed on the viewer terminal 1. As shown in FIG. 9(a), a video 511 is displayed based on the video data distributed from the streaming server 2, and a comment 512 submitted by a viewer operating the viewer terminal 1 or another viewer terminal 1 is displayed. In the example shown in FIG. 9(a), two characters (Aichan and Meguchan) are displayed. Comments 512, on the other hand, include comments such as "Here's Aichan" and "Come on, Meguchan".

Here, when the conditional storage unit 333 includes information including the condition that the phrase "nonbble aichain", this phrase is posted in the example shown in FIG. 9(a), so that the video 513 as shown in FIG. 9(b) is displayed. On the other hand, when the above phrase is not registered in the comment, the video 514 as shown in FIG. 9(c) is displayed as the next video ID of the sequence information.

As described above, the video distribution system according to the first embodiment can distribute the linear video to the viewer terminal 1 via the streaming server 2 by continuously transmitting the component video data, and at the same time, in response to a comment from a viewer during the playback of the component video data, it is possible to determine the part video data to be played back next to the part video data being played. Thus, a linear video of different deployments can be provided depending on the viewer's reaction. Accordingly, it is possible to distribute videos without compromising the live feeling of the video distribution method in a streaming formal, even though the recorded pan video data is used.

Although the first embodiment has been described above, the above-described embodiments are intended to facilitate the understanding of the present invention and are not intended to be a hunting interpretation of the present invention. The present invention may be modified and improved without departing from the spirit thereof, and the present invention also includes its equivalent.

For example, in the present embodiment, it is assumed that the video transmitted from the distributor device 3 is distributed to the viewer terminal 1 via the streaming server 2, but it is also possible to distribute the video directly from the distributor device 3 to each viewer terminal 1.

In the present exemplary embodiment, the video file encoded in a formal such as MPEG4 is stored in the video library 331. However, the 3D model or scene file may be stored in the video library 331 and a dynamically rendered video may be transmitted based on the 3D model or scene file.

In the present embodiment, even while the part video data is being played, if the comment satisfies the condition, the next part video data is set (Step S428→S429→S423 in FIG. 8). However, the part video data may be played to the end and then transferred to the next part video data. In this case, step S429 of FIG. 8 may be preceded or followed by steps to confirm that the playback of the part video data has been completed.

In the present embodiment, the part video data is switched according to the comments (or keywords included in the comments) submitted by the viewer. However, the switch can be performed according to the reaction of any viewer that can be obtained from the viewer terminal 1. For example, the comment acquiring unit 312 acquires as an event that a predetermined area on the distribution video is clicked or tapped in the viewer terminal 1, and the switch determining unit 313 counts the number in which this event occurred (i.e., the number of viewers who clicked or tapped a predetermined area on the distribution video), and can switch the component video data depending on whether or not this number exceeds the threshold value. In this case, a video ID indicating the threshold value for the manlier of viewers clicked or tapped in a predetermined area on the distribution video image and the part video data to be switched according to the area may be registered as the condition information. When the distribution video is viewed in the web browser at the viewer terminal 1, the comment acquiring unit 312 may acquire the click event directly or via the streaming server 2 by transmitting the click event generated in the web browser to the streaming server 2 or the distributor device 3, and the click event may be stored in the comment storage unit 334. In this case, the comment acquiring unit 312 functions not only as a comment but also as an event acquiring unit for acquiring various events, and the comment storage unit 334 functions as an event storage unit for storing not only comments but also various events.

Further, the event acquiring unit acquires as an event the event that, for example, the viewer terminal 1 receives the captured voice data, analyzes the received voice data, and has a specific pronunciation (for example, a viewer has made a specific keyword, a clap, a whistle, a step, etc.) and the switch determining unit 313 can switch the video according to this event. In this case, on the condition that a specific pronunciation occurred, the condition information setting the next video ID different for each type of pronunciation may be registered in the condition storage unit 333. The audio analysis may be performed by the viewer terminal 1, and the event acquiring unit may receive the analysis result.

For example, the event acquiring unit receives the image data captured by the viewer terminal 1, analyzes the received image data, recognizes the viewer's attitude, gaze, gesture, and the like, acquires these occurrences as events, and the swatch determining unit 313 can switch the video according to this event. In this case, on the condition that a particular attitude, eye, or gesture is present, the condition information that sets the next video ID differently for the type of attitude, gesture, and the area on the video indicated by the destination of the eye may be registered in the condition storage unit 333. In addition, the event acquiring unit may receive the analysis result by performing the image analysis at the viewer terminal 1.

In addition, the event acquiring unit can acquire events that can be retrieved on the system, not events that occur in the viewer terminal 1, for example. The event that can be retrieved on live system may include, for example, the elapsed time from the start of delivery of the delivered image, the current time, the occurrence of an object collision on the delivered video, the location of the viewer or the distributor, or the occurrence of specific weather conditions in u predetermined area. The switch determining unit 313 can also switch videos in response to such event.

Second Embodiment

The video distribution system according to the second embodiment includes the following configuration.

[Item 1]
A video distribution system comprising:
  a material library that stores asset data for generating video;
  a video distributing unit that transmits the video based on the material data;
  a reaction acquiring unit that acquires reaction information indicating a reaction from a viewer of the video during a playback of the video; and
  an action processing unit that executes an operation on the asset data according to the reaction information.

[Item 2]
The video distribution system described in Item 1, wherein:
  the reaction acquiring unit acquires an event that occurs in the video distribution system;
  the action processing unit executes the operation on the asset data in response to the event.

[Item 3]
The video distribution system described in Item 1, wherein:
  the reaction from the viewer includes at least one of manipulation of a device by the viewer; audio and text input from the viewer; an image in which tire viewer is captured; at least one of an attitude, a gaze and gesture of the viewer analyzed from the image; and measured data of the viewer's physical reaction.

[Item 4]
The video distribution system described in Item 1, wherein:
  the action includes at least any of appearance, movement and disappearance of an object, start and stop of an animation, playing and stopping a video, playing and stopping audio, and changing the material data.

Hereinafter, a video distribution system according to the second embodiment will be described. The video distribution system according to the second embodiment dynamically changes the streamed video according to various, events.

The event include information obtained with respect to a viewer thereinafter referred to as user event information) such as that the device was operated by the viewer, audio ox text was entered by the viewer, the viewer was taken, the viewer's attitude, line of view, gestures, etc. were obtained from the analyzed image, and the measurement data that measured the viewer's physical reaction was obtained. The event may also include information that can be obtained by the system side, such as the number of viewers viewed, weather, time, weather, or the contact of an object in a video (hereinafter referred to as system event information).

The video to be delivered is generated based on material data such as 3D model, video data, and audio data. Event-specific actions can be set for each asset data.

The action is an operation on the asset data and can include the appearance, movement and disappearance of objects represented by the 3D model, initiation and termination of animation operations, playing and stopping video, playing and stopping audio, changing (replacing) asset data, and the like. In a second embodiment, the video to be delivered is created by combining images or images output as a result of the action.

In the video distribution system according to the second embodiment, an action can be activated in response to an event to dynamically change the distribution video. Details will be described below.

Figure 10:
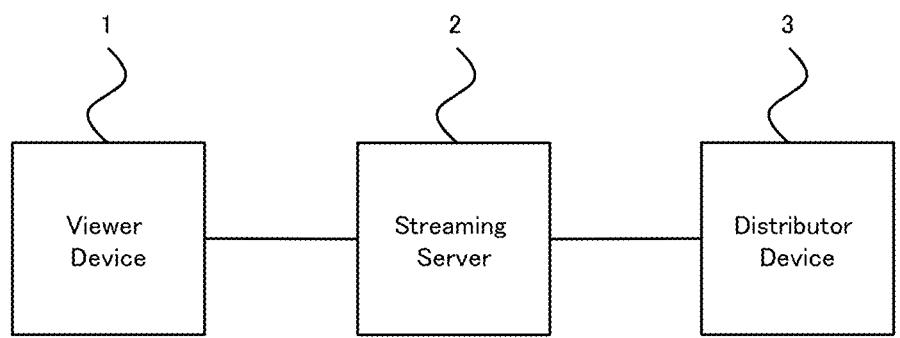
FIG. 10 is a figure illustrating an example of an overall configuration of a video distribution system according to the present embodiment.

FIG. 10 is a figure illustrating an example of the overall configuration of the video distribution system according to the second embodiment. The video distribution system of the second embodiment includes a distributor device 3, wherein the distributor device 2 is communicatively connected with the streaming server 2 and the streaming server 2 is communicatively connected with the viewer terminal 1. A large number of viewer terminals 1 may be connected. The distributor device 3 is a computer that transmits video, such as a personal computer, tablet computer, or smartphone. The distributor device 3 may be, for example, a home computer operated by a general user who wishes to distribute video. From the distributor device 3, video data is sent to the streaming server 2 by a streaming method. The streaming server 2 is a computer, such as a workstation, personal computer, or a virtual computer provided by cloud computing, that distributes video data received front the distributor device 3 to the viewer terminal 1. The streaming server 2 can deliver video data to one or more viewer terminals 1 at the same time. The viewer terminal 1 is a computer operated by a viewer, such as a personal computer, a tablet computer, or a smartphone. The viewer can access the streaming server 2 by operating the viewer terminal 1, and the viewer terminal 1 can receive and play back video data transmitted from the streaming server 2. In addition, the viewer terminal 1 is capable of collecting various event information by taking pictures of the viewer, recording the audio of the viewer, and receiving comments from the viewer. Events from one or more viewers are collected at the streaming server 2, and the distributor device 3 may retrieve events from the viewer, for example, by calling an API (Application Programming Interface) provided by the streaming server 2.

In the following explanation, the entire video that is streamed and played linearly is referred to as the "distribution video." The distribution video may be a format in which images and sounds captured by a camera or a microphone are encoded into video data in real time and transmitted. However, in the second embodiment, it is assumed that the distribution video is generated as video data combined with the material data.

Figure 11:
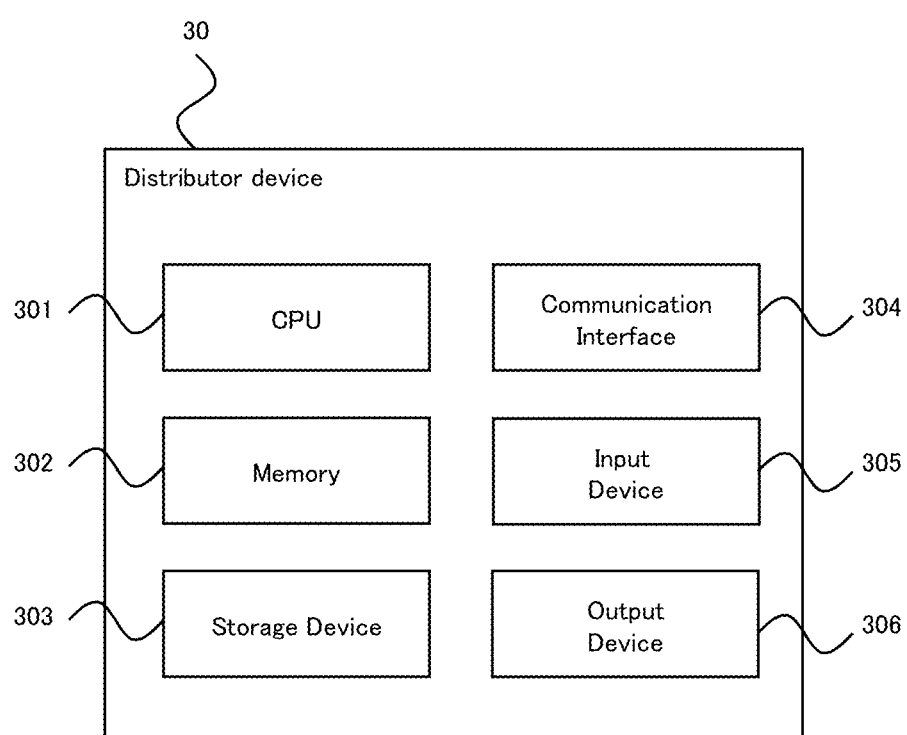
FIG. 11 is a figure illustrating an example of a hardware configuration of a distributor device 3.

FIG. 11 is a figure illustrating an example of a hardware configuration of the distributor device 3. The distributor device 3 includes a CPU 301, a memory 302, a storage device 303, a communication interface 304, an input device 305, and an output device 306. Storage device 303 may be, for example, a hard disk drive, a solid state drive, a flash memory, or the like, for storing various types of data or programs. The communication interface 304 is an interface for connecting to the communication network 30, such as an adapter for connecting to an Ethernet (registered trademark), a modem for connecting to a public telephone network, a wireless communication device for performing wireless communication, a USB (Universal Serial Bus) connector for serial communication, or an RS232C connector. The input device 305 may be, for example, a keyboard or mouse, a touch panel, a button, a microphone, or the like, for inputting data. The output device 306 may be, for example, a display, a printer, a speaker, or the like, which outputs data.

Figure 12:
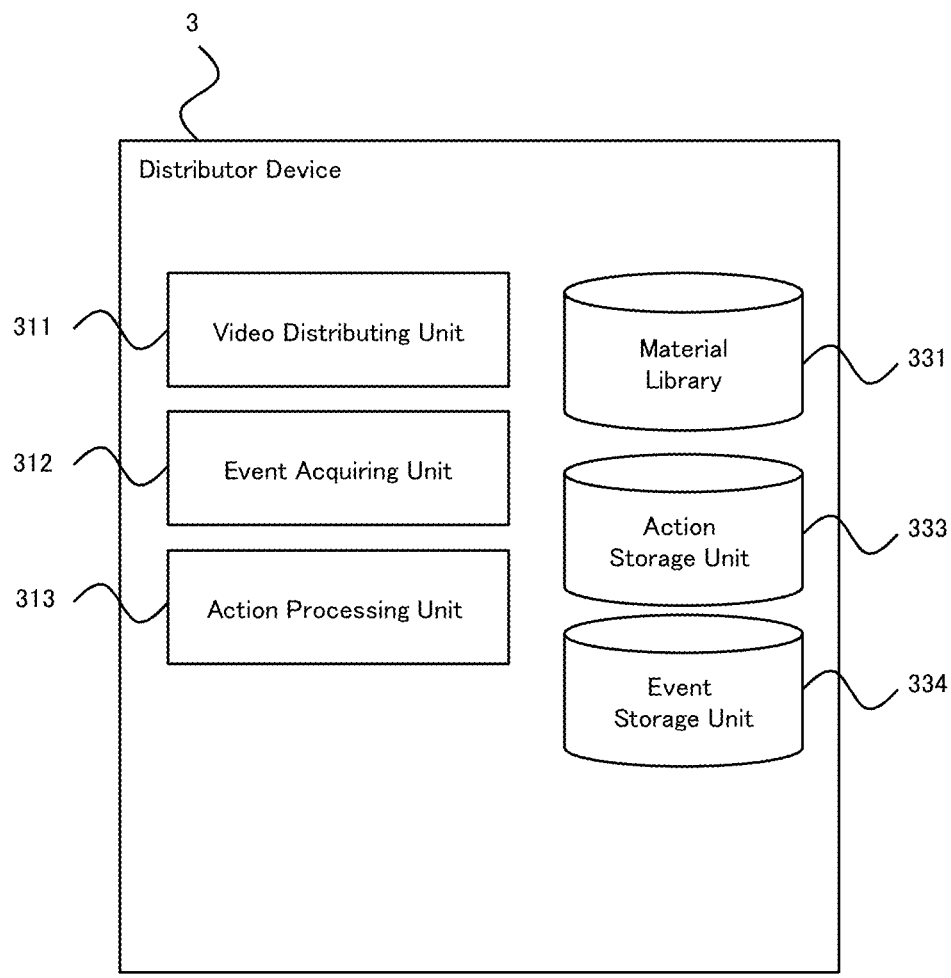
FIG. 12 is a figure illustrating an example of a software configuration of a distributor device 3.

FIG. 12 is a figure illustrating an example of a software configuration of a distributor device 3. As illustrated in the figure, the distributor device 3 includes a video distributing unit 311, an event acquiring unit 312, an action processing unit 313, a material library 331, an action storage unit 333, and an event storage unit 334.

The video distributing unit 311, the event acquiring unit 312, and the action processing unit 313 are realized by CPU 301 reading a program stored in the storage device 303 to the memory 302 and executing. The material library 331, the action storage unit 333, and the event storage unit 334 are realized as part of a storage area provided by at least one of the memory 302 and the storage device 303 provided by the distributor device 3.

The material library 331 stores various types of data (asset data) that can be incorporated into the video. The material data may be, for example, a 3D model, a still image, a moving image, voice data, MIDI data, character data, and the like. FIG. 13 is a figure illustrating a structural example of a material library 331. As shown in the figure, the material library 331 corresponds to information (material ID) for identifying the material data and stores various types of material data.

The action storage unit 333 stores information (hereinafter referred to as the action information) concerning the operation (action) on the material data. FIG. 14 is a figure illustrating an example of an action information stored in an action storage unit 333. As shown in the figure, the action information includes an action ID indicating the action, a determining period, a condition, and an action.

The determining period is an information indicating the period of time for determining whether an event meets the conditions. The determining period may be specified relative to, for example, five minutes before the current time or absolutely from 00:00 to 00:10 on December 25th.

The condition may be for an event, e.g., the presence or absence of an event, or the aggregation of events from multiple viewers may or may not exceed the threshold.

For user event information, tor example, a condition may be whether the viewer pressed a predetermined key during playback of the distribution video, clicked or tapped a predetermined area on the video, or whether the number of viewers clicked or tapped a predetermined area on the video exceeded the threshold value. Based on the material data used to generate the delivered video, it may also be conditional on whether an object displayed during the delivered video is clicked or tapped, and whether the number of viewers clicked or tapped on the object exceeds the threshold.

In addition, the condition may be whether the viewer terminal 1 has entered a predetermined character (keyword) from the viewer, for example, whether the comment submitted to the distribution video contains a predetermined keyword, or whether the number of viewers who entered the keyword exceeds the threshold value. It may also be conditional on the number of comments or viewers who submitted comments by region, e.g., the aggregate amount (mean, median, maximum, minimum, etc.) submitted by the viewer in response to the viewer's inquire about the amount in the video, the number of viewers who are sad based on the feelings of the viewer as determined by the text analysis, etc., exceeding a predetermined threshold, or the viewer has never submitted comments containing a predetermined keyword.

Alternatively, the speech recognition may be performed on the viewer's or viewer's atmosphere, for example, whether or not a particular speech has been made, whether or not a clap, whistle, footsteps, or the like has been made, whether or not a particular speech has been made, and whether or not the number of viewers with such a particular speech has exceeded the threshold. In this case, the speech recognition processing may be performed by the viewer terminal 1 and the recognition result may be transmitted to the streaming server 2 or the distributor device 3, or the audio data captured from the viewer terminal 1 may be transmitted from the viewer terminal 1 via the streaming server 2 or directly to the distributor device 3 and the voice recognition processing may be performed at the distributor device 3.

It is also possible to determine whether a viewer has taken an image or an atmosphere of a viewer at the viewer terminal 1, whether such an image has been posted to the streaming server 2, and whether the number of viewers who submitted the image exceeds the threshold. Image analysis can also be used to determine whether an image (e.g., a particular signboard or liver photographed around a viewer) has been posted or whether the number of viewers who submitted such an image exceeds the threshold. In addition, image analysis can be used to recognize the attitude, gaze, gesture, etc. of the viewer and to determine whether or not the viewer has performed the predetermined posture, gaze, or gesture, whether or not the predetermined posture or gaze, and whether or not the number of viewers who have made the gesture exceeds the threshold. In this case, the image analysts processing may be performed by the viewer terminal 1 and the analysis result is transmitted to the streaming server 2 or the distributor device 3, or tire image data captured from the viewer terminal 1 may be transmitted to the distributor device 3 via the streaming server 2 or directly to the distributor device 3 and image analysis processing may be performed in the distributor device 3.

For system event information, for example, the number of viewers viewing the delivered image may be conditional on whether tire number of viewers exceeds tire threshold, it is also possible to make it a condition that a predetermined time has elapsed from the playback of the distributed image. In addition, when the weather in the location of the viewer or the distributor or in a given area is obtained as system event information, tire conditions may be such as whether the weather is a predetermined weather (e.g., clear, rain, snow, wind of a strength greater than a predetermined temperature, etc.). In addition, when the material data is a 3D model or the like, the condition may be that the object collided in the delivered video.

The action is a variety of operations on tire asset data, as described above. Tire action can also contain parameters and can be set in detail what specific operations are to be performed on the asset data. In a second embodiment, the action may include processing such as executing or stopping other actions, waiting for other actions to be completed, as well as manipulating the asset data. Actions can also be stored, for example, as programs written in scripting languages.

The video distributing unit 311 distributes video. Multiple actions may be taken from an action. The video distribution unit 311 can overlay the output from the action performed by the action processing unit 313, which will be described later (encoded as needed), and generate the distribution video. Further, the video distributing unit 311 can distribute the video to the viewer terminal 1 by transmitting the generated distribution video to the streaming server 2.

Figure 15:
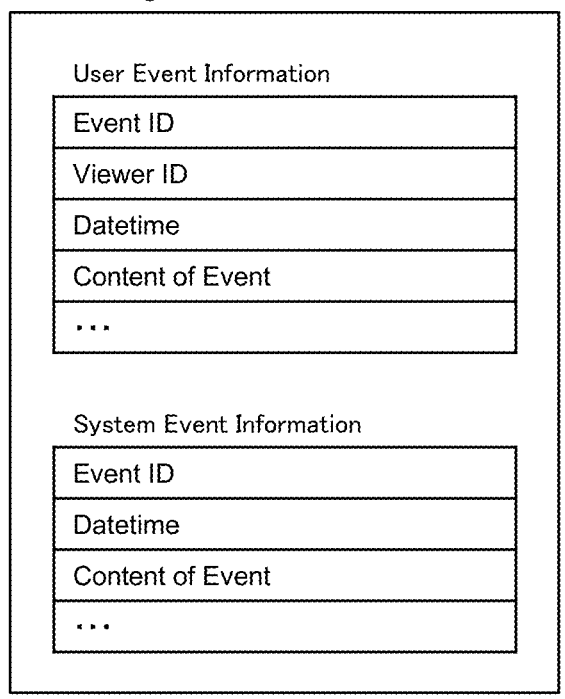
FIG. 15 is a figure illustrating an example of a configuration of an event storage unit 334.

The event storage unit 334 stores various events that have occurred. FIG. 15 is a figure illustrating an example of a configuration of an event storage unit 334. As described above, the event storage unit 334 stores the user event information and the system event information. Hereinafter, user event information and system event information are collectively referred to as event information. User event information includes the event ID representing the event, the viewer ID representing the viewer of the event, the date and time the event occurred, and the content of the event. The system event information includes the event ID, the date and time the event occurred, and the content of the event. The content of an event depends on the event, for example, in the case of user event information, when a viewer submits a comment to a distribution video, the submitted comment may be set as event content. In addition, when the viewer terminal 1 analyzes the image captured by the viewer and obtains the gaze or gesture of the viewer, information indicating these gazes or gestures can be set as the content of the event. For system event information, the number of viewers, weather, time, etc. can be set as event content.

The event acquiring unit 312 acquires an event and registers the content of the acquired event as event information in the event storage unit 334. The event acquiring unit 312 acquires what events can be set by the user. Setting information indicating what event to acquire may be stored, for example, in memory 302 or storage device 303.

For example, the event acquiring unit 312 can register events such as keys, taps, and clicks entered by a viewer as user event information. For example, when a distribution video is viewed in a web browser a script is set such that a click event generated on the web browser is transmitted to the streaming server 2 or the distributor device 3, and the event acquiring unit 312 can acquire a click event via the streaming server 2 or directly. If, for example, the streaming server 2 provides an API for obtaining a submitted comment, the event acquiring unit 312 may retrieve the submitted comment by the viewer by calling the API. In addition, the event acquiring unit 312 may parse the comments and register that a predetermined keyword is included as the user event information.

The event acquiring unit 312 may, for example, receive the voice data captured from the viewer terminal 1, analyze the received voice data, and register that a specific pronunciation occurred as the user event information. The event acquiring unit 312 may receive the analysis result directly from the viewer terminal 1 or through the streaming server 2 and register the analysis result as the user event information in such a way that the voice analysis processing is performed by the viewer terminal 1. In addition, the event acquiring unit 312 may receive an image captured by a viewer from the viewer terminal 1, analyze the received image, and acquire the viewer's attitude, gaze, gesture, or the like. Alternatively, the image can be analyzed at the viewer terminal 1 to receive the results. The event acquiring unit 312 may register tire number of viewers in the system event information by periodically counting the number of viewers. The event acquiring unit 312 may receive the analysis result directly from the viewer terminal 1 or through the streaming server 2 and register rite analysis result as the user event information in such a way that the image analysis process is performed by the viewer terminal 1.

For example, the event acquiring unit 312 can register as system event information that a predetermined time has elapsed since the start of playback of the distributed image by acquiring a time-out event from a clock. The event acquiring unit 312 can also register a predetermined time (e.g., a date has changed, a date has reached 3:00 p.m.) as system event information.

The event acquiring unit 312 may, for example, acquire weather information from a server of a weather company and register weather elements in a specific region (e.g., the location of each viewer or the location of a distributor, or a predetermined region) as system event information.

For example, when the material data is a 3D model or the like, the event acquiring unit 312 can determine that an object has collided in the distribution video and register it as system event information.

The action processing unit 313 performs an action on the material data. The action processing unit 313 receives the designation of the first action to be executed and executes the received action. In this case, the action processing unit 313 can continue to start the action sequentially because some of the actions may include the activation of other actions. It should be noted that the action can be executed in parallel by branching multiple limes.

The action processing unit 313 also executes an action corresponding to an event. The action processing unit 313 reads out and aggregates event information corresponding to the period from tire event storage unit 334 with respect to each of the action information stored in the action storage unit 333, determines whether or not the condition is satisfied, and executes an action set to the action information when the condition is satisfied. This makes it possible to dynamically change the branch of the video according to the event.

Figure 16:
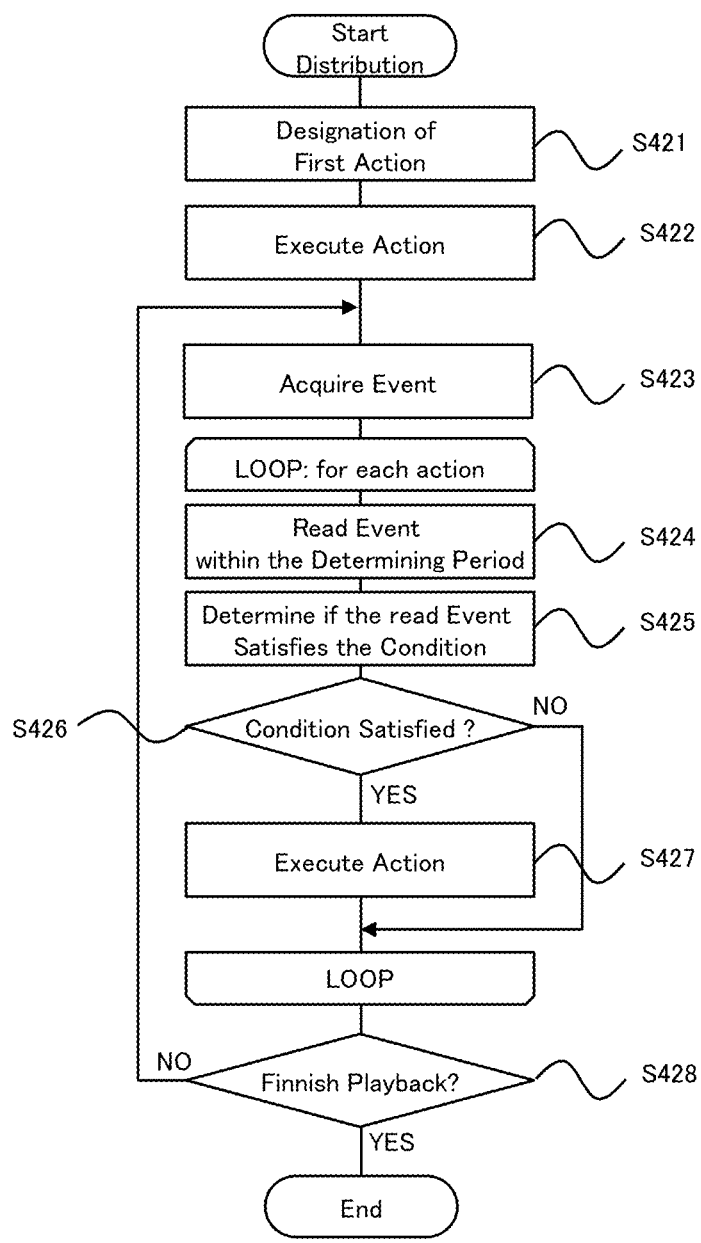
FIG. 16 is a figure illustrating a flow of processing executed by the video distribution system according to the present embodiment.

FIG. 16 is a figure illustrating a flow of processing executed by the video distribution system according to the second embodiment.

The action processing unit 313 accepts the designation of the first action to be executed (S421) and executes the specified action (S422). The video and audio output as a result of the action being executed are overlaid and transmitted to the streaming server 2 by the video distributing unit 311 as video data.

The event acquiring unit 312 acquires an event periodically (S423). For example, by invoking the API provided by the streaming saver 2, the event acquiring unit 312 can obtain a comment submitted to the distribution video. The event acquiring unit 312 can acquire that a predetermined time has elapsed using a timer function.

With regard to each action information stored in the action storage unit 333, the action processing unit 313 reads event information of the datetime within the determining period from the event storage unit 334 (S424) and determines whether the event content of the read event information satisfies the condition of the action information (S425). When the event satisfies the condition (S426:YES), the action processing unit 313 executes the action included in the action information (S427). Here, the action processing unit 313 may stop the previously executed action, execute a new action in parallel with the previously executed action, or specify this behavior in the new action.

If the action information action does not terminate the distribution video (S428), the process from Step S423 is repeated.

As described above, the video distribution system according to the second embodiment can distribute the distribution video to the viewer terminal 1 via the streaming server 2, and change the distribution video during playback according to various events during playback of the distribution video. Accordingly, it is possible to add various brandies to the distribution video in response to the reaction of the viewer while using the recorded video, and it is possible to distribute the video without compromising the live feeling of the video by the method of distributing the video in a streaming format.

Although the above-described second embodiment has been described, the above-described embodiment is intended to facilitate the understanding of the present invention and is not intended to be a limiting interpretation of the present invention. The present invention may be modified and improved without departing from the spirit thereof, and the present invention also includes its equivalent.

For example, in the present embodiment, it is assumed that the video transmitted from the distributor device 3 is distributed to the viewer terminal 1 via the streaming server 2, but it is also possible to distribute the video directly from the distributor device 3 to each viewer terminal 1.

Further, in the present embodiment, even while the video is being played, if the comment satisfies the condition, it is set to transition to the next part video data (step S427 of FIG. 16). However, the current action may be executed until the end, and then the next action may be executed.

Third Embodiment

The music distribution system according to the third embodiment includes the following configuration.

[Item 1]

A music distribution system comprising:
  a music library that stores multiple music data;
  a music distributing unit that distributes the music data;
  a reaction acquiring unit that acquires reaction information indicating a reaction from each of a plurality of viewers during the reproduction of at least a first music data, and
  a switch determining unit that determines a second music data to be distributed next to the first music data in response to the reaction information

[Item 2]

The music distribution system described in Item 1, wherein
  the music distributing unit transmits the first music data to a distribution server that distributes the music data to the viewer terminal of the viewer;
  a plurality of the viewer terminals transmit comments input from the viewer to the distribution server;
  the reaction acquiring unit acquires the comments from the distribution server as the reaction information; and
  the switch determining unit determines the second music data according to the number of predetermined word included in the comments.

[Item 3]

The music distribution system described in Item 1, further comprising:
  a scenario storage unit that stores information representing the next music data for each music data; and
  a condition storage unit that stores information representing a condition foe the reaction information and the music data to be distributed next,
wherein
  the switch determining unit determines the musk data to be distributed next to the first music data corresponding to the condition satisfying the reaction information as the second music data when the condition satisfying the reaction information is present, and, determines the musk data to be distributed next to the first music data from the scenario storage unit as the second music data when the condition satisfying the reaction information is not present.

Hereinafter, a music distribution system according to the third embodiment will be described. The music distribution system according to the third embodiment is intended to dynamically change the next musk to be played in response to the reaction of the viewer to the streamed music. In the third embodiment, the reaction to the musk is assumed to be a comment from a viewer submitted when viewing the music. That is, the music to be played will change depending on the content of the comment submitted during the playback of the musk. In addition, the following details will be described, in which the music may be audio only or a video combined with the image.

Figure 17:
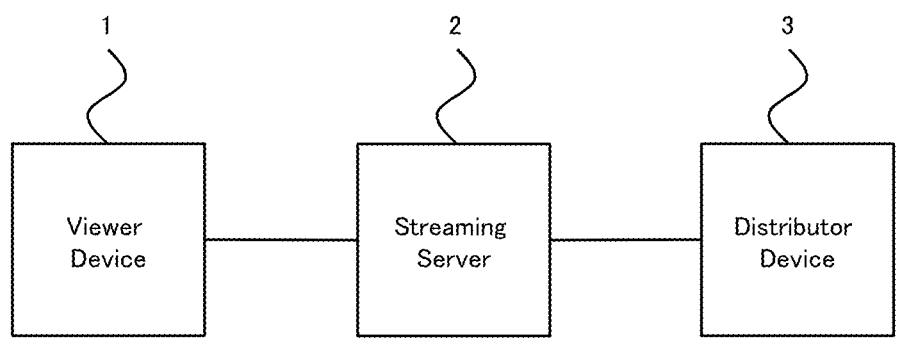
FIG. 17 is a figure illustrating an example of the overall configuration of a music distribution system according to the present embodiment.

FIG. 17 is a figure illustrating an example of the overall configuration of the music distribution system according to the third embodiment. The music distribution system of the third embodiment includes a distributor device 3, wherein the distributor device 2 is communicatively connected with the streaming server 2 and the streaming server 2 is communicatively connected with the viewer terminal 1. The distributor device 3 is a computer, such as a personal computer, tablet computer, or smartphone, that transmits music. The distributor device 3 may be, for example, a home computer operated by a general user who wishes to distribute music. From the distributor device 3, the music data is transmitted to the streaming server 2 by a streaming method. The streaming server 2 is a computer, such as a workstation, personal computer, or a virtual computer provided by cloud computing, that distributes the music data received from the distributor device 3 to the viewer terminal 1. The streaming server 2 can distribute the music data to a plurality of viewer terminals 1 at the same time. The viewer terminal 1 is a computer operated by a viewer, such as a personal computer, a tablet computer, or a smartphone. The viewer can access the streaming server 2 by operating the viewer terminal 1, and the viewer terminal 1 can receive and play back music data transmitted from the streaming server 2. In addition, the viewer may operate the viewer terminal 1 to post comments on the music to the streaming server 2. From the streaming server 2 to the viewer terminal 1, in addition to the music data, the comment data is transmitted, and along with the playback of the music, a comment on the music is also displayed on the viewer terminal 1.

In the following explanation, the whole of the songs that are streamed and played linearly is referred to as "the distributed music." The distributed music may be in the form of encoding audio (or video image including audio) captured by a camera or a microphone in real time to transmit audio data. However, in the third embodiment, it is assumed that the distributed music may be transmitted as a whole by preparing music data (hereinafter referred to as component music data) as a part in advance, preparing a playlist in which the component music data is arranged, and transmitting the component music data in accordance with the playlist.

Figure 18:
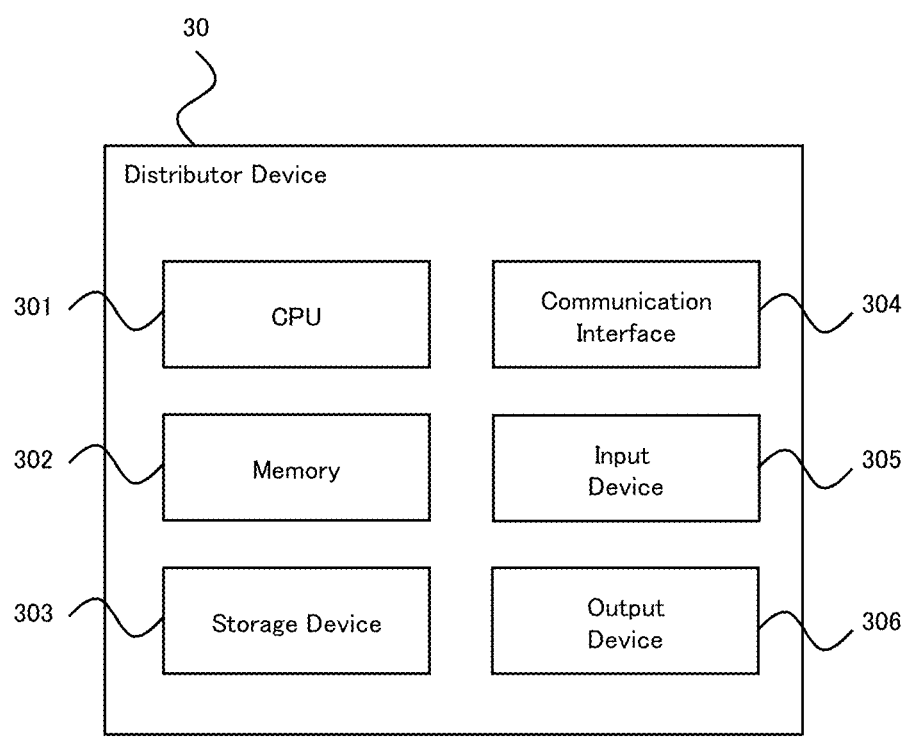
FIG. 18 is a figure illustrating an example of a hardware configuration of a distributor device 3.

FIG. 18 is a figure illustrating an example of a hardware configuration of the distributor device 3. The distributor device 3 includes a CPU 301, a memory 302, a storage device 303, a communication interlace 304, an input device 305, and an output device 306. Storage device 303 may be, for example, a hard disk drive, a solid state drive, a flash memory, or the like, for storing various types of data or programs. The communication interface 304 is an interface for connecting to the communication network 30, such as an adapter for connecting to an Ethernet (registered trademark), a modem for connecting to a public telephone network, a wireless communication device for performing wireless communication, a USB (Universal Serial Bus) connector for serial communication, or an RS232C connector. The input device 305 may be, for example, a keyboard or mouse, a touch panel, a button, a microphone, or the like, for inputting data. The output device 306 may be, for example, a display; a printer, a speaker, or the like, which outputs data.

Figure 19:
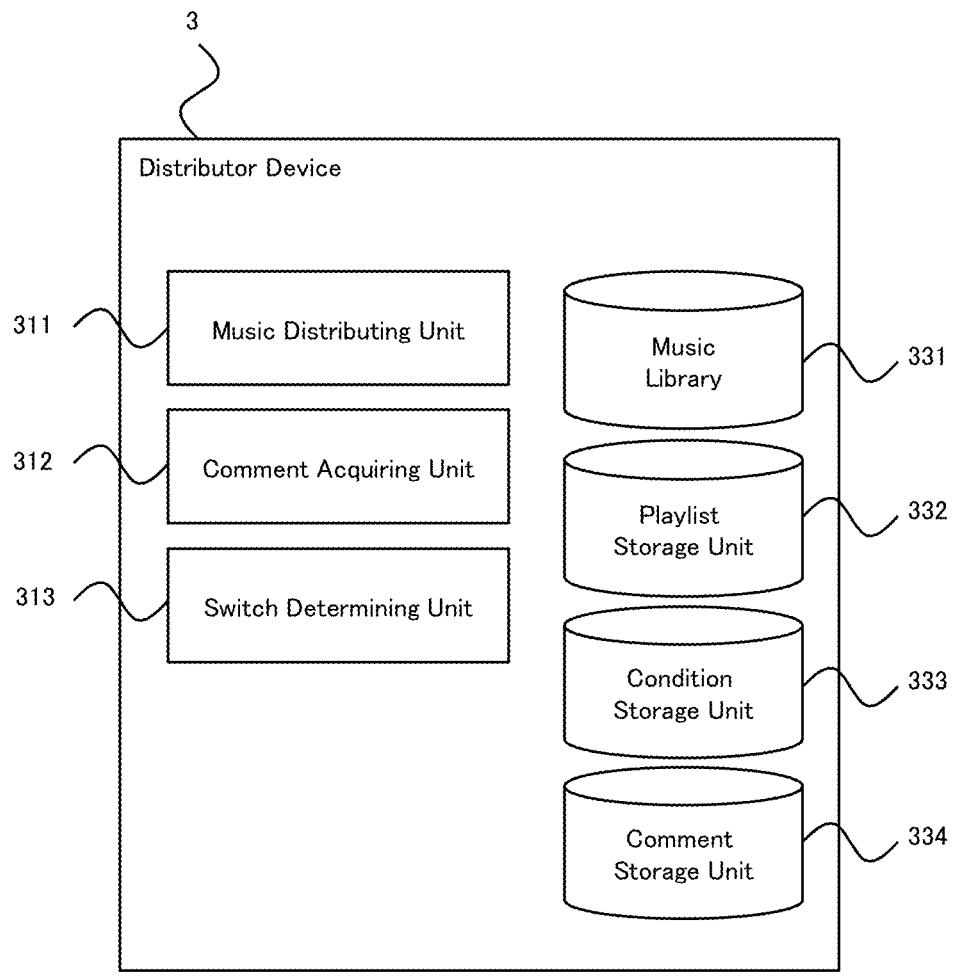
FIG. 19 is a figure illustrating an example of a software configuration of a distributor device 3.

FIG. 19 is a figure illustrating an example of a software configuration of a distributor device 3. As illustrated in the figure, the distributor device 3 includes a music distributing unit 311, a comment acquiring unit 312, a switch determining unit 313, a music library 331, a playlist storage unit 332, a condition storage unit 333, and a comment storage unit 334.

The music distributing unit 311, the comment acquiring unit 312, and the switch determining unit 313 are realized by reading out and executing a program stored in the storage device 303 to the memory 302. The music library 331, the playlist storage unit 332, the condition storage unit 333, and the comment storage unit 334 are realized as part of the storage area provided by at least one of the memory 302 and the storage device 303 provided by the distributor device 3.

Figure 20:
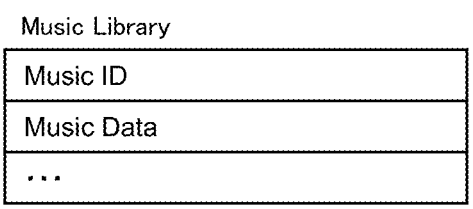
FIG. 20 is a figure illustrating a structural example of a music library 331.

The music library 331 stores part music data. The part music data may be stored as an encoded file in any form, for example, MP3, MP4, AAC, or the like. FIG. 20 is a figure illustrating a structural example of a music library 331. As illustrated in the figure, (the music library 331 corresponds to information (music ID) for identifying the part music data and stores the part music data. The music ID may be, for example, a file name or any value uniquely assigned.

Figure 21:
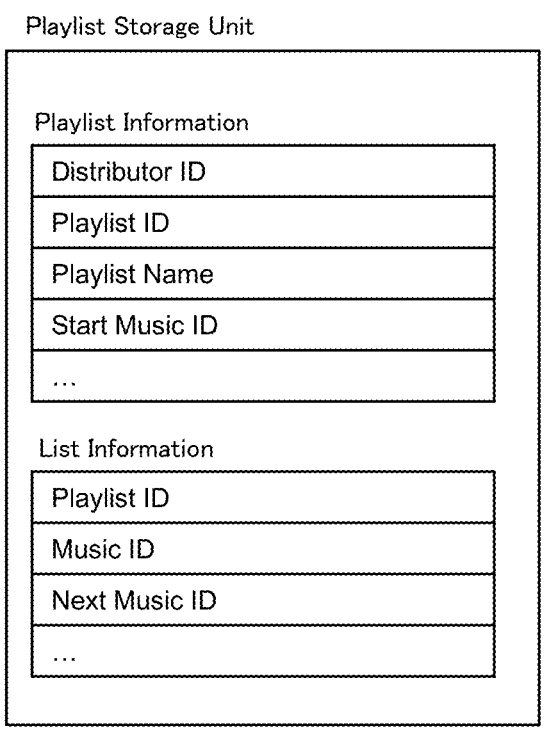
FIG. 21 is a figure illustrating an example of a configuration of a playlist storage unit 332.

The playlist storage unit 332 stores information (a playlist) indicating the order of distribution of the distributed music. FIG. 21 is a figure illustrating an example of a configuration of a playlist storage unit 332. As illustrated in the figure, the playlist storage unit 332 stoics the playlist information and the list information. Playlist information is information related to a playlist. In the example of FIG. 21, for example, includes, corresponding to a distributor ID identifying a distributor and information identifying a playlist (scenario ID), a playlist name, information representing the first part music data to be played (start music ID), and the like, the list information is information indicating the order in which the songs are played in the playlist by default. The list information includes the playlist ID, the music ID representing the part music data included in the playlist indicated by the playlist ID, and the next music ID representing the part music data to be played after the part music data indicated by the music ID. As described above, in the music distribution system according to the third embodiment, the component music data to be played next varies according to the response (comment) of the viewer. If the viewer's response (comment) does not satisfy the predetermined conditions, the default order of songs is to determine the next part song data to be played based on the list information.

The condition storage unit 333 stores information (hereinafter referred to as the condition information) indicating the condition for performing a branching according to the response (comment) of the viewer. FIG. 22 is a figure illustrating an example of a configuration of a condition storage unit 333. As illustrated in the figure, the condition information stored by the condition storage unit 333 includes a playlist ID, a determination period, a condition, and a next music ID. The playlist ID is information indicating a playlist. The determining period is information indicating the period for determining whether the viewer's response (comment) meets the requirements. The determining period may be specified relative to, for example, five minutes before the current time or absolutely from 00:00 to 00:10 on December 25th. The delivery device 3 determines whether a viewer's response, i.e., a comment from a viewer submitted during the period specified by the determining period, matches the condition. The condition may be for the viewer's response (comments posted by the viewer) on the basis of, for example, the number of comments submitted within the above-mentioned period, including predetermined keywords, the number of comments submitted by the viewer in each region, or the number of viewers who submitted comments, for example, the aggregate (mean, median, maximum, minimum, etc.) of the amount posted by the viewer in response to questioning the viewer's opinion on the amount in the songs, the number of viewers who are pitied on the basis of the viewer's emotions as determined by the text analysis, etc., exceeds a predetermined threshold, and no comment containing a predetermined keyword has been submitted.

The music distributing unit 311 distributes the music. The music distribution unit 311 can distribute the music by reading out the playlist information corresponding to the designated playlist from the playlist storage unit 332 and transmitting the read part music data corresponding to the starting music ID included in the read-out playlist information from the video library 331 (converting the video format to be encoded or distributed as needed) to the streaming server 2. Further, when the read part music data has been sent out, the music distribution unit 311 acquires the next music ID corresponding to the playlist ID and the music ID representing the component music data from the list information of the playlist storage unit 332, reads the music data corresponding to the acquired next music ID from the music library 331, and transmits the music data to the streaming server 2 in the same manner as described above. The music distribution unit 311 may terminate the distribution processing of the music when the next music ID docs not exist. Since the next music ID is determined by the switch determining unit 313 described later, the next music to be distributed may change.

The comment storage unit 334 stores comments submitted by the viewer. FIG. 23 is a figure illustrating an example of a configuration of a comment storage unit 334. The comment storage unit 334 may store, correspond to the information (comment ID) that identifies the comment, the viewer ID that indicates the viewer who submitted the comment, the datetime when the comment was submitted, the content of the comment, and the like.

The comment acquiring unit 312 acquires comments submitted by the viewer using the viewer terminal 1. For example, when the streaming server 2 provides an API for obtaining a submitted comment, the comment acquiring unit 312 may retrieve the submitted comment by calling the API. In addition, a comment may be directly transmitted from the viewer terminal 1 to the distributor device 3. The comment acquiring unit 312 can register the acquired comment in the comment storage unit 334.

The switch determining unit 313 determines to switch the music. The switch determining unit 313 reads out a comment corresponding; to the period from the comment storage unit 334 and aggregates each of the condition information stored in the condition storage unit 333 to determine whether or not the condition is satisfied. When the condition is satisfied, the switch determining unit 313 can transmit the component music data represented by the next music ID of the condition information to the music distribution unit 311 so as to transmit the component music data represented by the next music ID of the condition information.

Figure 24:
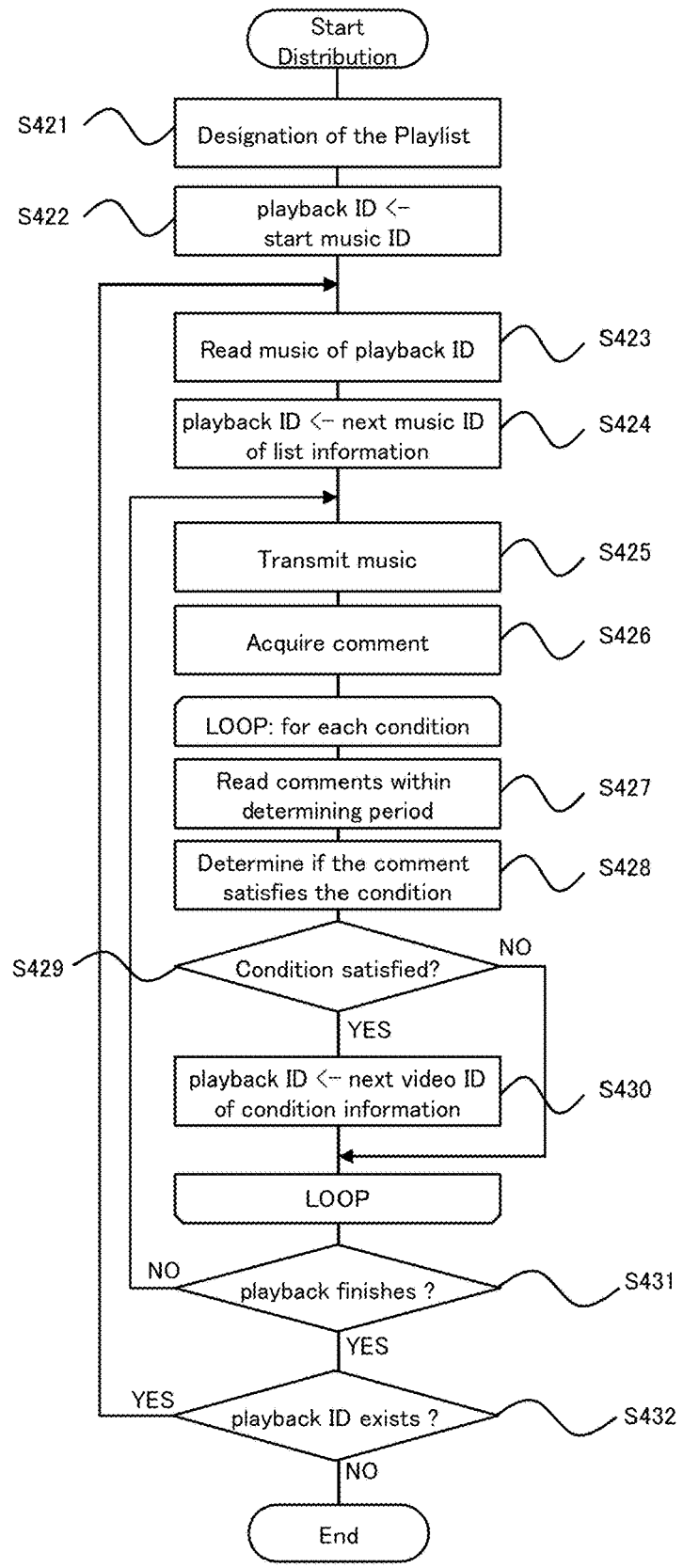
FIG. 24 is a figure illustrating a flow of processing executed by the music distribution system according to the present embodiment.

FIG. 24 is a figure illustrating a flow of processing executed by the music distribution system according to the third embodiment.

The music distributing unit 311 receives the designation of the playlist (S421) and treats the starting musk ID included in the playlist information of the designated playlist as the playback ID (S422). The music distributing unit 311 reads the part music data corresponding to the playback ID from the music library 331 (S423) and sets the next music ID of the list information to the playback ID (S424). The music distributing unit 311 transmits the read part music to the streaming server 2 (S425). As a result, the music is streamed from the streaming server 2 to each viewer terminal 1.

The comment acquiring unit 312 acquires comments submitted by the viewer using the viewer terminal 1 from the streaming server 2 (S426). Comments can be retrieved, for example, by invoking an API provided by the streaming server 2.

The switch determining unit 313 reads a comment submitted in the determining period from the comment storage unit 334 (S427) for each of the condition information stored in the condition storage unit 333, and determines whether or not the read comment satisfies the condition of the condition information (S428). Whether a comment meets a condition may be determined, for example, by counting the number included in the comment tor each keyword and whether the number counted exceeds a predetermined threshold.

When the comment satisfies the condition (S429:YES), the switch determining unit 313 sets the next music ID included in the condition information to the playback ID (S430).

By performing the above processing conditions on tire information, the next music ID of the condition information that satisfies the condition at the end is set as the playback ID.

When the transmission of the music data being distributed is not completed (S431: NO), the processing from Step S425 is repeated.

When the transmission of the music data being distributed is completed (S431:YES), if the music ID is set in the playback ID (S423: YES), the music distribution unit 311 repeats the processing from step S423, and if the music ID is not set in the playback ID (or if the NOLL value is set) (S431:NO), the music distribution unit 311 completes the processing on the assumption that the playlist playback has been completed.

Figure 25:
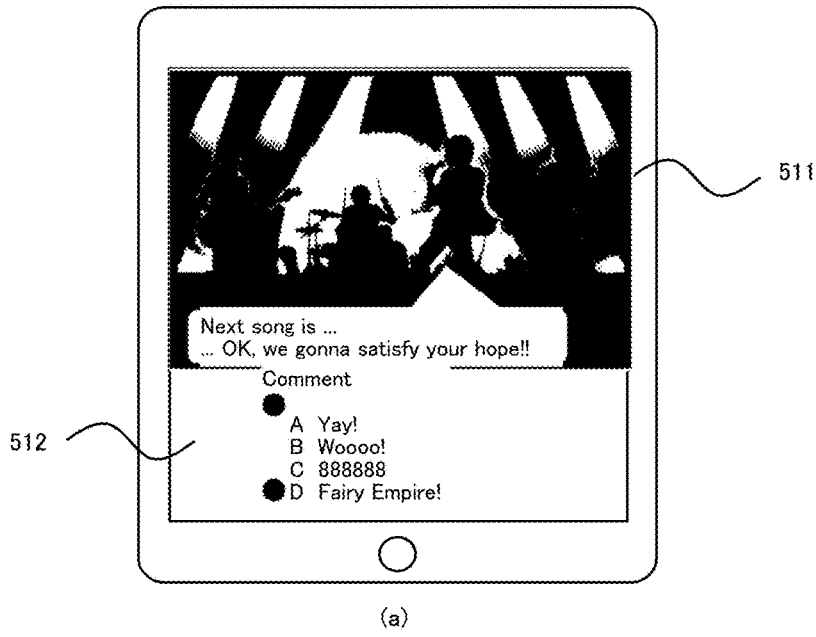
FIG. 25 is a figure illustrating an example of a screen displayed on the viewer terminal 1.
Figure 25:
Figure 25:
Figure 25:
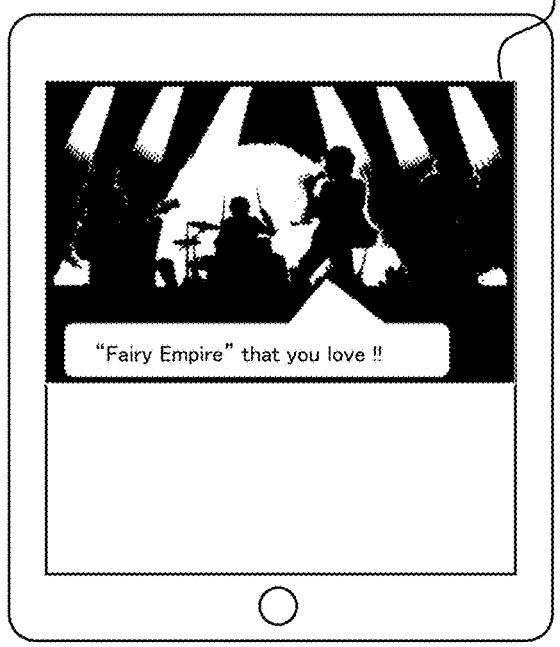
Figure 25:
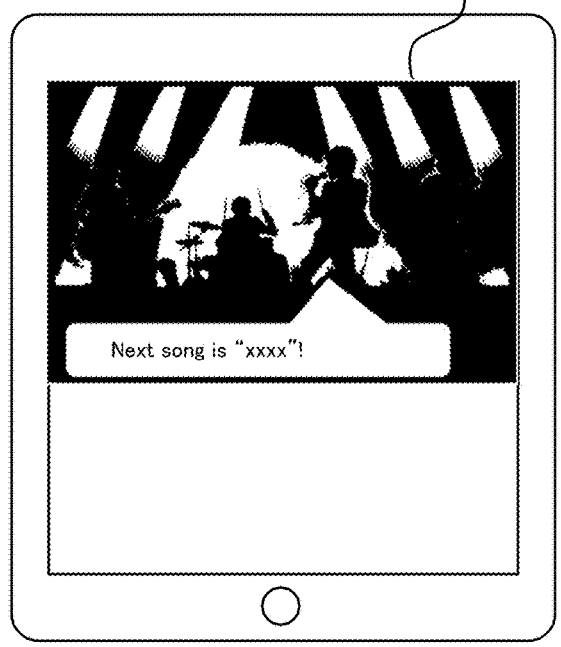

FIG. 25 is a figure illustrating an example of a screen displayed on the viewer terminal 1. In the example of FIG. 25a, a video 511 is displayed based on the music data distributed from the streaming server 2. In addition, when the music data is audio data, still images may be displayed instead of video 511, or images obtained from a different source than the music data may be displayed on video 511. In addition, a comment 512 submitted by a viewer operating the viewer terminal 1 or a viewer operating the other viewer terminal 1 is displayed on the screen.

Here, if the condition storage unit 333 contains information on the condition that "Fairy Empire" is the most widely posted among the music titles such as "Fairy Empire," if the keyword "Fairy Empire" as shown in the example in FIG. 25(a) is included in the most frequently posted comment, the "Fairy Empire" song is distributed as shown in FIG. 25(b). If a comment containing the scheduled music name is not submitted or the number of posts is less than a predetermined number, the music set as the next music ID of the list information is distributed as shown in FIG. 25c.

As described above, the music distribution system according to the third embodiment can distribute the linear video of continuously transmitting the part music data set as a playlist to the viewer terminal 1 via the streaming server 2, and dynamically change the music to be distributed next in response to comments from the viewer during the playback of the part music data. Thus, a linear video of different deployments can lie provided depending on the viewer's response. Accordingly, it is possible to distribute the music without compromising the live feeling of the streaming method while using the recorded part music data.

Although the third embodiment has been described above, the above-described embodiment is intended to facilitate the understanding of the present invention and is not intended to be a limiting interpretation of the present invention. The present invention may be modified and improved without departing from the spirit thereof; and the present invention also includes its equivalent.

For example, in the present embodiment, it is assumed that the music transmitted from the distributor device 3 is distributed to the viewer terminal 1 via the streaming server 2, but it is also possible to distribute the music directly from the distributor device 3 to each viewer terminal 1.

In the present exemplary embodiment, the music library 331 is intended to store the music-file encoded in a format such as MP3. However, the MIDI data or the track information for synthesizing the music of multiple tracks may be stored in the music library 331, and a dynamically synthesized audio or video may be transmitted based on these.

Fourth Embodiment

The video distribution system according to the fourth embodiment includes the following configuration.
[Item 1]
A video distribution system comprising:
a video library dial stores multiple video data;
a video distributing unit that distributes the video data;
a reaction acquiring unit that acquires reaction information indicating a reaction from one or more viewers during the playback of at least the first video data based on a priority; and
a switch determining unit that determines a second video data to be distributed next to a first video data in accordance with the reaction information.
[Item 2]
The video distribution system described in Item 1, wherein:
the video distributing unit transmits the first video data to a video distribution server that distributes the video data to each of the viewer's viewer terminal,
the one or more viewer terminals transmit comments entered from the viewer to the video distribution server, and
the video distribution system, wherein the reaction acquiring unit acquires the comment from the video distribution server as the reaction information, and the switch determining unit determines the second video data in response to the comment.
[Item 3]
The video distribution system described in Item 1, timber comprising:
a scenario storage unit that stores information representing the video data to be distributed next for each of the video data, and
a condition storage unit that stories information representing a condition for the reaction information anti the next video data to be distributed,
wherein
the switch determining unit determines the video data to be distributed next to the first video data corresponding to the condition satisfying the reaction information as the second video data when a condition for the reaction information satisfying the reaction information is present, and determines the video data to be distributed next to the first video data from the scenario storage unit as the second video data when the condition satisfying the reaction information is not present.
[Item 4]
The video distribution system described in Item 1, wherein the priority is based on the amount which is charged to the viewer.
[Item 5]
The video distribution system described in Item 1, wherein the priority is based on status information of the viewer.

Hereinafter, a video distribution system according to a fourth embodiment will be described. The video distribution system according to the fourth embodiment is intended to dynamically change the development (story) of the video in response to the response of the viewer to the streamed video. In the fourth embodiment, the response to the video is assumed to be a comment from a viewer submitted when viewing the video. That is, the video to be played will change depending on the content of the comment submitted during playback of the video. For example, when two characters appear in a video, a large number of comments can be diverged into a main story with the posted character as the main feature. Details will be described below.

Figure 26:
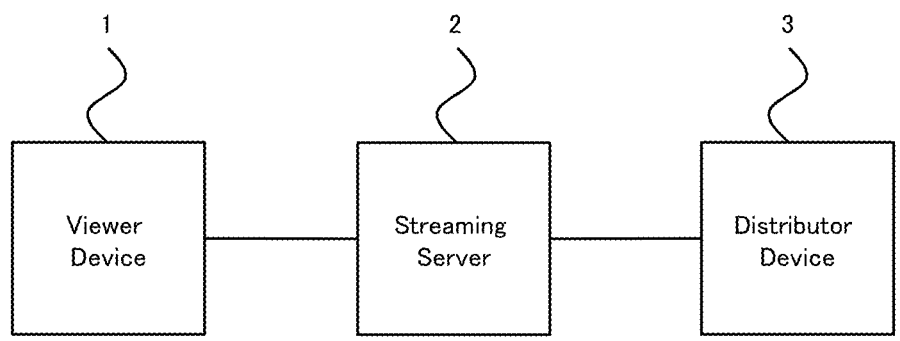
FIG. 26 is a figure illustrating an example of an overall configuration of a video distribution system according to the present embodiment.

FIG. 26 is a figure illustrating an example of the overall configuration of the video distribution system according to the fourth embodiment. The video distribution system of the fourth embodiment includes a distributor device 3, wherein the distributor device 2 is communicatively connected with the streaming server 2 and the streaming server 2 is communicatively connected with the viewer terminal 1. The distributor device 3 is a computer that transmits video, such as a personal computer, tablet computer, or smartphone. The distributor device 3 may be, for example, a home computer operated by a general user who wishes to distribute video. From the distributor device 3, video data is sent to the streaming server 2 by a streaming method. The streaming server 2 is a computer, such as a workstation, personal computer, or a virtual computer provided by cloud computing, that distributes video data received from the distributor device 3 to the viewer terminal 1. The streaming server 2 can distribute video data to a plurality of viewer terminals 1 at the same lime. The viewer terminal 1 is a computer operated by a viewer, such as a personal computer, a tablet computer, or a smartphone. The viewer can access the streaming server 2 by operating the viewer terminal 1, and the viewer terminal 1 can receive and play back video data transmitted front the streaming server 2. The viewer may also operate the viewer terminal 1 to post comments on the video to the streaming server 2. The streaming server 2 sends comment data to the viewer terminal 1 in addition to the video data, and in addition to playing the video, a comment on the video is also displayed on the viewer terminal 1.

In the following explanation, the entire video that is streamed and played linearly is referred to as the "distribution video." The distribution video may be a format in which images and sounds captured by a camera or a microphone are encoded into video data in real time and transmitted. However, in the fourth embodiment, it is assumed that the distribution video is prepared in advance as a part video data (hereinafter referred to as the "part video data"), and a scenario in which the part video data is arranged is prepared, and the part video data is transmitted in accordance with the scenario, so that the overall distribution video is transmitted.

Figure 27:
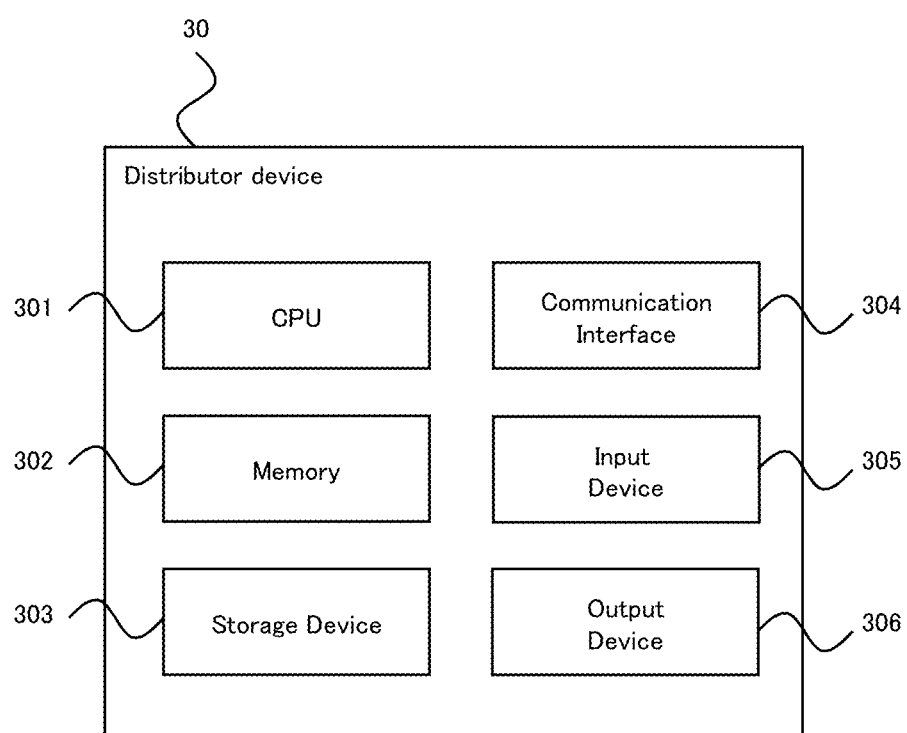
FIG. 27 is a figure illustrating an example of a hardware configuration of a distributor device 3.

FIG. 27 is a figure illustrating an example of a hardware configuration of the distributor device 3. The distributor device 3 includes a CPU 301, a memory 302, a storage device 303, a communication interface 304, an input device 305, and an output device 306. Storage device 303 may be, for example, a hard disk drive, a solid state drive, a flash memory, or the like, for storing various types of data or programs. The communication interface 304 is an interface for connecting to the communication network 30, such as an adapter for connecting to an Ethernet (registered trademark), a modem for connecting to a public telephone network, a wireless communication device for performing wireless communication, a USB (Universal Serial Bus) connector for serial communication, or an RS232C connector. The input device 305 may be, for example, a keyboard or mouse, a touch panel, a button, a microphone, or the like, for inputting data. The output device 306 may be, for example, a display, a printer, a speaker, or the like, which outputs data.

Figure 28:
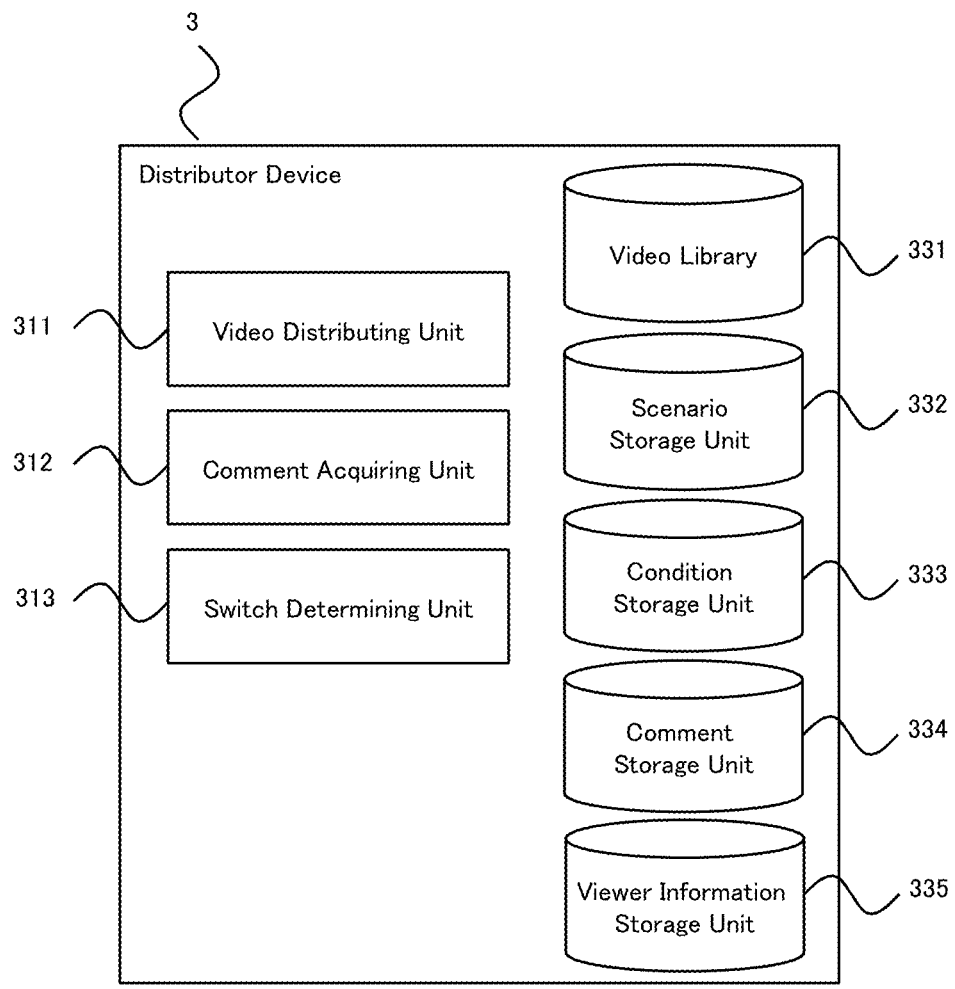
FIG. 28 is a figure illustrating an example of a software configuration of a distributor device 3.

FIG. 28 is a figure illustrating an example of a software configuration of the distributor device 3. As illustrated in the FIG. 2, the distributor device 3 includes a video distributing unit 311, a comment acquiring unit 312, a switch determining unit 313, a video library 331, a scenario storage unit 332, a condition storage unit 333, and a comment storage unit 334.

The video distributing unit 311, the comment acquiring unit 312, and the switch determining unit 313 are realized by reading and executing a program stored in the storage device 303 to the memory 302. The video library 331, the scenario storage unit 332, the condition storage unit 333, and the comment storage unit 334 are realized as part of a storage area provided by at least one of the memory 302 and the storage device 303 provided by the distributor device 3.

Figure 29:
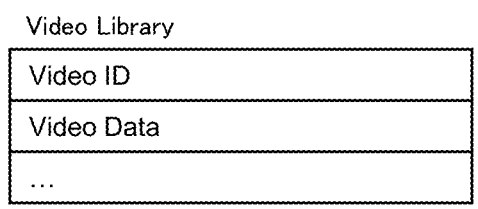
FIG. 29 is a figure illustrating a structural example of a video library 331.

The video library 331 stores part video data. The part video data may be saved as files encoded in any form, such as MPEG4, MPEG2, AVI, MOV and the like. FIG. 29 is a figure illustrating a structural example of a video library 331. As shown in the same figure, the video library 331 corresponds to information (video ID) for identifying the part video data and stores the part video data.

Figure 30:
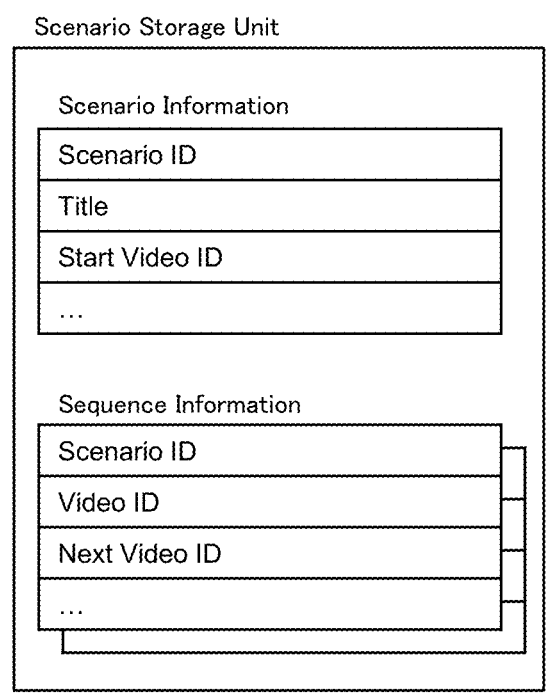
FIG. 30 is a figure illustrating an example of a configuration of a scenario storage unit 332.

The scenario storage unit 332 stores a scenario of the distribution video. FIG. 30 is a figure illustrating an example of a configuration of a scenario storage unit 332. As illustrated in the figure, the scenario storage unit 332 stores the scenario information and the sequence information. The scenario information is information about a scenario, and in the example of FIG. 30, for example, information (scenario ID) identifying the scenario includes the name of the scenario (title), information indicating the part video data to be played back at the beginning of the scenario (start video ID), and the like. The sequence information is information indicating the order in which parts video is played by default in the scenario. The sequence information includes the scenario ID, a video ID representing the part video data included in the scenario indicated by the scenario ID, and the following video ID representing the part video data to be played after the part video data indicated by the video ID. As described above, in the video distribution system of the fourth embodiment, the part video data to be played next according to the response (comment) of the viewer is changed. However, if the response (comment) of the viewer docs not satisfy the predetermined condition, the component video data to be played next based on the sequence information is determined as the delimit scenario.

The condition storage unit 333 stores information (hereinafter referred to as the condition information) indicating the condition for perforating a branching according to the response (comment) of the viewer. FIG. 31 is a figure illustrating an example of a configuration of a condition storage unit 333. As illustrated in the figure, the condition information stored in the condition storage unit 333 includes a scenario ID, a determination period, a condition, and a next video ID. The scenario ID is information indicating a scenario. The determining period is information indicating the period for determining whether the viewer's response (comment) meets the requirements. The determining period may lie specified relative to, for example, five minutes before the current time or absolutely from 00:00 to 00:10 on December 25th. The delivery device 3 determines whether a vie wet's response, i.e., a comment from a viewer submitted during the period specified by the determining period, matches the condition. The condition is for the viewer's response (comments posted by the viewer) on the basis of, for example, the number of comments submitted within the above-mentioned period, including whether or not a comment containing a predetermined keyword has been posted, the number of comments submitted by the viewer including a keyword, the total number of viewers or viewers in each region of the viewer who submitted the comment, e.g., the aggregate amount (mean, median, maximum, minimum, etc.) submitted by the viewer to question the viewer's comment on the amount in the video, the number of viewers who are pitied based on the viewer's emotions as determined by the text analysis, etc., exceeds a predetermined threshold, and no comment containing a predetermined keyword has been submitted.

The video distributing unit 311 distributes video. By accepting a designation from a user, the video distributing unit 311 can retrieve the scenario information corresponding to the prespecified scenario from the scenario storage unit 332 and retrieve the pan video data corresponding to the start video ID included in the read scenario information from the video library 331 (encodes or converts the video format to be delivered as necessary), and transmit the read-out part video data to the streaming server 2. In this way, the video distributing unit 311 can transmit the video to the streaming server 2. The video distributing unit 311 acquires the next video ID corresponding to the scenario ID and the video ID representing the part video data from the sequence information of the scenario storage unit 332 when the mad-out part video data is finished, reads the part video data corresponding to the next video ID from the video library 331, and transmits the same data to the streaming server 2. When the next video ID does not exist, the video distributing unit 311 may terminate the video distribution process. When the next video ID is determined by the switch determination unit 313 described later, the transmission of the currently executing part video data is interrupted, and the story can be changed by reading the part video data corresponding to the next video ID determined by the switch determination unit 313 and sending it to the streaming server 2.

The comment storage unit 334 stores comments submitted by the viewer. FIG. 32 is a figure illustrating an example of a configuration of a comment storage unit 334. The comment storage unit 334 may store, correspond to the information (comment ID) that identifies the comment, the viewer ID that indicates the viewer who submitted the comment, the datetime when the comment was submitted, the content of the comment, and if the comment is charged, information on whether the comment is charged or not, etc.

The viewer information storage unit 335 stores information about the viewer. FIG. 33 is a figure illustrating an example of a configuration of a viewer information storage unit 335. The viewer information storage unit 335 may store, corresponding to the viewer II), information on the viewer's status, such as the total amount of charge and/or charge, if any, for comments submitted by the viewer on the plan of the video distribution service to which the viewer subscribes (e.g., a premium plan, basic plan, five plan, etc.), the item name if the viewer purchases items, and information indicating the history of comments submitted by the viewer.

The comment acquiring unit 312 acquires comments submitted by the viewer using the viewer terminal 1. For example, when the streaming server 2 provides an API for obtaining a submitted comment, the comment acquiring unit 312 may retrieve the submitted comment by calling the API. The comment acquiring unit 312 can register the acquired comment in the comment storage unit 334.

The switch determining unit 313 determines to switch the video. The switch determining unit 313 reads out a comment corresponding to the period from the comment storage unit 334 and aggregates each of the condition information stored in the condition storage unit 333 to determine whether or not the condition is satisfied. When the condition is satisfied, the switch decision unit 313 can transmit the part video data represented by the next video ID of the condition information to the video distributing unit 311. Here, the switch determining unit 313 can read out a high priority comment based on the information stored in the comment storage unit 334 or the information stored in the viewer information storage unit 335.

Figure 34:
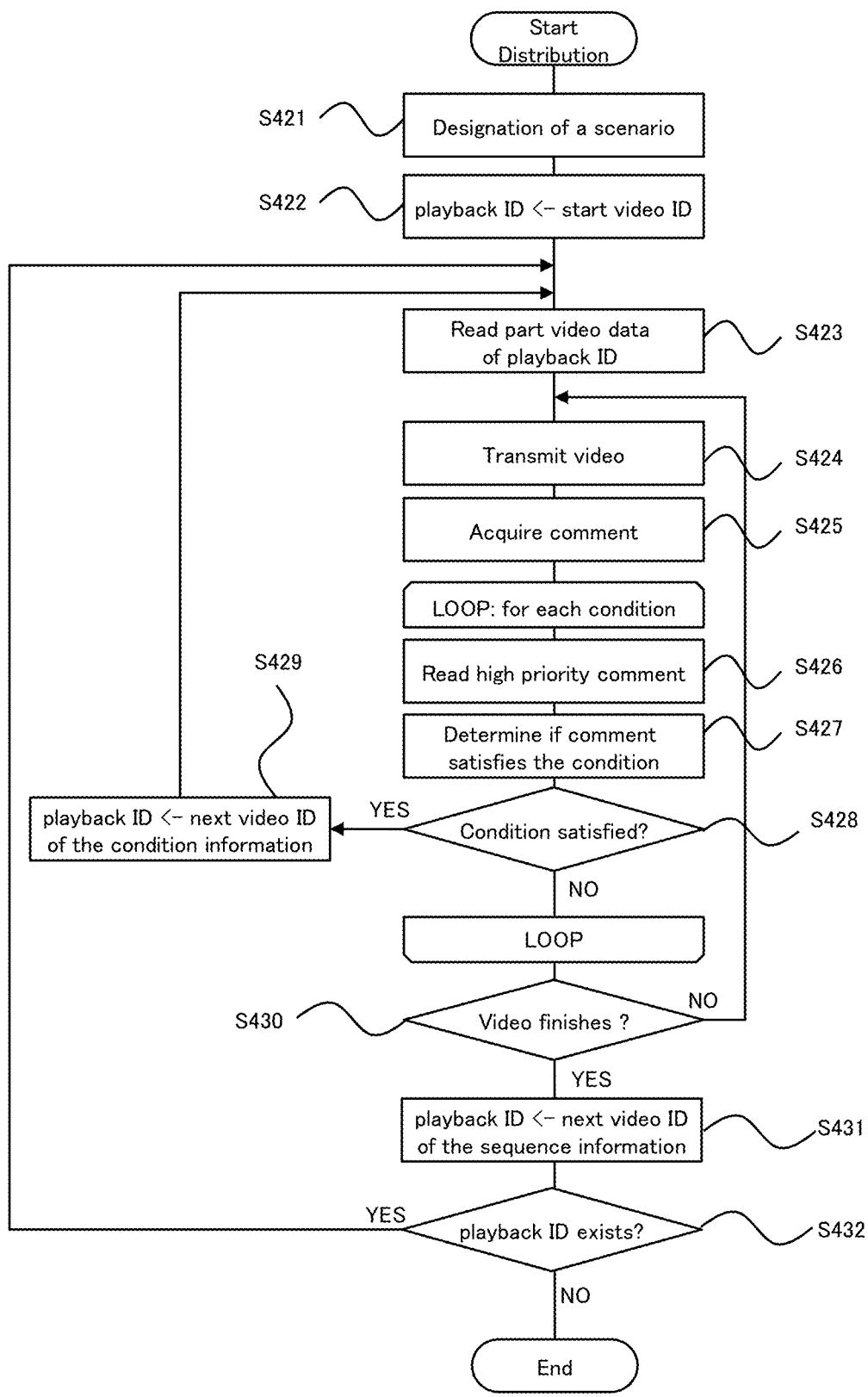
FIG. 34 is a figure illustrating a flow of processing executed by the video distribution system according to the present embodiment.

FIG. 34 is a figure illustrating a flow of processing performed by the video distribution system according to tbc fourth embodiment.

The video distributing unit 311 receives the designation of a scenario (S421) and assumes the playback ID as the start video ID included in the scenario information of the specified scenario (S422). The video distributing unit 311 reads the part video data corresponding to the playback ID from the video library 331 (S423) and transmits the read part video data to the streaming server 2 (S424). As a result, the streaming server 2 streams the video to each viewer terminal 1.

The comment, acquiring unit 312 acquires comments submitted by the viewer using the viewer terminal 1 from the streaming server 2 (S425). Comments can be retrieved, for example, by invoking an API provided by the streaming server 2.

The switch determining unit 313 reads a high priority comment from the comment storage unit 334 for each of the condition information stored in the condition storage unit 333 (S426).

Here, the switch determining unit 313 can determine a high priority comment on the basis of, for example, a plan for which a viewer who submitted a comment subscribes to the video distribution service. For example, when a viewer is participating in a premium plan (a plan whose amount is higher than that of another plan), the switch determining unit 313 extracts the comment stored in the comment storage unit 334 as a high priority comment.

Alternatively, the switch determining unit 313 may determine, with respect to a high priority comment, for example, if the viewer who submitted the comment charges for the submitted comment, whether the fee is charged, whether the fee exceeds the standard amount, or on the basis of the maximum amount between multiple viewers. For example, when a viewer charges 500 yen for a comment, the switch determining unit 313 extracts the comment as a high priority since the amount of charge exceeds the standard amount (for example, 300 yen). In addition, the video distributing unit 311 may present in advance the base amount of the comment to be received in the case of distributing the video.

Alternatively, the switch determining unit 313 may determine, with respect to a high priority comment, for example, whether or not the item is held when the viewer submits a comment or purchases a predetermined item at a lime prior to the submission of a comment, or whether or not the right arising from the item has been exercised. For example, an item may be used in conjunction with a specific comment, or it may be effective for a predetermined number of times or periods regardless of the item.

Next, the switch determining unit 313 determines whether or not the mad-out comment satisfies the condition of the condition information (S427). Whether a comment meets a condition can be determined, for example, by counting the number included in the comment for each keyword and determining whether the number counted exceeds a predetermined threshold. Alternatively, in S426, if the switch determining unit 313 reads out the highest priority comment (e.g., a comment/viewer with the highest charge amount), it can be determined whether the comment satisfies the condition.

When the comment satisfies the condition (S428:YES), the switch determining unit 313 sets the next video ID included in the condition information to the playback ID (S429), returns to step S423, and the video distributing unit 311 transmits the part video data corresponding to the playback ID. As a result, the flow of the part video data can be changed according to the comments.

When the video being played finishes (S430:YES), the switch determining unit 313 sets the next video ID of the sequence information to the playback ID (S431) when the comment docs not satisfy the condition for all the condition information. When the next video ID is set in the sequence information (S432:YES), step S423 is returned, and the video distributing unit 311 transmits the part video data corresponding to the playback ID. If the next video ID is not set in sequence information (S432: NO), processing is terminated.

Figure 35:
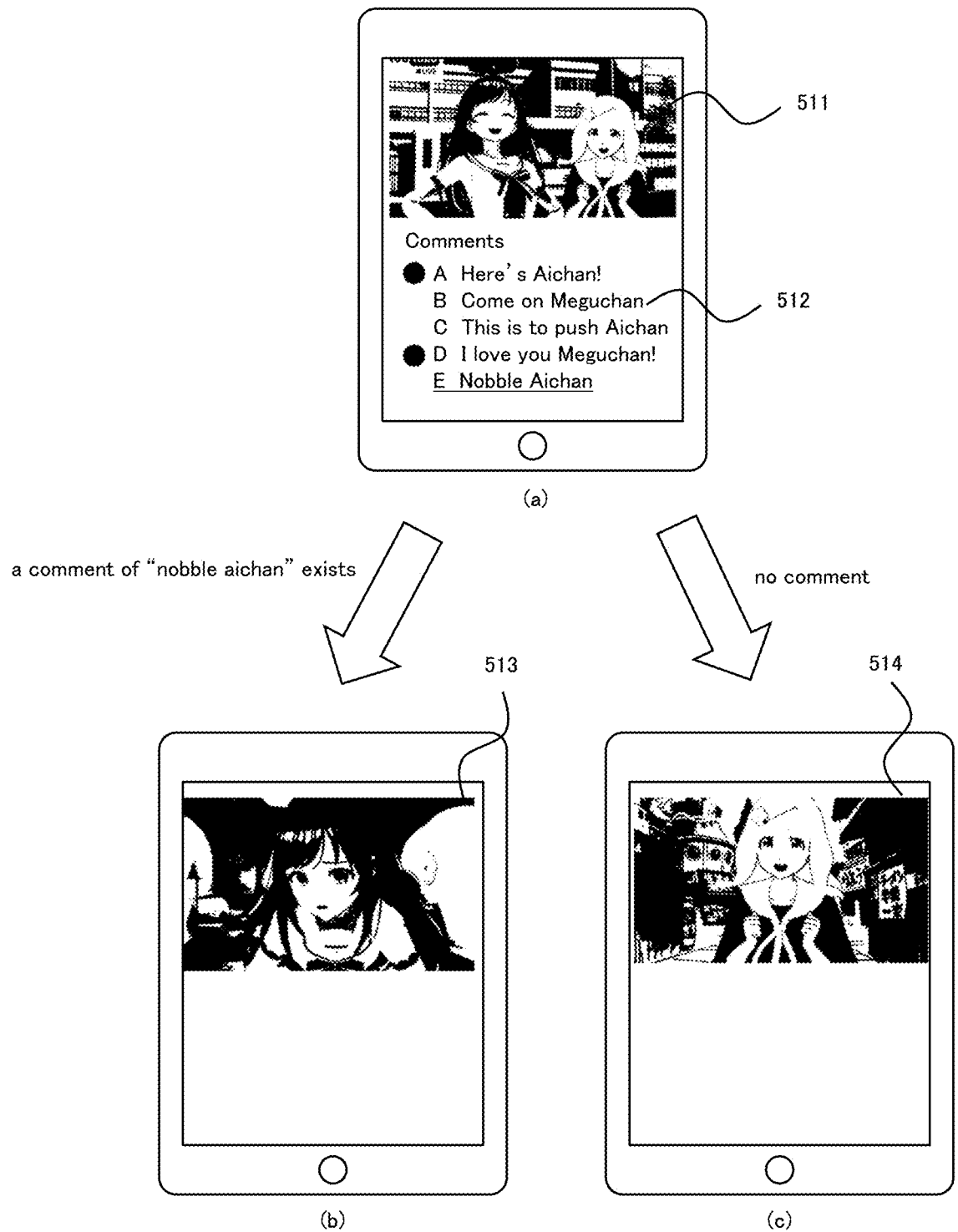
FIG. 35 is a figure illustrating an example of a screen displayed on the viewer terminal 1.

FIG. 35 is a figure illustrating an example of a screen displayed on the viewer terminal 1. As shown in FIG. 35A, a video 511 is displayed based on the video data distributed from the streaming server 2, and a comment 512 submitted by a viewer operating the viewer terminal 1 or another viewer terminal 1 is displayed. In the example shown in FIG. 35a, two characters (Aichan and Meguchann) are displayed. Comments 512, on the other hand, include comments such as "Here's Aichan!" and "Come on Meguchan."

Here, when the conditional storage unit 333 includes information including the condition that the phrase "Call Aichan", this phrase is posted in the example shown in FIG. 35a, and the video 513 as shown in FIG. 35b is displayed. On the other hand, when the above phrase is not registered in the comment, the video 514 as shown in FIG. 35c is displayed as the next video ID of the sequence information.

As described above, the video distribution system according to the fourth embodiment can distribute the linear video to the viewer terminal 1 via the streaming server 2 by continuously transmitting the component video data, and also determine the part video data to be played next to the part video data being played in accordance with comments from the viewer during playback of the component video data. Thus, a linear video of different deployments can be provided depending on the viewer's response. Accordingly, it is possible to distribute video without compromising the live feeling of the video distribution method in a streaming format, even though the recorded part video data is used.

Although the fourth embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in the present embodiment, it is assumed that the video transmitted from the distributor device 3 is distributed to the viewer terminal 1 via the streaming server 2, but it is also possible to distribute the video directly from the distributor device 3 to each viewer terminal 1.

In the present exemplary embodiment, the video file encoded in a format such as MPEG4 is stored in the video library 331. However, the 3D model or scene file may be stored in the video library 331 and a dynamically rendered video may be transmitted based on the 3D model or scene file.

In the present embodiment, even while the part video data is being played, if the comment satisfies the condition, the next part video data is set (Step S428→S429→S423 in FIG. 33). However, the part video data may be played to the end and then transferred to the next part video data. In this case, step S429 of FIG. 33 may be preceded or followed by steps to confirm that the playback of the part video data has been completed.

In the present embodiment, the part video data is switched according to the comments (or keywords included in the comments) submitted by the viewer. However, the switch can be performed according to the response of any viewer that can be obtained from the viewer terminal 1. For example, the comment acquiring unit 312 acquires as an event that a predetermined area on the distribution video is clicked or tapped in the viewer terminal 1, and the switch determining unit 313 counts the number in which this event occurred (i.e., the number of viewers who clicked or tapped a predetermined area on the distribution video), and can switch the component video data depending on whether or not this number exceeds the threshold value. In this case, a video ID indicating the threshold value for the number of viewers clicked or tapped in a predetermined area on the distribution video image and the part video data to be switched according to the area may be registered as the condition information. When the distribution video is viewed in the web browser at the viewer terminal 1, the comment acquiring unit 312 may acquire the click event directly or via the streaming server 2 by transmitting the click event generated in the web browser to the streaming server 2 or the distributor device 3, and the click event may be stored in the comment storage unit 334. In this case, the comment acquiring unit 312 functions not only as a comment but also as an event acquiring unit for acquiring various events, and the comment storage unit 334 functions as an event storage unit for storing not only comments but also various events.

Further, the event acquiring unit acquires as an event the event that, for example, the viewer terminal 1 receives the captured voice data, analyzes the received voice data, and has a specific pronunciation (for example, a viewer has made a specific keyword, a clap, a whistle, a step, etc.) and the switch determining unit 313 can switch the video according to this event. In this case, on the condition that a specific pronunciation occurred, the condition information setting the next video ID different for each type of pronunciation may be registered in the condition storage unit 333. The audio analysis may be performed by the viewer terminal 1, and the event acquiring unit may receive the analysis result.

For example, the event acquiring unit receives rite image data captured by the viewer terminal 1, analyzes the received image data, recognizes the viewer's attitude, gaze, gesture, and the like, acquires these occurrences as events, and the switch determining unit 313 can switch the video according to this event. In this case, on the condition that a particular attitude, eye, or gesture is present, the condition information that sets the next video ID differently for the type of attitude, gesture, and the area on the video indicated by the destination of the eye may be registered in the condition storage unit 333. In addition, the event acquiring unit may receive the analysis result by performing the image analysis at due viewer terminal 1.

In addition, the event acquiring unit can acquire events that can be retrieved on the system, not events that occur in the viewer terminal 1, for example. Events that can be retrieved on the system may include, for example, the elapsed time from the start of delivery of the delivered image, the current time, the occurrence of an object collision on the delivered video, the location of the viewer or the distributor, or the occurrence of specific weather conditions in a predetermined area. The switch determining unit 313 can also switch videos in response to such events.

Fifth Embodiment

The video distribution system according to the fifth embodiment includes the following configuration.
[Item 1]
  A video distribution system comprising:
  a material library for storing asset data for generating video,
  a video distributing unit for transmitting the video based on the material data,
  an event acquiring unit for acquiring event information relating to a gaze from a viewer of the video during the playback of the video,
  an action processing unit that executes operation on the asset data according to the event information.
[Item 2]
  The video distribution system described in Item 1, wherein
  the event acquiring unit inquires an event that occur in the video distribution system:
  the action processing unit executes an operation on the asset data in response to the event.
[Item 3]
  The video distribution system described in Item 1, wherein:
  event information relating to viewing front the viewer includes information relating to viewing directed at a predetermined area in a playback video by the viewer.
[Item 4]
  The video distribution system described in Item 1, wherein:
  the action includes at least any of: appearance, movement and disappearance of an object, start and stop of an animation, playing and stopping a video, playing and stopping audio, and changing the material data.

Hereinafter, a video distribution system according to a fifth embodiment will be described. The video distribution system according to the fifth embodiment dynamically changes the streamed video according to various events.

Events include information obtained with respect to a viewer (hereinafter referred to as user event information) such as that the device was operated by the viewer, audio or text was entered by the viewer, the viewer was taken, the viewer's attitude, line of view, gestures, etc. were obtained from the analysed image, and the measurement data that measured the viewer's physical response was obtained. The event may also include information that can be obtained by the system side, such as the number of viewers viewed, weather, time, weather, or the contact of an object in a video (hereinafter referred to as system event information).

The video to be delivered is generated based on material data such as 3D model, video data, and audio data. Event-specific actions can be set for each asset data.

The action is an operation on asset data and can include the appearance, movement and disappearance of objects represented by the 3D model, initiation and termination of animation operations, playing and stopping video, playing and stopping audio, changing (replacing) asset data, and the like In a fifth embodiment, the video to be delivered is created by combining images or images output as a result of the action.

In the video distribution system according to the fifth embodiment, the distribution video can be dynamically changed by activating an action in response to an event. Details will be described below.

Figure 36:
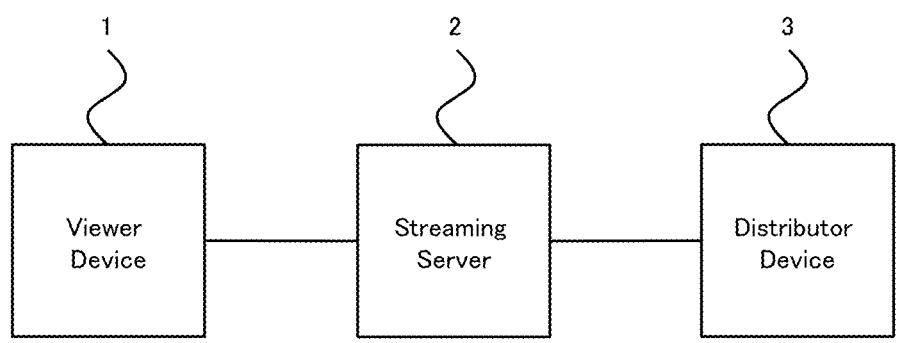
FIG. 36 is a figure illustrating an example of an overall configuration of a video distribution system according to the present embodiment.

FIG. 36 is a figure illustrating an example of the overall configuration of the video distribution system according to the fifth embodiment. The video distribution system of the fifth embodiment includes a distributor device 3, wherein the distributor device 2 is communicatively connected with the streaming server 2 and the streaming server 2 is communicatively connected with the viewer terminal 1. A large number of viewer terminals 1 may be connected. The distributor device 3 is a computer that transmits video, such as a personal computer, tablet computer, or smartphone. The distributor device 3 may be, for example, a home computer operated by a general user who wishes to distribute video. From the distributor device 3, video data is sent to the streaming server 2 by a streaming method. The streaming server 2 is a computer, such as a workstation, personal computer, or a virtual computer provided by cloud computing, that distributes video data received from the distributor device 3 to the viewer terminal 1. The streaming server 2 can deliver video data to one or mote viewer terminals 1 at the same time. The viewer terminal 1 is a computer operated by a viewer, such as a head mount display (HMD), a personal computer, a tablet computer, or a smartphone, but in the fifth embodiment, the HMD will be described with reference to the example. The viewer can access the streaming server 2 by operating the viewer terminal 1 and the attached (not shown) controller, and the viewer terminal 1 can receive and play video data transmitted from the streaming server 2. In addition, the viewer terminal 1 is capable of collecting various event information by taking pictures of the viewer, recording the audio of the viewer, and receiving comments from the viewer. Events from one or more viewers are collected at the streaming server 2, and the distributor device 3 may retrieve events from the viewer, for example, by calling an API (Application Programming Interface) provided by the streaming server 2.

In the following explanation, the entire video that is streamed and played linearly is referred to as the "distribution video." The distribution video may be a format in which images and sounds captured by a camera or a microphone are encoded and transmitted to video data in real time. However, in the filth embodiment, it is assumed that the distribution video is generated as video data combined with the material data.

Figure 37:
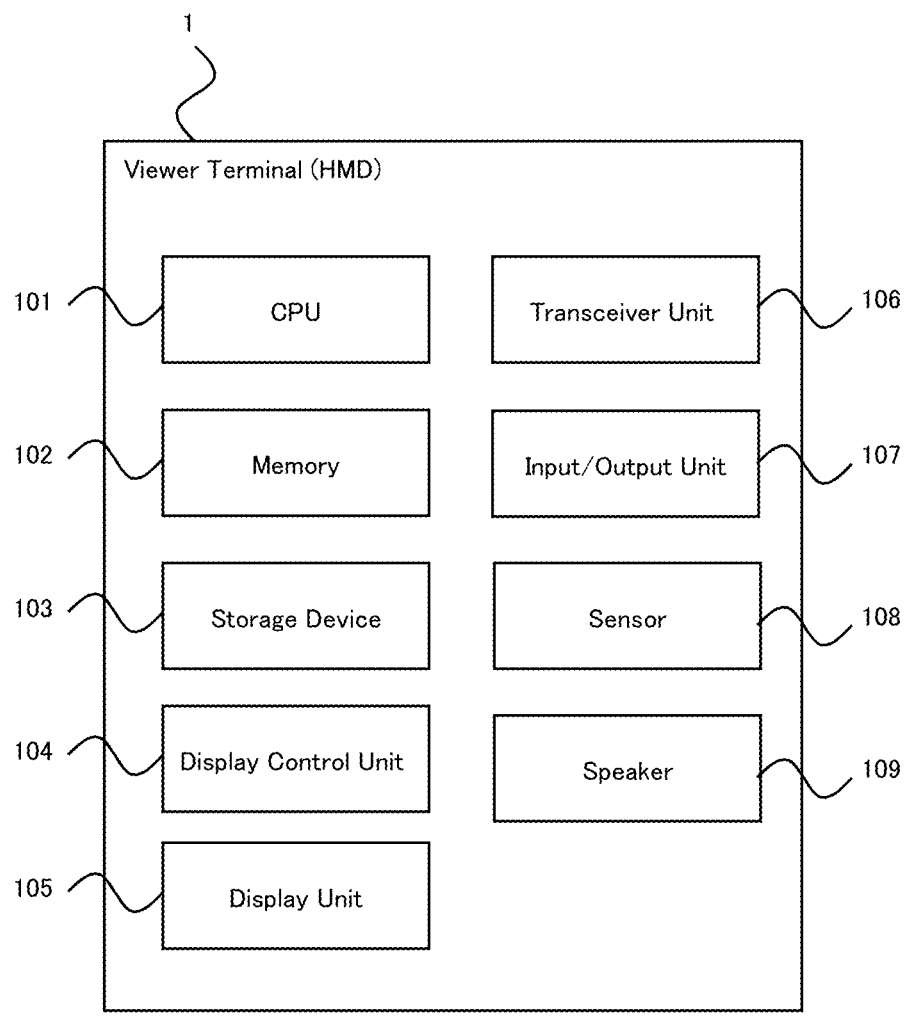
FIG. 37 is a figure illustrating an example of a hardware configuration of a viewer terminal 1.

FIG. 37 is a configuration figure of a head mount display (HMD).

As illustrated in FIG. 37, the HMD1 includes at least a control unit 101, a memory 102, a storage device 103, a display control unit 104, a display unit 105, a transceiver unit 106, an input/output unit 107, and the like, which are electrically connected to each other through a bus (not shown).

The control unit 101 is an arithmetic unit that controls the operation of the entire HMD1 and controls the transmission and reception of data between each element, and performs information processing necessary for executing an application related to game processing and authentication processing. For example, the control unit 101 is a CPU (central processing unit) and is stored in the storage device 103, and performs information processing by executing a program, etc. deployed in the memory 102.

The memory 102 includes a main memory comprised of a volatile storage device such as DRAM (Dynamic Random Access Memory) and an auxiliary memory comprised of a non-volatile storage device such as a flash memory or a hard disk drive (HDD). The memory 102 is used as a work area of the CPU 101 and stores the basic input/output system (BIOS) executed when the streaming server 2 or the distributor device 3 is started, and various configuration information.

The storage device 103 stores various programs, such as application programs. A database (not shown) containing the data used in each process may be constructed in the storage device 103.

The display control unit 104 is, for example, a GPU (Graphics Processing Unit) and primarily performs calculation processing pertaining to image processing. The display control unit 104 combines the content data, such as a character, generated by the CPU 101 with the images of various objects to generate a virtual space image that forms a virtual space.

The display unit 105 displays the virtual space image based on the image signal input from the display control unit 104. The display unit 105 is, for example, a display such as an LCD or an organic EL. A left-eye image and a right-eye image are displayed on the display portion 105, and a three-dimensional image can be provided to the user by utilizing the difference of views of both eyes. If left- and right-eye images can be displayed, a left-eye display and a right-eye display can be provided separately, and an integrated display for left-eye and right-eye can be provided.

The transceiving unit 106 connects the HMD1 to the network. The transceiving unit 106 may include a Bluetooth (registered trademark) and a Bluetooth Low Energy short distance communication interface. The transceiving unit 106 receives an indication signal from the controller (not shown) via the network.

The I/O unit 107 is an interface for input/output of image signals, sound signals, etc., when an image producing device or a display device, etc., is provided externally.

In addition, the HMD1 may comprise a sensor 108. The sensor may comprise, for example, a magnetic sensor, an acceleration sensor, or a gyro sensor, or a combination thereof, to detect movements such as the orientation or tilt of the user's head. The acceleration sensor detects acceleration (change in speed per unit time). In this, the acceleration sensor can detect acceleration in the 3 axial direction (x, y, z direction). For example, if the forward/backward direction of the HMD is the x-axis, the left/right direction is the y-axis, the upward/downward direction is the z-axis, the forward direction is the x-axis positive, the left direction is the y-axis positive, and the downward is the z-axis direction, the acceleration sensor 30 detects the acceleration in each direction, and also detects the rotation angle around the x-axis (roll angle), the rotation angle around the y-axis (pitch angle), and the rotation angle around the z-axis (yaw angle).

In addition, or in place of the sensor 108, the HMD1 may comprise a plurality of light sources (e.g., infrared light LEDs, visible light LEDs) that are not shown, and cameras (e.g., infrared light cameras, visible light cameras) located outside the HMD1 (e.g., indoors, etc.) can detect the position, orientation, and tilt of the HMD1 in a particular space by detecting these light sources. Alternatively, for the same purpose, the HMD1 may be provided with a camera for detecting a light source mounted on the HMD1.

In addition, the HMD1 may include an eye tracking sensor. The eye tracking sensor is used to detect the user's left and right eye gaze directions and gaze. There are various types of eye tracking sensors. For example, the position of reflected light on the cornea, which can be irradiated with infrared light that is weak m the left eye and right eye, is used as a reference point, the position of the pupil relative to the position of reflected light is used to detect the direction of the eye line, and the intersection point in the direction of the eye line in the left eye and right eye is used as a locus point.

Furthermore, the speaker 109 outputs a sound signal, such as music data, input from the sound producing unit (not shown).

The HMD1 can execute an application and transmit and receive data while cooperating with an external processing device such as a server or an image processing device, and can function as a stand-alone device that executes a built-in program as an HMD unit without depending on the external processing device.

Figure 38:
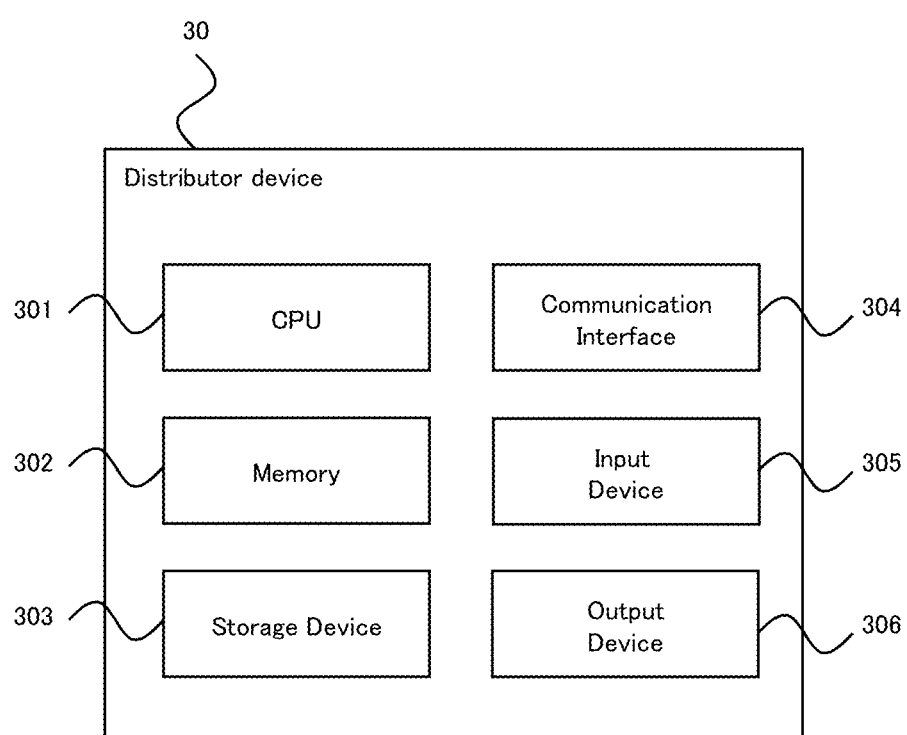
FIG. 38 is a figure illustrating an example of a hardware configuration of a distributor device 3.

FIG. 38 is a figure illustrating an example of a hardware configuration of the distributor device 3. The distributor device 3 includes a CPU 301, a memory 302, a storage device 303, a communication interface 304, an input device 305, and an output device 306. The storage device 303 may be, for example, a hard disk drive, a solid state drive, a flash memory, or the like, for storing various types of data or programs. The communication interlace 304 is an interlace for connecting to the communication network 30, such as an adapter for connecting to an Ethernet (registered trademark), a modem for connecting to a public telephone network, a w ireless communication device for performing wireless communication, a USB (Universal Serial Bus) connector for serial communication, or an RS232C connector. The input device 305 may be, for example, a keyboard or mouse, a touch panel, a button, a microphone, or the like, for inputting data. The output device 306 may be, for example, a display, a printer, a speaker, or the like, which outputs data.

Figure 39:
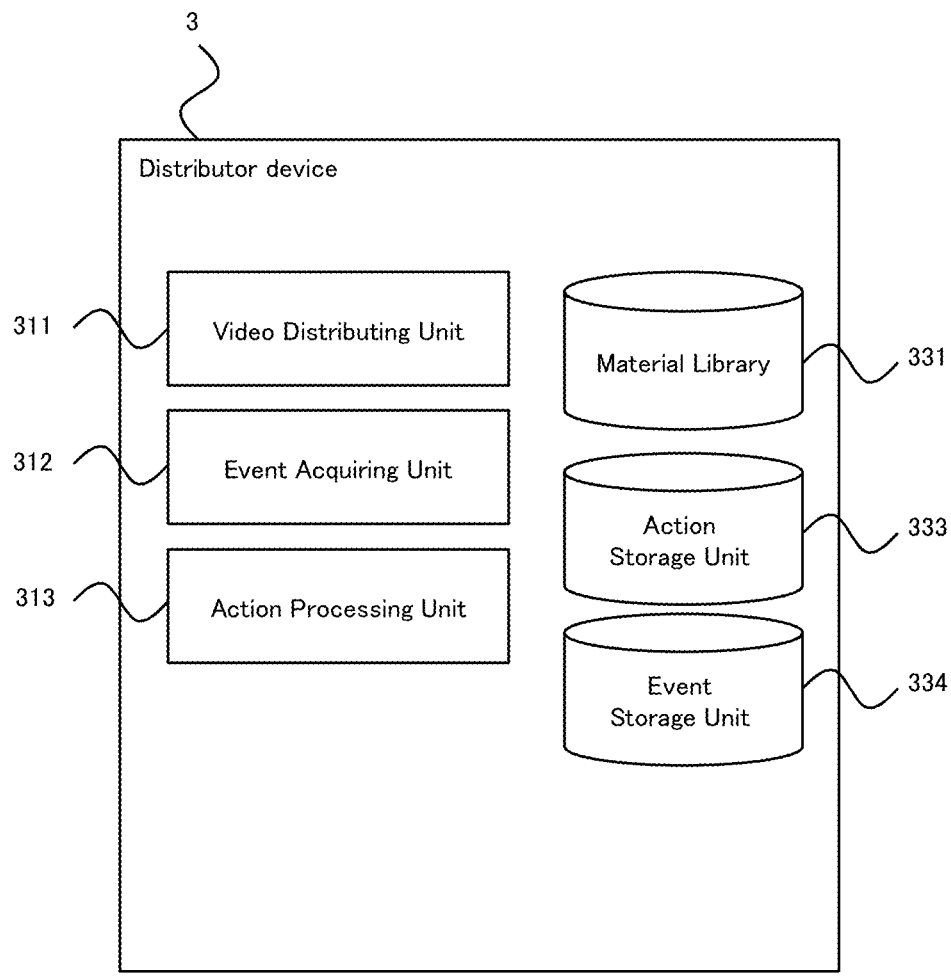
FIG. 39 is a figure illustrating an example of a software configuration of a distributor device 3.

FIG. 39 is a figure illustrating an example of a software configuration of a distributor device 3. As illustrated in the figure, the distributor device 3 includes a video distributing unit 311, an event acquiring unit 312, an action processing unit 313, a material library 331, an action storage unit 333, and an event storage unit 334.

The video distributing unit 311, the event acquiring unit 312, and the action processing unit 313 are realized by reading and executing a program stored in the storage device 303 to the memory 302. The material library 331, the action storage unit 333, and the event storage unit 334 are realized as part of a storage area provided by at least one of the memory 302 provided by the distributor device 3 and the storage device 303.

The material library 331 stores various types of data (asset data) that can be incorporated into the video. Material data may be, for example, a 3D model, a still image, a moving image, voice data, MIDI data, character data, and the like. FIG. 40 is a figure illustrating a structural example of a material library 331. As shown in the figure, the material library 331 corresponds to information (material ID) for identifying the material data and stores various types of material data.

The action storage unit 333 stores information (hereinafter referred to as the action information) concerning the operation (action) of the material data. FIG. 41 is a figure illustrating an example of an action information stored in an action storage unit 333. As shown in the figure, the action information includes an action ID indicating the action, a determining period, a condition, and an action.

The determining period is an information indicating the period of time for determining whether an event meets the conditions. The determining period may be specified relative to, for example, five minutes before the current time or absolutely from 00:00 to 00:10 on December 25th.

The condition may be for an event, e.g., the presence or absence of an event, or the aggregation of events from multiple viewers may or may not exceed the threshold.

For user event information, for example, a viewer may direct his or her eyes to a predetermined area on the video while playing a distribution video, or the number of viewers who direct their eyes to a predetermined area on the video may or may not exceed the threshold value. Based on the material data used to generate the distribution video, it may be conditional on whether the number of viewers turning their eyes to the object displayed during the distribution video or viewing the object exceeds the threshold. Determination of the viewer's focus on a given area or object on the video can be based on the viewer's head position, orientation, and/or a combination of eye tracking sensors or various sensors mounted on the HMD.

In addition, instead of HMD, image analysis can be used to recognize viewers' attitudes, gaze, gestures, etc., and to determine whether the viewer has performed the predetermined posture, gaze, or gesture, whether the predetermined posture, gaze, or the number of viewers who have gestured exceeds the threshold. In this case, the image analysis processing may be performed by the viewer terminal 1 and the analysis result is transmittal to the streaming server 2 or the distributor device 3, or the image data captured from the viewer terminal 1 may be transmitted to the distributor device 3 via the streaming server 2 or directly to the distributor device 3 and image analysis processing may lie performed in the distributor device 3.

For system event information, for example, the number of viewers viewing the delivered image may be conditional on whether the number of viewers exceeds the threshold. It is also possible to make it a condition that a predetermined time has elapsed from the playback of the distributed image. In addition, when the weather in the location of the viewer of the distributor or in a given area is obtained as system event information, the conditions may be such as whether the weather is a predetermined weather (e.g., clear, rain, snow, wind of a strength greater than a predetermined temperature, etc.). In addition, when the material data is a 3D model or the like, the condition may be that the object collided in the delivered video.

The action is a variety of operations on the asset data, as described above. The action can also contain parameters and can be set in detail what specific operations are to be performed on the asset data. In still a fifth embodiment, the action may include processing such as executing or stopping other actions, waiting for the execution of other actions to be completed, as well as manipulating the asset data. The action can also be stored, for example, as programs written in scripting languages.

The video distribution unit 311 distributes video. Multiple actions may be executed by an action. The video distribution unit 311 can synthesize the output from the action performed by the action processing unit 313, which wilt be described later (encoded as needed), and generate the distribution video. Further, the video distribution unit 311 can distribute the video to the viewer terminal 1 by transmitting the generated distribution video to the streaming server 2.

Figure 42:
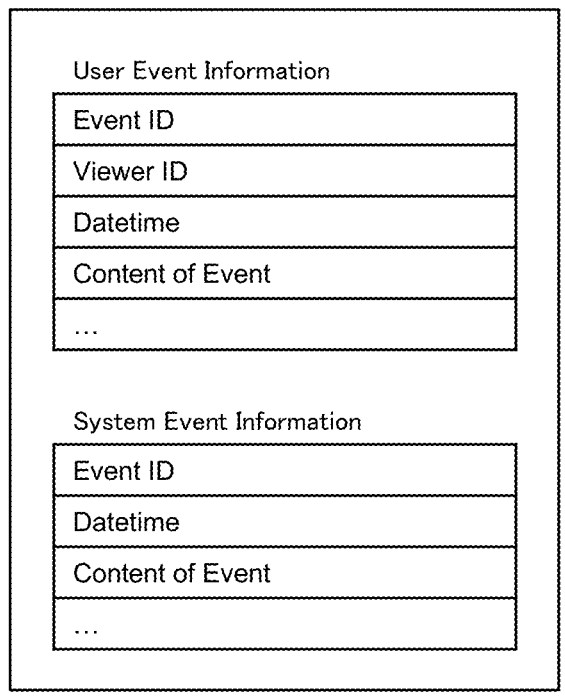
FIG. 42 is a figure illustrating an example of a configuration of an event storage unit 334.

The event storage unit 334 stores various events that have occurred. FIG. 42 is a figure illustrating an example of a configuration of an event storage unit 334. As described above, the event storage unit 334 stores the user event information and the system event information. Hereinafter, user event information and system event information are collectively referred to as event information. User event information includes the event ID representing the event, the viewer ID representing the viewer of the event, the datetime the event occurred, and the content of the event. The system event information includes the event ID, the date and time the event occurred, and the content of the event. The content of the event varies depending on the event. For example, in the case of user event information, when the target area on the video is viewed during playback of the distribution video, information to that effect can be set as event content. One or more areas may be considered as predetermined areas. In addition, when the viewer terminal 1 analyzes the image captured by the viewer and obtains the gaze or gesture of the viewer, information indicating these gazes or gestures can be set as the content of the event. For system event information, the number of viewers, weather, time, etc. can be set as event content.

The event acquiring unit 312 acquires an event and registers the content of the acquired event as event information in the event storage unit 334. The event acquiring unit 312 acquires what events can be set by the user. Setting information indicating what event to acquire may be stored, for example, in memory 302 or storage device 303.

For example, the event acquiring unit 312 may register information on the viewers gaze position in the played video as user event information. For example, when a distribution video is viewed via an HMD, information of either the attitude, tilt, or the viewpoint of the viewer's head that can be obtained through the sensor of the HMD is transmitted to the streaming server 2 or the distributor device 3, and the event acquiring unit 312 analyzes the received information, determines whether or not the viewing is directed to a predetermined area of the played video, and registers the event. Alternatively, the above analysis can be performed on the viewer terminal 1 (HMD), and the information can be received as information about the gaze position in the played video, and the information can be registered as an event.

In addition, the event acquiring unit 312 may receive an image captured by a viewer from the viewer terminal 1, analyze the received image, and acquire the viewer's attitude, gaze, gesture, or the like. Alternatively, the image can be analyzed at the viewer terminal 1 to receive the results. The event acquiring unit 312 may register the number of viewers in the system event information by periodically counting the number of viewers. The event acquiring unit 312 may receive the analysis result directly from the viewer terminal 1 or through the streaming server 2 and register the analysis result as the user event information, such that the image analysis processing is performed by the viewer terminal 1 (HMD).

For example, the event acquiring unit 312 can register as system event information that a predetermined time has elapsed since the start of playback of the distributed image by acquiring a time-out event from a clock. The event acquiring unit 312 can also register a predetermined time (e.g., a date has changed, a date has reached 3:00 p.m.) as system event inhumation.

The event acquiring unit 312 may, for example, acquire weather information from a server of a weather company and register weather elements in a specific region (e.g., the location of each viewer or the location of a distributor, or a predetermined region) as system event inhumation.

For example, when the material data is a 3D model or the like, the event acquiring unit 312 can determine that an object has collided in the distribution video and register it as system event information.

The action processing unit 313 performs an action on the material data. The action processing unit 313 receives the designation of the first action to be executed and executes the received action. In this case, the action processing unit 313 can continue to start the action sequentially because some of the actions may include the activation of other actions. It should be noted that the action can be executed in parallel by branching multiple times.

The action processing unit 313 also executes an action corresponding to an event. The action processing unit 313 reads out and aggregates event inhumation corresponding to the period from the event storage unit 334 with respect to each of the action information stored in the action storage unit 333, determines whether or not the condition is satisfied, and executes an action set to the action information when the condition is satisfied. This makes it possible to dynamically change the deployment of the video according to the event.

Figure 43:
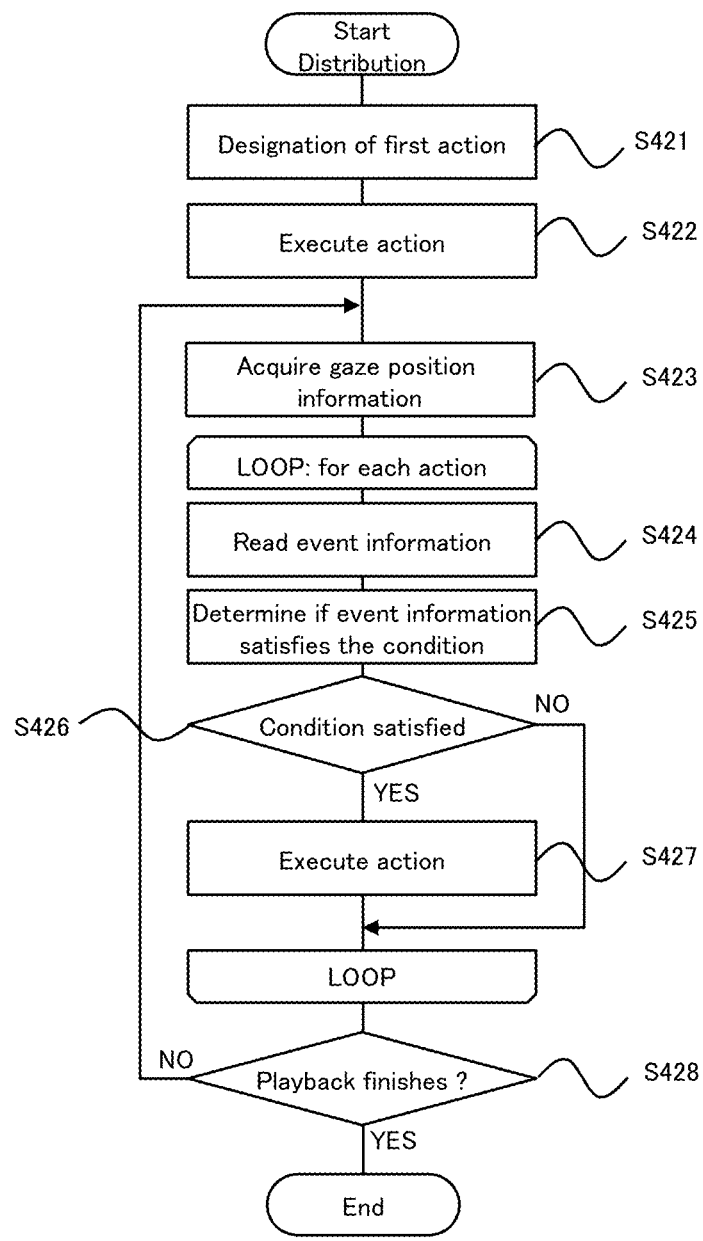
FIG. 43 is a figure illustrating a flow of processing executed by the video distribution system according to the present embodiment.

FIG. 43 is a figure illustrating a flow of a process performed by the video distribution system according to the fifth embodiment.

The action processing unit 313 accepts the designation of the first action to be executed (S421) and executes the specified action (S422). The video and audio output as a result of the action being executed are synthesized and transmitted to the streaming server 2 by the video distributing unit 311 as video data.

The event acquiring unit 312 periodically acquires information about the viewer's gaze position (S423). For example, by invoking the API provided by the streaming server 2, the event acquiring unit 312 can acquire information on the attitude, tilt, and locus of the viewer's head that can be obtained through the sensor of the HMD as a parameter. The event acquiring unit 312 can determine whether or not a viewer directs a gaze to a predetermined area of the played video based on the received parameter and register the viewing unit as an event. The event acquiring unit 312 can acquire that a predetermined time has elapsed using a timer function.

With regard to each action information stored in the action storage unit 333, the action processing unit 313 reads event information of the datetime within the determining period from the event storage unit 334 (S424) and determines whether the event content of the read event information satisfies the condition of the action information (S425).

When the event satisfies the condition (S426:YES), the action processing unit 313 executes the action included in the action information (51427). Here, the action processing unit 313 may stop the previously executed action, execute a new action in parallel with the previously executed action, or specify this behavior in the new action. For example, when a viewers gaze is directed to a predetermined area of a playback video or when the number of viewers directed to that area exceeds a predetermined number of viewers, the corresponding scene may be delivered if the material data of the video corresponding to that area (e.g., a particular scene of a video) is mapped and stored, i.e., the event meets the action condition. Alternatively, tor example, when a plurality of characters are included in an image of a distribution video, the viewer's gaze may be detected focusing on a particular character and the scene focused on that character may be branched and distributed.

If the action information action does not terminate the distribution video (S428), the process from Step S423 is repeated.

As described above, the video distribution system according to the fifth embodiment can distribute the distribution video to the viewer terminal 1 via the streaming server 2, and change lire distribution video during playback according to the viewer's viewing position during playback of the distribution video. Accordingly, it is possible to add various developments to the distribution video in response to the response of the viewer while using the recorded video, and it is possible to distribute the video without compromising the live feeling of the video by the method of distributing the video in a streaming format. In particular, viewers have the habit of gazing naturally at people and objects of their own interest during viewing video, and instead of explicitly manipulating video, viewers can branch and deploy video streams as natural flows.

Although the fifth embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in the present embodiment, it is assumed that the video transmitted from the distributor device 3 is distributed to the viewer terminal 1 via the streaming server 2, but it is also possible to distribute the video directly from the distributor device 3 to each viewer terminal 1.

Further, in the present embodiment, even while the video is being played, if the comment satisfies the condition, it is set to transition to the next part video data (step S427 of FIG. 42). However, the current action may be executed until the end, and then the next action may be executed.

Sixth Embodiment

The video distribution system according to the sixth embodiment includes the following configuration.
[Item 1]
A video distribution system comprising:
  a material library for storing asset data for generating video;
  a video distribution unit for transmitting the video based on the material data;
  a reaction acquiring unit that acquires reaction information indicating a reaction from a viewer of the video during the video playback;
  an action processing unit that executes an operation on the asset data according to the reaction information;
  a group setting unit that divides the viewer into two or more groups according to the reaction information,
  wherein:
  after the viewer is divided into the group, the action processing unit performs the operation differently according to the group to which the viewer belongs.
[Item 2]
The video distribution system described in Item 1, further comprising:
  a group storage unit for storing information indicative of the viewer corresponding to the acquired response information and the group to which the viewer belongs;
[Item 3]
A video distribution system described in Items 1 or 2, further comprising:
  a response history storage unit corresponding to information identifying the viewer and managing information indicative of said response from said viewer,
  wherein: a character is drawn in the video, and the video relates to a paper-rock-scissors;
  the response is the hand of the paper-rock-scissors from the viewer;
  the group setting unit classifies the viewer into the first group that won against the character and the second group that lost against the character; and
  the action processing unit performs the above-described operation only in response information from the viewer belonging to the first group.
[Item 4]
The video distribution system described in Item 3, wherein:
  the action processing unit performs the operation on the asset data for outputting an image for ending the keys when the number of viewers belonging to the first group becomes less than a predetermined number.
[Item 5]
The video distribution system described in item 4, further comprising:
  A toward processing unit shall lie provided for providing rewards to the aforementioned viewers who belong to the aforementioned first group when the aforementioned video to terminate the token is played back.

Hereinafter, a video distribution system according to a sixth embodiment will be described. The video distribution system according to the sixth embodiment dynamically changes the streamed video according to various events.

The event includes information obtained with respect to a viewer (hereinafter referred to as User Event Information) such as that the device was operated by the viewer, audio or text was entered by the viewer, the viewer was taken, the viewer's attitude, line of view, gestures, etc. were obtained from the analyzed image, and the measurement data that measured the viewer's physical response was obtained. The event may also include information that can be obtained by the system side, such as the number of viewers viewed, weather, time, weather, or the contact of an object in a video (hereinafter referred to as system event information).

The video to be delivered is generated based on material data such as 3D model, video data, and audio data. Event-specific actions can be set tor each asset data.

The action is an operation on asset data and can include the appearance, movement and disappearance of objects represented by the 3D model, initiation and termination of animation operations, playing and stopping video, playing and stopping audio, changing (replacing) asset data, and the like. In a sixth embodiment, the video to be delivered is created by combining images or images output as a result of the action.

In the video distribution system according to the sixth embodiment, the distribution video can be dynamically changed by activating an action in response to an event. Details will be described below.

Figure 44:
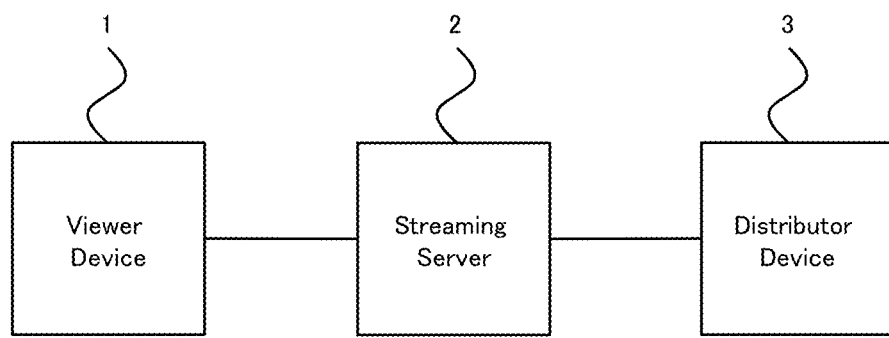
FIG. 44 is a figure illustrating an example of an overall configuration of a video distribution system according to the present embodiment.

FIG. 44 is a figure illustrating an example of the overall configuration of the video distribution system according to the sixth embodiment. The video distribution system of the sixth embodiment includes a distributor device 3, wherein the distributor device 3 is communicatively connected with the streaming server 2 and the streaming server 2 is communicatively connected with the viewer terminal 1. A large number of viewer terminals 1 may be connected. The distributor device 3 is a computer that transmits video, such as a personal computer, tablet computer, or smartphone. The distributor device 3 may be, for example, a home computer operated by a general user who wishes to distribute video. From the distributor device 3, video data is sent to the streaming server 2 by a streaming method. The streaming server 2 is a computer, such as a workstation, personal computer, or a virtual computer provided by cloud computing, that distributes video data received from the distributor device 3 to the viewer terminal 1. The streaming saver 2 can deliver video data to one or more viewer terminals 1 at the same time. The viewer terminal 1 is a computer operated by a viewer, such as a personal computer, a tablet computer, or a smartphone. The viewer can access the streaming server 2 by operating the viewer terminal 1, and the viewer terminal 1 can receive and play back video data transmitted from the streaming server 2. In addition, the viewer terminal 1 is capable of collecting various event information by taking pictures of the viewer, recording the audio of the viewer, and receiving comments from the viewer. Events from one or more viewers are collected at the streaming server 2, and the distributor device 3 may retrieve events from the viewer, for example, by calling an API (Application Programming Interface) provided try the streaming server 2.

In the following explanation, the entire video that is streamed and played linearly is referred to as the "distribution video." The distribution video may be a format in which images and sounds captured by a camera or a microphone are encoded into video data in real time and transmitted. However, in the sixth embodiment, it is assumed that the distribution video is generated as video data combined with the material data.

In the video distribution system of the sixth embodiment, it is assumed that a pseudo-paper-rock-scissors is performed as an example. In a sixth embodiment, a character appears in the distribution video, and the keys are made between the character and a large number of viewers. The ultimate winner of the light is rewarded. The reward may be optional, for example, for points, gill certificates, electronic money, virtual currencies, rights to use the work, rights to use the item in game services, and the like.

Figure 45:
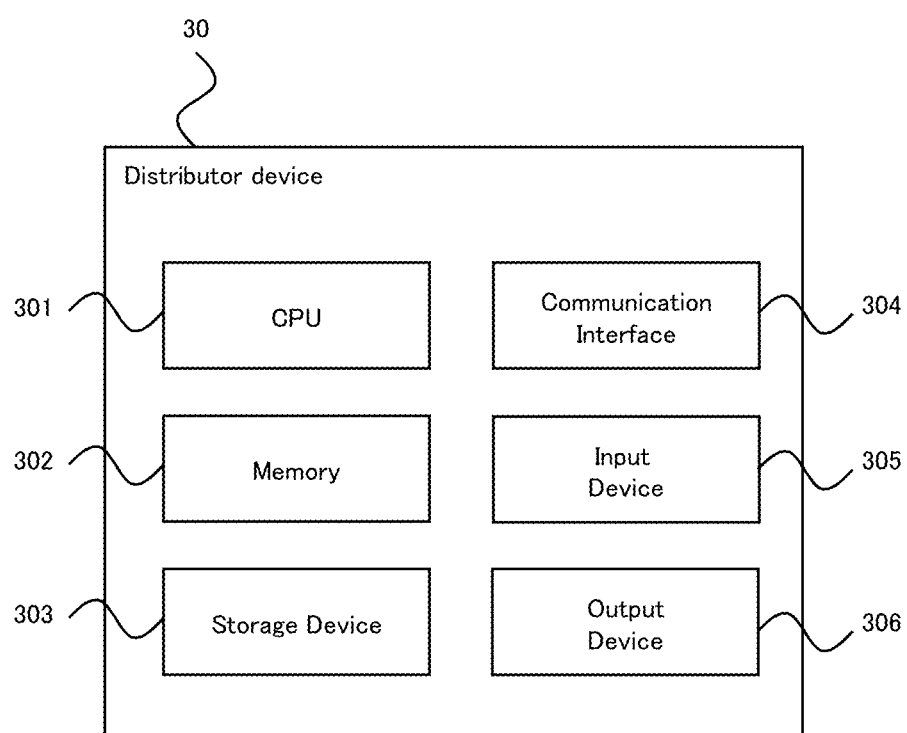
FIG. 45 is a figure illustrating an example of a hardware configuration of a distributor device 3.

FIG. 45 is a figure illustrating an example of a hardware configuration of a distributor device 3. The distributor device 3 includes a CPU 301, a memory 302, a storage device 303, a communication interface 304, an input device 305, and an output device 306. Storage device 303 may be, for example, a hard disk drive, a solid state drive, a flash memory, or the like, for storing various types of data or programs. The communication interface 304 is an interface for connecting to the communication network 30, such as an adapter for connecting to an Ethernet (registered trademark), a modem for connecting to a public telephone network, a wireless communication device for performing wireless communication, a USB (Universal Serial Bus) connector for serial communication, or an RS232C connector. The input device 305 may be, for example, a keyboard or mouse, a touch panel, a button, a microphone, or the like, for inputting data. The output device 306 may be, for example, a display, a printer, a speaker, or the like, which outputs data.

Figure 46:
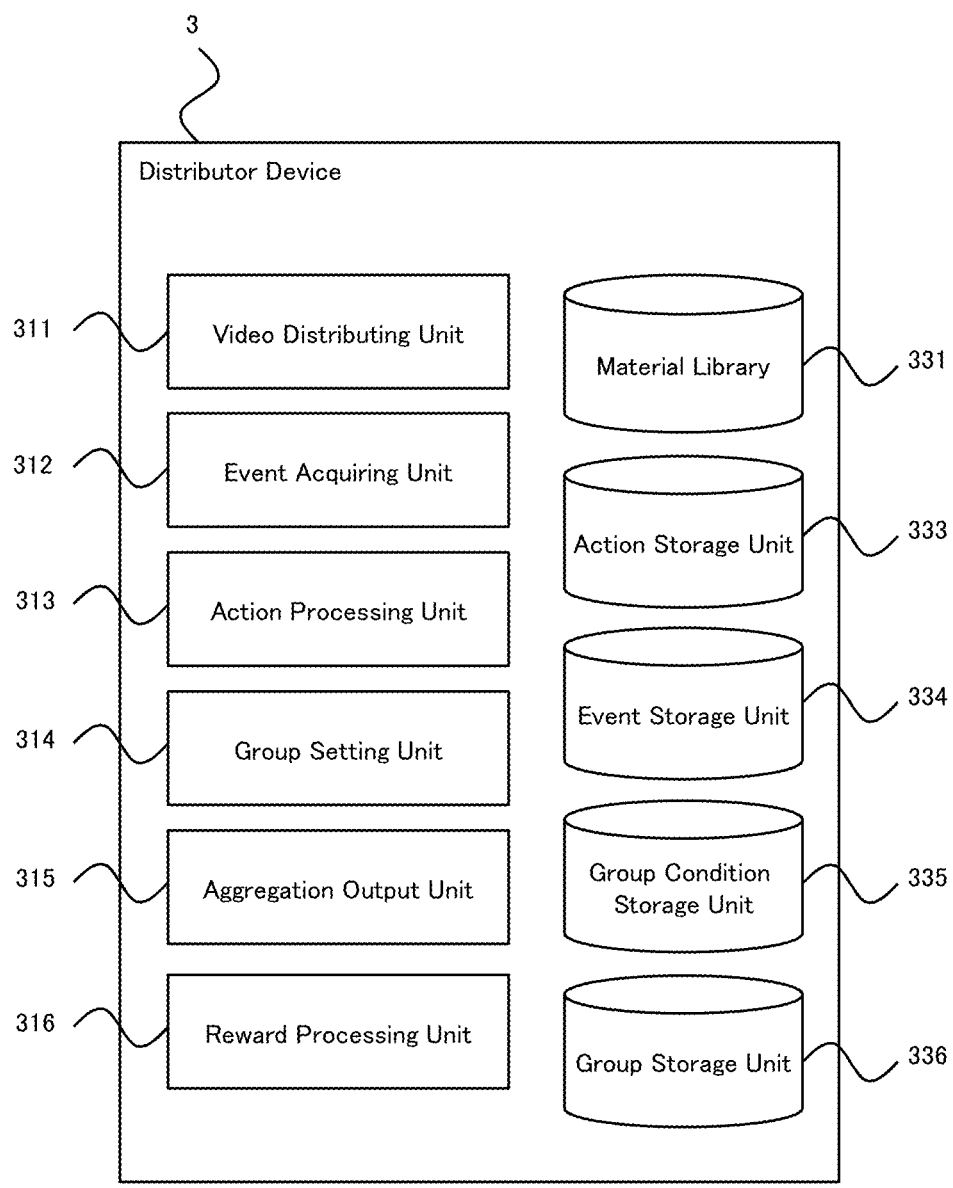
FIG. 46 is a figure illustrating an example of a software configuration of a distributor device 3.

FIG. 46 is a figure illustrating an example of a software configuration of a distributor device 3. As illustrated in the figure, the distributor device 3 includes a processing unit of the video distributing unit 311, the event acquiring unit 312, the action processing unit 313, the group setting unit 314, the aggregation output unit 315, and the reward processing unit 316, and a storage unit of the material library 331, the action storage unit 333, the event storage unit 334, the group condition storage unit 335, and the group storage unit 336.

The above-described processing units are realized by the CPU 301 provided by the distributor device 3 reading and executing a program stored in the storage device 303 to the memory 302, and the above-described storage units are realized as part of a storage area provided by at least one of the memory 302 provided by the distributor device 3 and the storage device 303.

Figure 47:
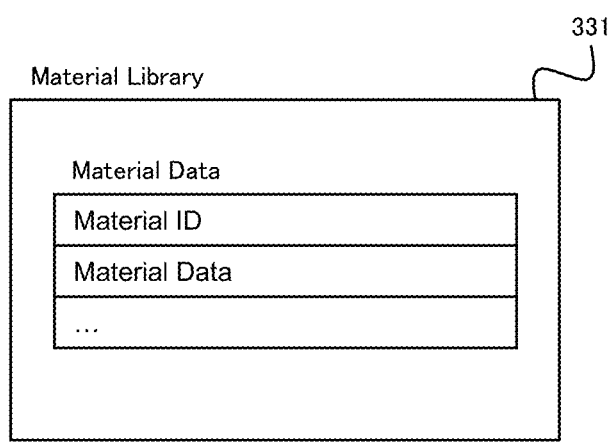
FIG. 47 shows a structural example of a material library 331.

The material library 331 stores various types of data (asset data) that can be incorporated into the video. The material data may be, for example, a 3D model, a still image, a moving image, voice data, MIDI data, character data, and the like. FIG. 47 is a figure illustrating a structural example of a material library 331. As shown in the figure, the material library 331 stores, corresponding to information (material ID) for identifying the material data, various types of material data. In the sixth embodiment, it is assumed that the character will play a paper-rock-scissors with a large number of viewers, and the data asset library 331 is registered such as a material for illustrating a scene in which the character explains how to proceed, rules, rewards to the winner, etc., a material for rendering a scene in which the viewer indicates the timing of giving a hand, a material for rendering a scene indicating the outcome of a dance, a material for rendering a scene in which the dance declares to continue, a material for rendering a scene in which the paper-rock-scissors declares to terminate, etc.

Figure 48:
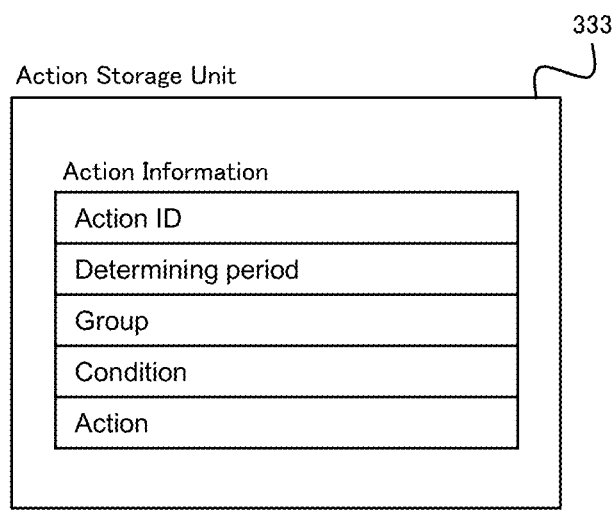
FIG. 48 is a figure illustrating an example of a configuration of an action storage unit 333.
Figure 49:
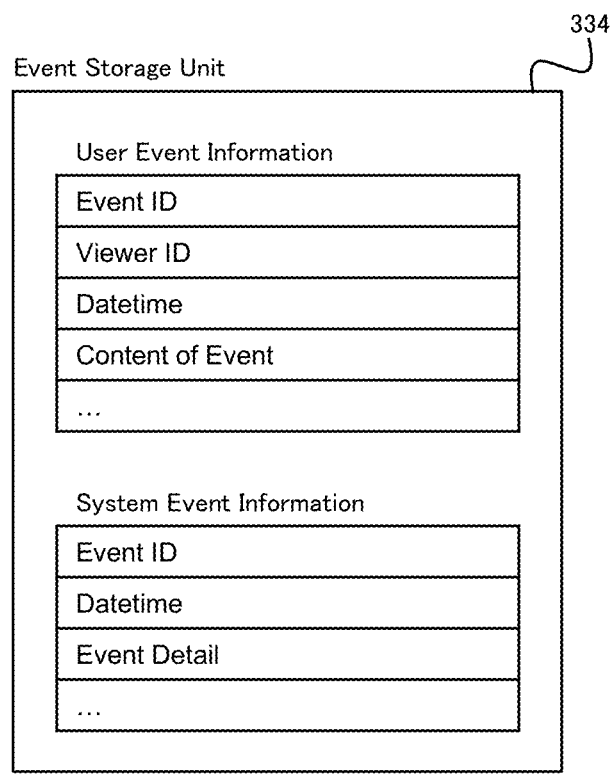
FIG. 49 is a figure illustrating an example of a configuration of an event storage unit 334.

The action storage unit 333 stores information (hereinafter referred to ns the action information) concerning the operation (action) of the material data. FIG. 48 is a figure illustrating an example of an action information stored in an action storage unit 333. As shown in the figure, the action information includes an action ID representing the action, a determining period, a group, a condition, and an action.

The determining period is an information indicating the period of time for determining whether an event meets the conditions. The determining period may be specified relative to, for example, five minutes before the current time or absolutely from 00:00 to 00:10 on December 25th. It may also be an action specification and the time at which the action was executed (e.g., 10 seconds from the start of the action, 10 seconds from the end of the action, etc.). The length of the determining period can be any time, e.g., 1 second, 1 minute, 1 hour, 1 day, etc.

The group indicates the group to which the viewer belongs. If a group is set in the action information, only event information pertaining to the viewer belonging to the set group is judged whether or not the conditions described below are met. For example, if you make a token between the character in the video being delivered and the viewer, the second and subsequent trials may be added subject to being a user event from the viewer belonging to the winner group, in addition, the group may be omitted and the conditions described below may include the condition that the viewer belongs to a particular group.

The condition may be for an event, e.g., the presence or absence of an event, or the aggregation of events from multiple viewers may or may not exceed the threshold.

For user event information, for example, a condition may be whether the viewer pressed a predetermined key during playback of the distribution video, clicked or tapped a predetermined area on tire video, or whether the number of viewers clicked or tapped a predetermined area on the video exceeded the threshold value. Based on the material data used to generate the delivered video, it may also be conditional on whether an object displayed during the delivered video is clicked or tapped, and whether the number of viewers clicked or tapped on the object exceeds the threshold.

In addition, the condition may be whether the viewer terminal 1 has entered a predetermined character (keyword) from the viewer, for example, whether the comment submitted to the distribution video contains a predetermined keyword, or whether the number of viewers who entered the keyword exceeds the threshold value. It may also be conditional on the number of comments or viewers who submitted comments by region, e.g., the aggregate amount (mean, median, maximum, minimum, etc.) submitted by the viewer in response to the viewer's inquiry about the amount in the video, the number of viewers who are sad based on the feelings of the viewer as determined by the text analysis, etc., exceeding a predetermined threshold, or the viewer has never submitted comments containing a predetermined keyword.

Alternatively, the speech recognition may be performed on the viewer's or viewer's atmosphere, for example, whether or not a particular speech has been made, whether or not a clap, whistle, footsteps, or the like has been made, whether or not a particular speech has been made, and whether or not the number of viewers with such a particular speech has exceeded the threshold. In this case, the speech recognition processing may be performed by the viewer terminal 1 and the recognition result may be transmitted to the streaming server 2 or the distributor device 3, or the audio data captured from the viewer terminal 1 may be transmitted from the viewer terminal 1 via the streaming server 2 or directly to the distributor device 3 and the voice recognition processing may be performed at the distributor device 3.

It is also possible to determine whether a viewer has taken an image or an atmosphere of a viewer at the viewer terminal 1, whether such an image has been posted to the streaming server 2, and whether the number of viewers who submitted the image exceeds the threshold. Image analysis can also be used to determine whether an image (e.g., a particular signboard or flyer photographed around a viewer) has been posted or whether the number of viewers who submitted such an image exceeds the threshold. In addition, image analysis can be used to recognize the attitude, gaze, gesture, etc. of the viewer and to determine whether or not the viewer has performed the predetermined posture, gaze, or gesture, whether or not the predetermined posture or gaze, and whether or not the number of viewers who have made the gesture exceeds the threshold. In this case, the image analysis processing may be performed by the viewer terminal 1 and the analysis result is transmitted to the streaming server 2 or the distributor device 3, or the image data captured from the viewer terminal 1 may be transmitted to the distributor device 3 via the streaming server 2 or directly to the distributor device 3 and image analysis processing may be performed in the distributor device 3.

For system event information, for example, the number of viewers viewing the delivered image may be conditional on whether the number of viewers exceeds the threshold. It is also possible to make it a condition that a predetermined time has elapsed from the playback of the distributed image. In addition, when the weather in the location of the viewer or the distributor or in a given area is obtained as system event information, the conditions may be such as whether the weather is a predetermined weather (e.g., clear, rain, snow, wind of a strength greater than a predetermined temperature, etc.). In addition, when the material data is a 3D model or the like, the condition may be that the object collided in the delivered video.

The action is a variety of operations on the asset data, as described above. The action can also contain parameters and can be set in detail what specific operations are to be performed on the asset data. In still a sixth embodiment, the action may include processing such as executing or stopping other actions, waiting for the execution of other actions to be completed, as well as manipulating the asset data. Actions can also be stored, for example, as programs written in scripting languages.

The event storage unit 334 stores various events that have occurred. MG. 49 is a figure illustrating an example of a configuration of an event storage unit 334. As described above, the event storage unit 334 stores the user event information and the system event information. Hereinafter, user event information and system event information are collectively referred to as event information. User event information includes the event ID representing the event, the viewer ID representing the viewer of the event, the date and time the event occurred, and the content of the event. The system event information includes the event ID, the date and time the event occurred, and the content of the event. The content of an event depends on the event, for example, in the case of user event information, when a viewer submits a comment to a distribution video, the submitted comment may be set as event content. In addition, when the viewer terminal 1 analyzes the image captured by the viewer and obtains the gaze or gesture of the viewer, information indicating these gazes or gestures can be set as the content of the event. For system event information, the number of viewers, weather, time, etc. can lie set as event content.

Figure 50:
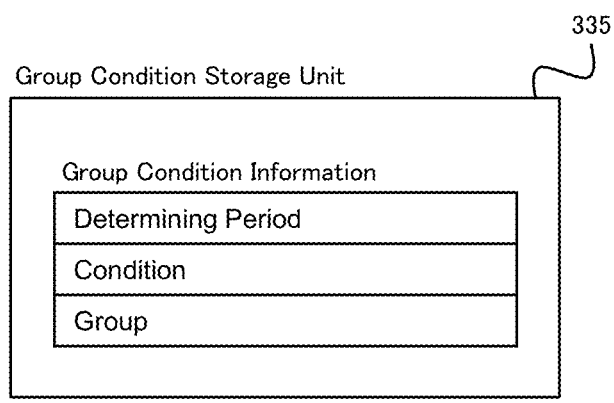
FIG. 50 is a figure illustrating an example of a configuration of a group condition storage unit 335.

The condition storage unit 335 stores a condition for grouping viewers (hereinafter referred to as the group condition information). FIG. 50 is a figure illustrating an example of a configuration of a group condition storage unit 335. Group condition information includes a determining period, a condition and a group. The determining period is information indicating the period during which the group is to be divided. The determining period may be, for example, the start and end dates, as well as the determining period for the action information described above, or it may be the specification of the action and the time at which the action was executed (e.g., 10 seconds from the start of the action, 10 seconds from the end of the action, etc.). The length of the determining period can be any time. e.g., 1 second, 1 minute, 1 hour, 1 day, etc. The condition is for a particular audience and may be for the latest user event, past user event, group to which the viewer belongs, etc. For example, the first key to launch a playing game can be defined as the condition of the viewer's hand (e.g., the viewer's hand is a parser), and the second and subsequent playing can be defined as the viewer's belonging to the winner group and the hand (goose, choke, or par). Multiple conditions may be set for group condition information. The group is a group of viewers who satisfy the above conditions. For example, in the case of group condition information with a winner group and a winner group designated as a winner group, the watcher who has won the last time (may include an aio) and who has gone on the google within the determining period is indicated to belong to the winner group, and the watcher who has gone on the google within the determining period is indicated to belong to the winner group. In the sixth embodiment, the group condition information is set for all patterns that can be obtained by the viewer. For example, suppose that you include group condition information that specifics the condition of default (viewer who did not match other conditions).

Figure 51:
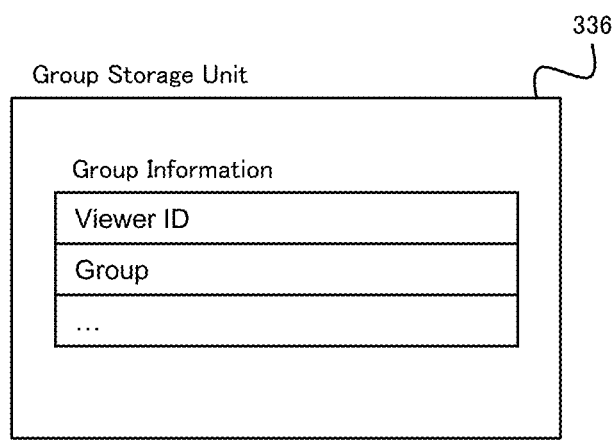
FIG. 51 is a figure illustrating an example of a configuration of a group storage unit 336.

The group storage unit 336 manages the group to which the viewer pertaining to the distribution video belongs. FIG. 51 is a figure illustrating an example of a configuration of a group storage unit 336. The group storage unit 336 stores group information, and the group information includes a viewer ID indicating the viewer and a group to which the viewer belongs.

The video distribution unit 311 distributes video. The video distribution unit 311 can synthesize the output from the action (in which a plurality of actions may be executed) executed by the action processing unit 313, which will be described later (encoded as needed), and generate the distribution video. Further, the video distribution unit 311 can distribute the video to the viewer terminal 1 by transmitting the generated distribution video to the streaming server 2.

The event acquiring unit 312 acquires an event and registers the content of the acquired event as event information in the event storage unit 334. The event acquiring unit 312 acquires what events can be set by the user. Setting information indicating what event to acquire may be stored, for example, in memory 302 or storage device 303.

For example, the event acquiring unit 312 can register events such as keys, taps, and clicks entered by a viewer as user event information. For example, when the distribution video is viewed in the web browser at the viewer terminal 1, a script is set such that the click event generated on the web browser is transmitted to the streaming server 2 or the distributor device 3, and the event acquiring unit 312 can acquire the click event directly from the viewer terminal 1 or through the streaming server 2.

If, for example, the streaming server 2 provides an API for obtaining a submitted comment, the event acquiring unit 312 may retrieve the submitted comment by the viewer by calling the API. In addition, the event acquiring unit 312 may parse the comments and register that a predetermined keyword is included as the user event information.

The event acquiring unit 312 may, for example, receive the voice data captured from the viewer terminal 1, analyze the received voice data, and register that a specific pronunciation occurred as the user event information. The event acquiring unit 312 may receive the analysis result directly from the viewer terminal 1 or through the streaming server 2 and register the analysis result as the user event information in such a way that the voice analysis processing is performed by the viewer terminal 1. In addition, the event acquiring unit 312 may receive an image captured by a viewer from the viewer terminal 1, analyze the received image, and acquire the viewers attitude, gaze, gesture, or the like. Alternatively, the image can be analyzed at the viewer terminal 1 to receive the results. The event acquiring unit 312 may register the number of viewers in the system event information by periodically counting the number of viewers. The event acquiring unit 312 may receive the analysis result directly from the viewer terminal 1 or through the streaming server 2 and register the analysis result as the user event information in such a way that the image analysis process is performed by the viewer terminal 1.

In addition, in the case of a dance envisioned in the sixth embodiment, for example, the event acquiring unit 312 may register as user event information that the viewer has handed out his/her hand. The handing of the bamboo can, for example, cause the viewer to click on the web browser at the viewer terminal 1 by displaying a button to enter the hand of the bamboo (goggle, choke, par). In addition, an image showing the hand of the jacket is included in the distribution video, and an area corresponding to each hand is set. The position where the viewer terminal 1 is clicked in the distribution video is transmitted to the distributor device 3 via the streaming server 2 or directly to the distributor device 3. The event acquiring unit 312 can determine whether the clicked position is in the area corresponding to each of the above items or not. The determination may also be made in the viewer terminal 1 or the streaming server 2. In addition, the event acquiring unit 312 can identify the hands of the keys that the viewer has produced, for example, by extracting the words that represent the hands of the keys described in the comments submitted by the viewer.

For example, the event acquiring unit 312 can register as system event information that a predetermined time has elapsed since the start of playback of the distributed image by acquiring a time-out event from a clock. The event acquiring unit 312 can also register a predetermined time (e.g., a date has changed, a date has reached 3:00 p.m.) as system event information.

The event acquiring unit 312 may, for example, acquire weather information from a server of a weather company and register weather elements in a specific region (e.g., the location of each viewer or the location of a distributor, or a predetermined region) as system event information.

For example, when the material data is a 3D model or the like, the event acquiring unit 312 can determine that an object has collided in the distribution video and register it as system event information.

The action processing unit 313 performs an action on the material data. The action processing unit 313 receives the designation of the first action to be executed and executes the received action. In this case, the action processing unit 313 can continue to start the action sequentially because some of the actions may include the activation of other actions. It should be noted that the action can be executed in parallel by branching multiple times.

The action processing unit 313 also executes an action corresponding to an event. The action processing unit 313 reads out and aggregates event inhumation corresponding to the period from the event storage unit 334 with respect to each of the action information stored in the action storage unit 333, determines whether or not the condition is satisfied, and executes an action set to the action information when the condition is satisfied. This makes it possible to dynamically change the deployment of the video according to the event.

The action processing unit 313 also considers a group of viewers. That is, when a group is set in the action information, the action processing unit 313 executes the action according only to the event information corresponding to the viewer belonging to the set group. For example, in the case of a token, only the events from the viewer who belongs to the winner group should be performed. This allows the game to proceed correctly by not considering events from the losers in the progress of the tight.

The group setting unit 314 divides viewers into groups. In the sixth embodiment, the group setting unit 314 group the users into groups each time the action is executed by the action processing unit 313. However, the group setting unit 314 may group the users at any timing. For example, when the event acquiring unit 312 acquires a preset event (e.g., when there is a response from a viewer such as a comment posting) or when a predetermined time elapses, grouping can be performed. The group setting unit 314 searches the group condition information registered in the group condition information storage unit 335 for each viewer and determines that the viewer belongs to the group set in the retrieved group condition information. The group setting unit 314 creates group information corresponding to the determined viewer and group and registers the group information in the group storage unit 336. If the group information corresponding to the viewer is already registered in the group storage unit 336, the group information shall be updated. In the sixth embodiment, the group condition information is set to be a "winner group" of the viewer who satisfies the conditions (and, in the case of the second and subsequent proof trials, the group to which the viewer belongs is the "winner group"). In addition, the group condition information that sets other viewers as a "loser group" is also set. Accordingly, the group setting unit 314 can repeatedly try to reduce the number of viewers belonging to the winner group.

The aggregation output unit 315 can output various aggregations. For example, the aggregation output unit 315 may count the number of viewers from the user event information registered in the past or aggregate the number of viewers who submitted comments containing the word for each specific word. The aggregation output unit 315 may, for example, calculate the number of viewers for each group from tire group effective unit 336. The aggregation output unit 315 can output the aggregated number. The output from the aggregation output unit 315 is transmitted to the viewer terminal 1 separately from the distributed image, and may lie displayed on the viewer terminal 1 or may be superimposed on the distributed image.

The reward processing unit 316 performs processing in reward the viewer according to the group. The reward processing unit 316 may, for example, reward only viewers belonging to a particular group, or may provide different rewards for each group. The reward processing unit 316 provides compensation by adding points, transferring funds in virtual currencies, and granting items. The general reward processing is omitted here. In the sixth embodiment, the reward processing unit 316 provides compensation for each of the winners of the fight, i.e., the viewers belonging to the winner group.

Figure 52:
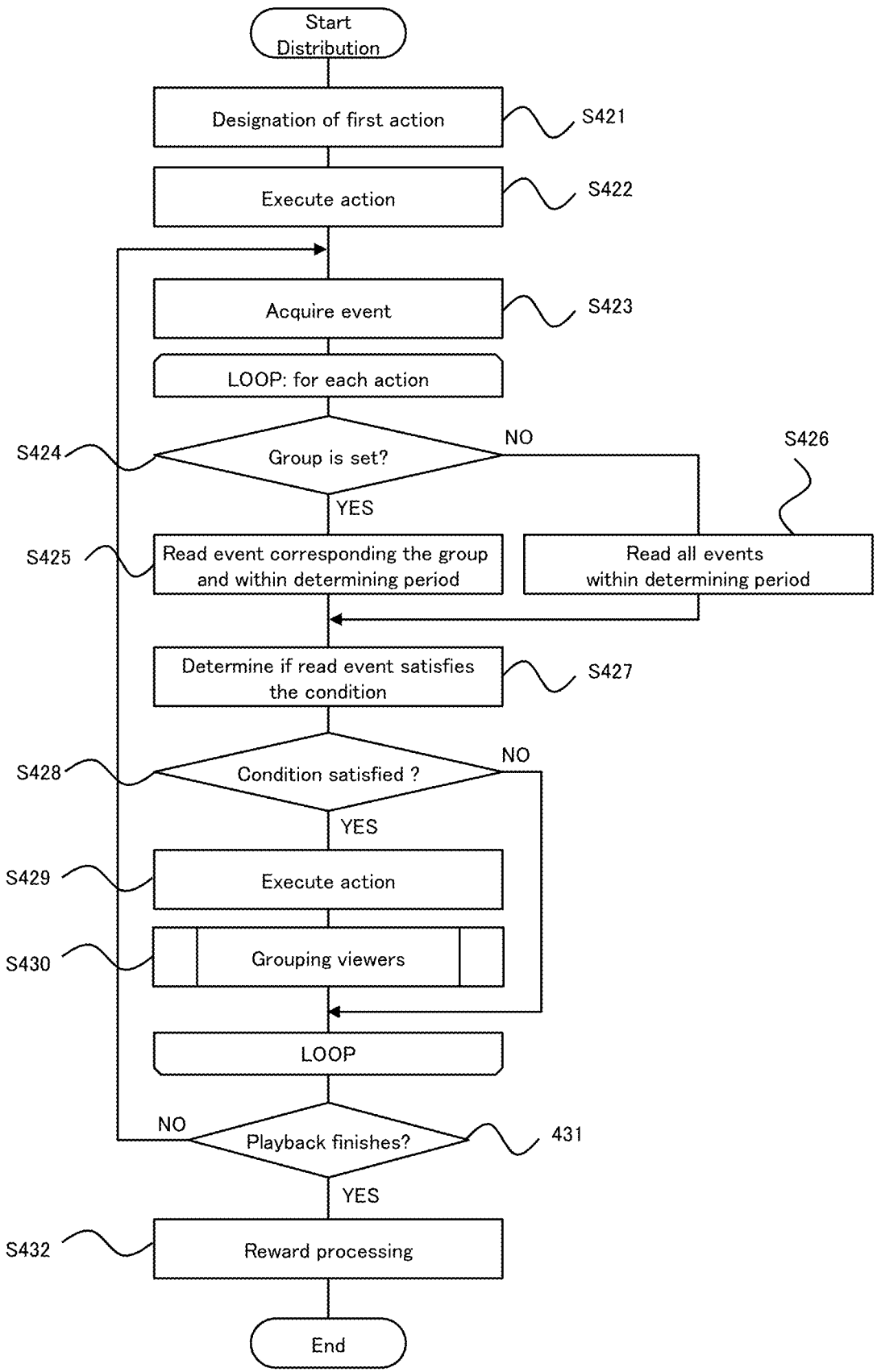
FIG. 52 is a figure illustrating a flow of processing executed by the video distribution system according to the present embodiment.

FIG. 52 is a figure illustrating a flow of processing performed try the video distribution system according to the sixth embodiment.

The action processing unit 313 accepts the designation of the first action to be executed (S421) and executes the specified action (S422). The video and audio output as a result of the action being executed are synthesized und transmitted to the streaming server 2 by the video distributing unit 311 as video data.

The event acquiring unit 312 acquires an event periodically (S423). Tor example, by invoking the API provided by the streaming server 2, the event acquiring unit 312 can obtain a comment submitted to the distribution video. The event acquiring unit 312 can acquire that a predetermined time has elapsed using a timer function.

With regard to each action information stored in the action storage unit 333, when a group is set in the action information (S424:YES), the action processing unit 313 reads event information corresponding to the group and the datetime within the determining period from the event storage unit 334 (S425), and when no group is set in the action information (S424:NO), reads all event information at the date and time that enter the determining period from the event storage unit 334 (S426).

Figure 53:
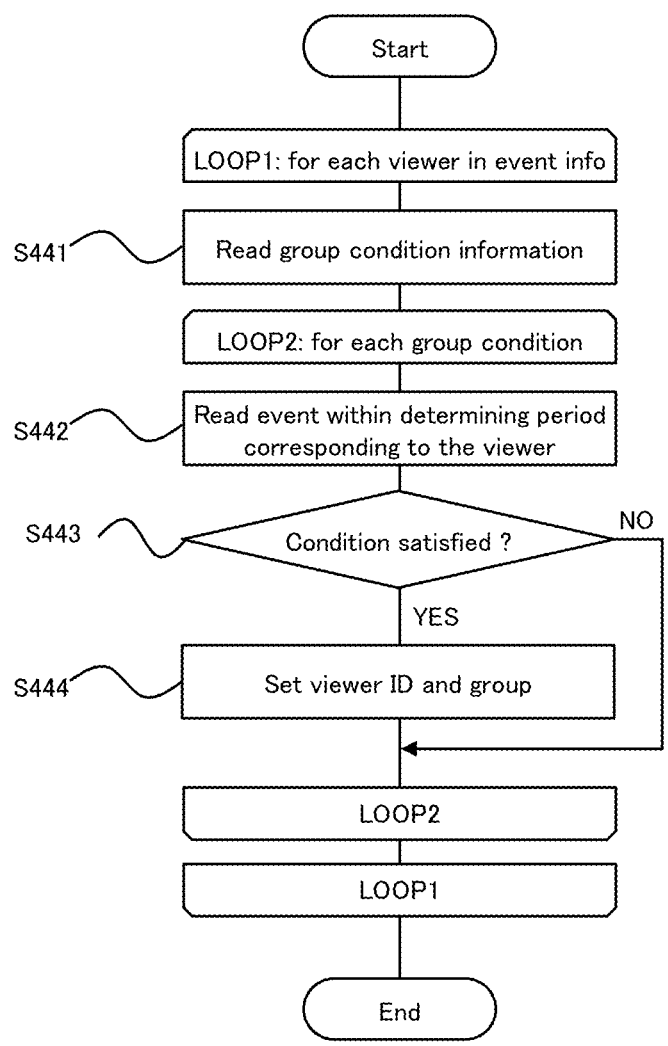
FIG. 53 is a figure illustrating a flow of a grouping process of a viewer according to this embodiment.

The action processing unit 313 determines whether or not the event content of the read event information satisfies the condition of the action information (S427). If the action information includes information other than event information and group information that can be obtained by accessing the information managed by the distributor device 3 or other information processing devices, the information may be obtained to determine whether or not the conditions are met. When the event satisfies the condition (S428:YES), the action processing unit 313 executes the action included in the action information (S429). Here, the action processing unit 313 may stop the previously executed action, execute a new action in parallel with the previously executed action, or specify this behavior in the new action. The group setting unit 314 divides viewers into groups (S430). FIG. 53 is a figure illustrating a flow of a grouping process of a viewer according to a sixth embodiment. The group setting unit 314 performs the following processing for each viewer related to event information. The group setting unit 314 reads the group condition information from the group condition storage unit 335 (S441) and registers the group information in the group storage unit 336, which sets the viewer ID representing the viewer and the group condition information group, with respect to each group condition information read from the event information corresponding to the viewer and within the determining period (S442), when the read event information satisfies the condition of the group condition information (S443:YES). In this way, viewers are grouped.

Returning to FIG. 52, if the action of the action information does not terminate the distribution video (S431 NO), the process from step S423 is repeated. For example, in the case of a token, if the number of viewers belonging to the winner group falls below a predetermined number, the action information can be registered to execute an action to terminate the video.

When an action to terminate the distribution video is executed (S431), the reward processing unit 316 rewards the viewer according to the group (S432) and terminates the processing. In the case of a token, the reward processing unit 316 may only reward viewers belonging to the winner group.

Figure 54:
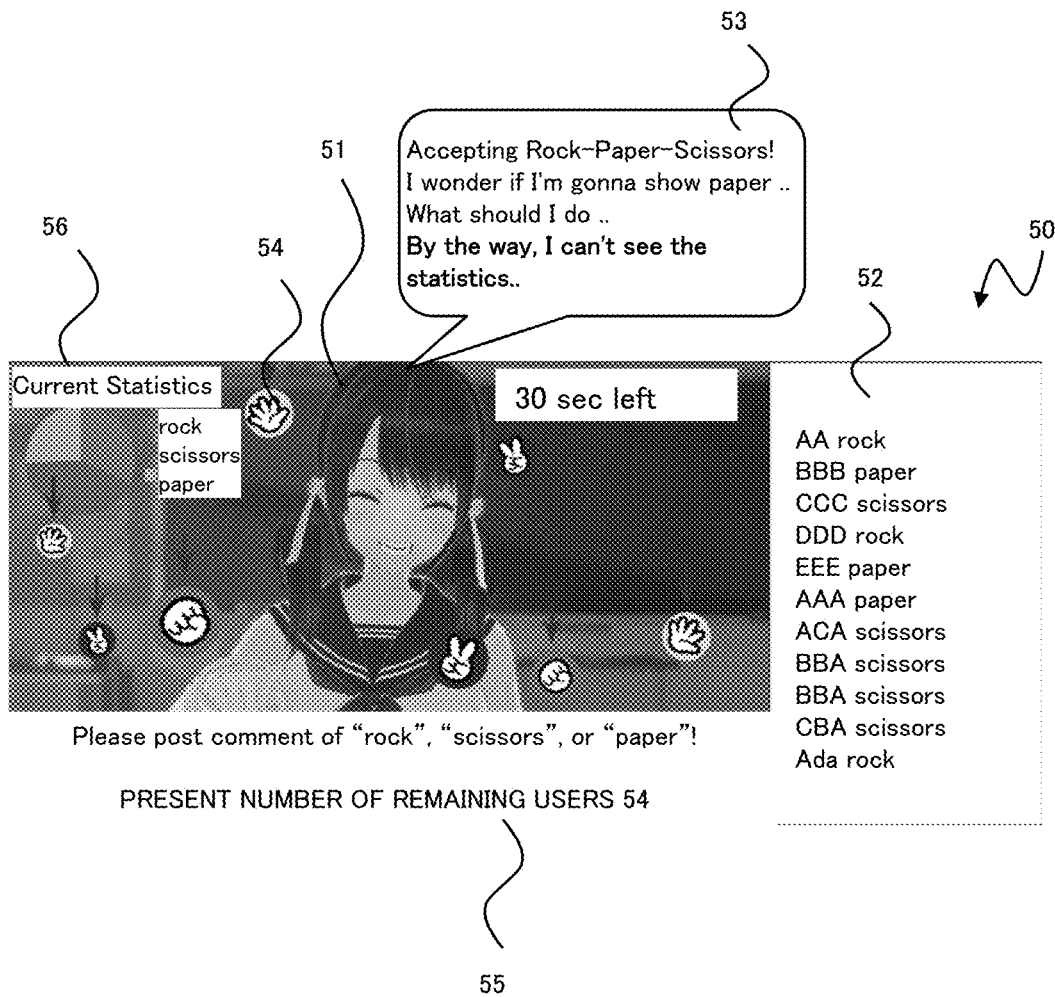
FIG. 54 is a figure illustrating an example of a viewing screen of a distribution video in the video distribution system according to the present embodiment.

FIG. 54 is a figure illustrating an example of a viewing screen 50 of a distribution video. The viewer terminal 1 displays the viewer screen 50. In the viewing screen 50, the distribution video 51 is played back and a list of comments 52 submitted in teal time by the viewer is displayed on the distribution video 51. In the example shown in FIG. 54, a message 53 indicating that a character is receiving a jacket in the distribution video 51 is issued, and the viewer receives his/her own comments accordingly. In addition, an icon 54 representing a hand from a viewer is rendered in the distribution video 51 according to the hand of the keypad included in the comment 52 by the action processing unit 313. Although not shown in FIG. 54, the action processing unit 313 operates on the material data that is rendered as the distribution video 51 according to the comment 52. For example, when a large number of par hands are issued, it is possible to insert a video in the distribution video 51 that makes a speech such as "there're many papers." In the viewing screen 50, as an example of the tabulated output unit 315, the number of viewers who belong to the winner group is 55, and the percentage of hands of the tendons currently posted is 56. Based on these results, viewers can think about what to do.

As described above, the video distribution system according to the sixth embodiment can distribute the distribution video to the viewer terminal 1 via the streaming server 2, and change the distribution video during playback according to various events during playback of the distribution video. Accordingly, it is possible to add various developments to the distribution video in response to the response of the viewer while using the recorded video, and it is possible to distribute the video without compromising the live feeling of the video by the method of distributing the video in a streaming format.

While the foregoing has been described with respect to the sixth embodiment, the above-described embodiment is intended to facilitate the understanding of the present invention and is not intended to be a limiting interpretation of the present invention. The present invention may be modified and improved without departing from the spirit thereof, and the present invention also includes its equivalent.

For example, in the present embodiment, it is assumed that the video transmitted from the distributor device 3 is distributed to the viewer terminal 1 via the streaming server 2, but it is also possible to distribute the video directly from the distributor device 3 to each viewer terminal 1.

In the present embodiment, even while the video is being played, if the comment satisfies the condition, it is assumed that the next part moving image data is transferred (Step S428 of FIG. 52). However, the current action may be executed until the last time, and then the next action may be executed.

In the present exemplary embodiment, viewers are grouped according to each action executed. However, depending on the material data and the content of the action, it is possible to decide whether or not to group the viewers. For example, a viewer may be grouped only if the character produces an image that gives the hand.

In this embodiment, the rock-paper-scissors was described as an example, but it can be applied not only to the dough, but also to numeric, character, bingo, and flickering, psychological tests, true-or-false quizzes, and afterwards, etc.

Seventh Embodiment

The video distribution system according to the seventh embodiment includes the following configuration.

[Item 1]
A video distribution system comprising:
a material library for storing asset data for generating video;
a video generating unit that generates a first and a second part video based on the first and second asset data and generates the video to simultaneously divide and display the generated first and second part video;
a reaction acquiring unit that acquires reaction information indicating a reaction from a viewer of the video during a playback of the video;
an action processing unit that performs the operation on the first asset data in response to only the reaction information from the viewer belonging to a first group, and performs the operation on the second asset data in response to only the reaction information from the viewer belonging to a second group.

[Item 2]
The video distribution system described in Item 1, wherein:
the video generating unit finishes the divided display when the first and second asset data are identical, and generates the video based on the first or second asset data.

[Item 3]
A video distribution system described in Items 1 or 2, wherein:
the material data is associated with at least one of a plurality of characters,
each of the groups is associated with the character,
the animated image generating unit terminates the divided display when using the first or second material data to which all of the characters corresponding to the plurality of groups are associated, and generates the part video or the video based on the first or second material data.

[Item 4]
A video distribution system as set forth in any one of items 1 to 3, further comprising:
a group setting unit for grouping the viewers according to the reaction information.

[Item 5]
The video distribution system described in item 4 further comprising:
a group storage unit for storing information indicative of the viewer corresponding to the acquired reaction information and the group to which the viewer belongs.

Hereinafter, a video distribution system according to a seventh embodiment will be described. The video distribution system according to the seventh embodiment dynamically changes the streamed video according to various events.

Events include information obtained with respect to a viewer (hereinafter referred to as user event information) such us that the device was operated by the viewer, audio or text was entered by the viewer, the viewer was taken, the viewer's attitude, line of view, gestures, etc. were obtained from the analyzed image, and the measurement data that measured the viewer's physical response was obtained. The event may also include information that can be obtained by the system side, such as the number of viewers viewed, weather, time, weather, or the contact of an object in a video (hereinafter referred to as system event information).

The video to be delivered is generated based on material data such as 3D model, video data, and audio data. Event-specific actions can be set for each asset data.

The action is operations on asset data and can include the appearance, movement and disappearance of objects represented by the 3D model, initiation and termination of animation operations, playing and stopping video, playing and stopping audio, changing (replacing) asset data, and the like. In a seventh embodiment, the video to be delivered is created by combining images or images output as a result of the action.

In the video distribution system of the seventh embodiment, an action can be activated in response to an event to dynamically change the distribution video. Details will be described below.

Figure 55:
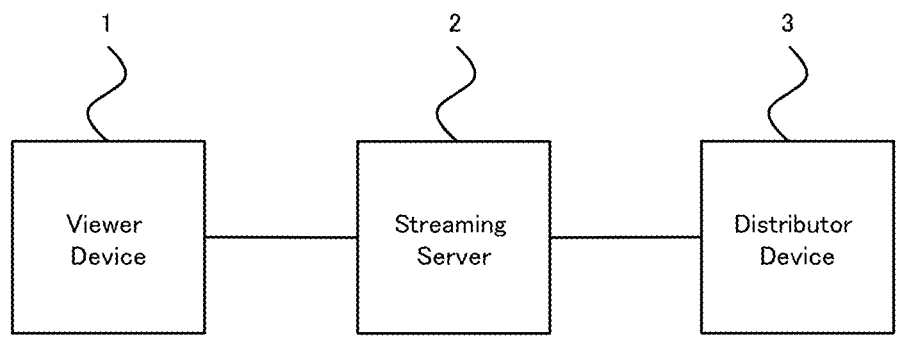
FIG. 55 is a figure illustrating an example of an overall configuration of a video distribution system according to the present embodiment.

FIG. 55 is a figure illustrating an example of the overall configuration of the video distribution system according to the seventh embodiment. The video distribution system of the seventh embodiment includes a distributor device 3, which is communicatively connected to the streaming server 2 and the streaming server 2 is communicatively connected to the viewer terminal 1. A large number of viewer terminals 1 may be connected. The distributor device 3 is a computer that transmits video, such as a personal computer, tablet computer, or smartphone. The distributor device 3 may be, for example, a home computer operated by a general user who wishes to distribute video. From the distributor device 3, video data is sent to the streaming server 2 by a streaming method. The streaming server 2 is a computer, such as a workstation, personal computer, or a virtual computer provided by cloud computing, that distributes video data received from the distributor device 3 to the viewer terminal 1. The streaming server 2 can deliver video data to one or more viewer terminals 1 at the same time. The viewer terminal 1 is a computer operated by a viewer, such as a personal computer, a tablet computer, or a smartphone. The viewer can access the streaming server 2 by operating the viewer terminal 1, and the viewer terminal 1 can receive and play back video data transmitted from the streaming server 2. In addition, the viewer terminal 1 is capable of collecting various event information by taking pictures of the viewer, recording the audio of the viewer, and receiving comments from the viewer. Events from one or more viewers are collected at the streaming server 2, and the distributor device 3 may retrieve events from the viewer, for example, by calling an API (Application Programming Interface) provided by the streaming server 2.

In the following explanation, the entire video that is streamed and played linearly is referred to as the "distribution video." The distribution video may lie a format in which images and sounds captured by a camera or a microphone are encoded into video data in real time and transmitted. However, in the seventh embodiment, it is assumed that the distribution video is generated as video data combined with the material data.

Figure 56:
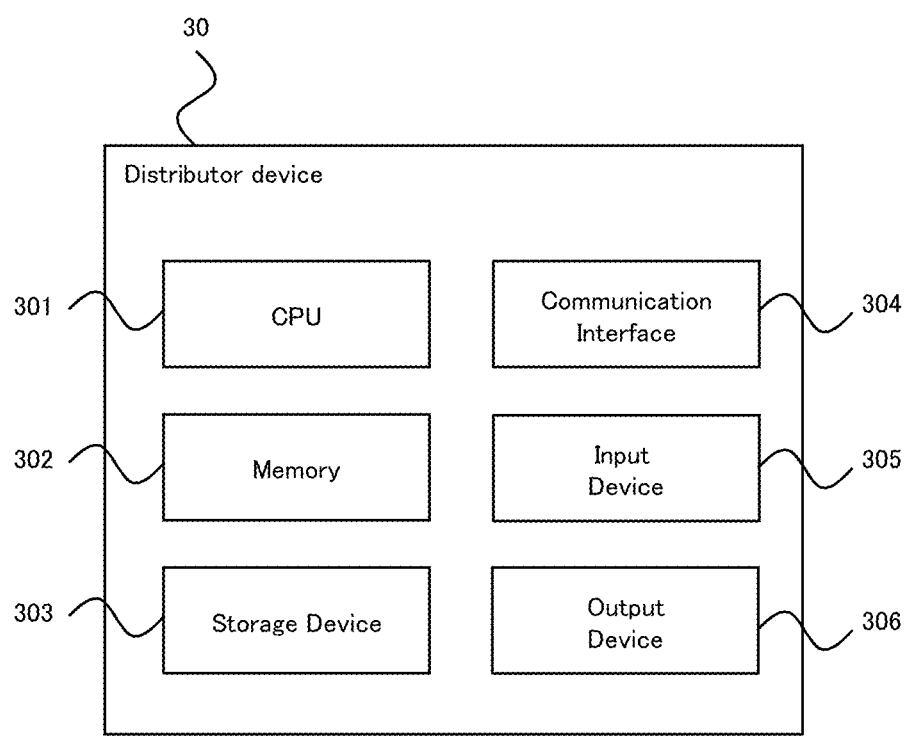
FIG. 56 is a figure illustrating an example of a hardware configuration of a distributor device 3.

FIG. 56 is a figure illustrating an example of a hardware configuration of a distributor device 3. The distributor device 3 includes a CPU 301, a memory 302, a storage device 303, a communication interface 304, an input device 305, and an output device 306. The storage device 303 may be, for example, a hard disk drive, a solid state drive, a flash memory, or the like, for storing various types of data or programs. The communication interlace 304 is an interface for connecting to the communication network 30, such as an adapter for connecting to an Ethernet (registered trademark), a modem for connecting to a public telephone network, a wireless communication device for performing wireless communication, a USB (Universal Serial Bus) connector for serial communication, or an RS232C connector. The input device 305 may be, for example, a keyboard or mouse, a touch panel, a button, a microphone, or the like, for inputting data. The output device 306 may be, for example, a display, a printer, a speaker, or the like, which outputs data.

Figure 57:
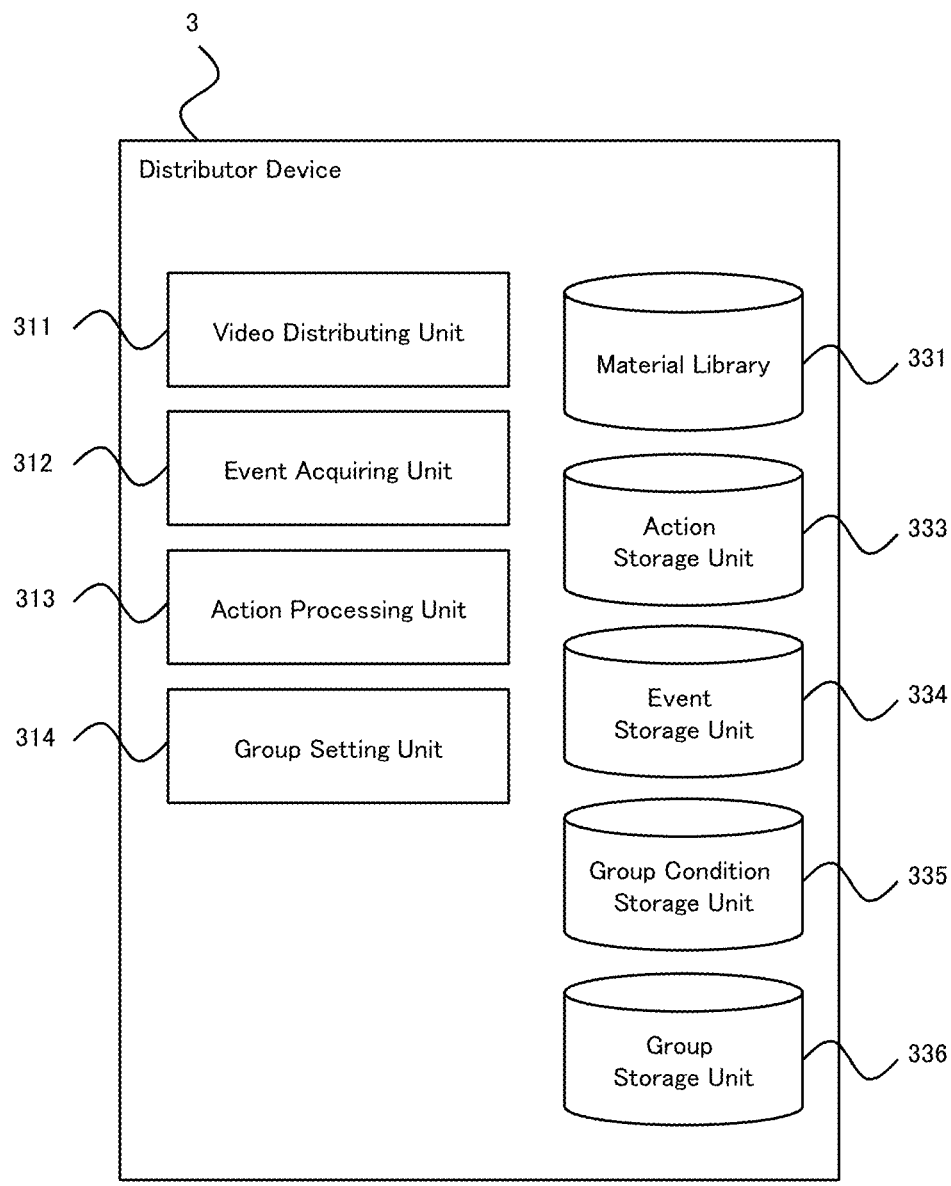
FIG. 57 is a figure illustrating an example of a software configuration of a distributor device 3.

FIG. 57 is a figure illustrating an example of the software configuration of the distributor device 3. As illustrated in the figure, the distributor device 3 includes a processing unit of the video distribution unit 311, the event acquiring unit 312, the action processing unit 313, and the group setting unit 314, and a storage unit of tire material library 331, the action storage unit 333, the event storage unit 334, the group condition storage unit 335, and the group storage unit 336.

The above-described processing units are realized by the CPU 301 provided by the distributor device 3 reading and executing a program stored in the storage device 303 to the memory 302, and the above-described storage units are realized as part of a storage area provided by at least one of the memory 302 provided by the distributor device 3 and tire storage device 303.

Figure 58:
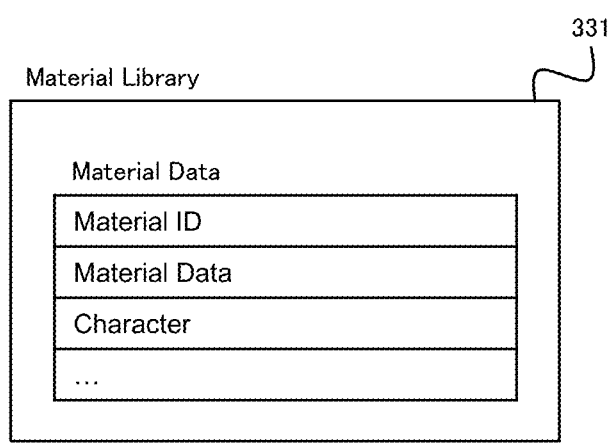
FIG. 58 shows a structural example of a material library 331.

The material library 331 stores various types of data (asset data) that can be incorporated into the video. Material data may be, tor example, a 3D model, a still image, a moving image, voice data, MIDI data, character data, and the like. FIG. 58 is a figure illustrating a structural example of a material library 331. As illustrated in the figure, the material library 331 stores, corresponding to information (material ID) for identifying the material data, a variety of material data and a character corresponding to the material data. A character is a character corresponding to a video based on asset data, tor example a character appearing in a video based on asset data.

Figure 59:
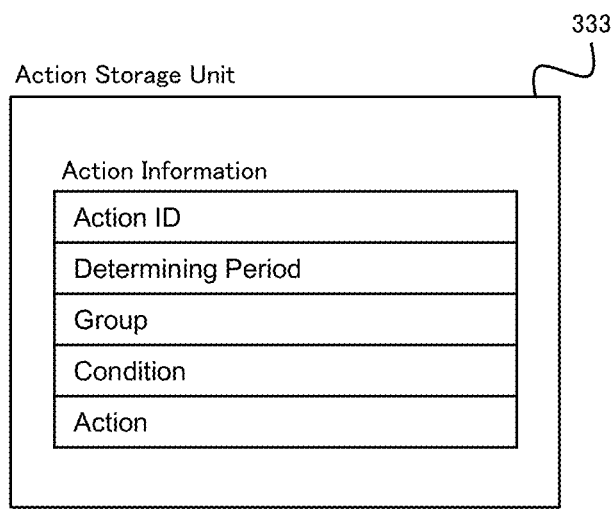
FIG. 59 is a figure illustrating an example of a configuration of an action storage unit 333.

The action storage unit 333 stores information (hereinafter referred to as the action information) concerning the operation (action) of the material data. FIG. 59 is a figure illustrating an example of an action information stored in an action storage unit 333. As shown in the figure, the action information includes an action ID representing the action, a determining period, a group, a condition, and an action.

The determining period is an information indicating the period of time for determining whether an event meets the conditions. The determining period may be specified relative to, for example, five minutes before the current time or absolutely from 00:00 to 00:10 on December 25th. It may also be an action specification and the time at which the action was executed (e.g., 10 seconds from the start of the action, 10 seconds from the end of the action, etc.). The length of the determining period can be any time, e.g., 1 second, 1 minute, 1 hour, 1 day, etc.

The group indicates the group to which the viewer belongs, if a group is set in the action information, only event information pertaining to the viewer belonging to the set group is judged whether or not the conditions described below are met.

The condition may be for an event, e.g., the presence or absence of an event, or the aggregation of events from multiple viewers may or may not exceed the threshold.

For user event information, for example, a condition may be whether the viewer pressed a predetermined key during playback of the distribution video, clicked or tapped a predetermined area on the video, or whether the number of viewers clicked or tapped a predetermined area on the video exceeded the threshold value. Based on the material data used to generate the delivered video, it may also be conditional on whether an object displayed during the delivered video is clicked or tapped, and whether the number of viewers clicked or tapped on the object exceeds the threshold.

In addition, the condition may be whether the viewer terminal 1 has entered a predetermined character (keyword) from the viewer, for example, whether the comment submitted to the distribution video contains a predetermined keyword, or whether the number of viewers who entered the keyword exceeds the threshold value. It may also be conditional on the number of comments or viewers who submitted comments by region, e.g., the aggregate amount (mean, median, maximum, minimum, etc.) submitted by the viewer in response to the viewer's inquiry about the amount in the video, the number of viewers who are sad based on the feelings of the viewer as determined by the text analysis, etc., exceeding a predetermined threshold, or tire viewer has never submitted comments containing a predetermined keyword.

Alternatively, the speech recognition may be performed on the viewer's or viewer's atmosphere, for example, whether or not a particular speech has been made, whether or not a clap, whistle, footsteps, or the like has been made, whether or not a particular speech has been made, and whether or not the number of viewers with such a particular speech has exceeded the threshold. In this case, the speech recognition processing may be performed by the viewer terminal 1 and the recognition result may be transmitted to the streaming server 2 or the distributor device 3, or the audio data captured from the viewer terminal 1 may be transmitted from the viewer terminal 1 via the streaming server 2 or directly to the distributor device 3 and the voice recognition processing may be performed at the distributor device 3.

It is also possible to determine whether a viewer has taken an image or an atmosphere of a viewer at the viewer terminal 1, whether such an image has been posted to the streaming server 2, and whether the number of viewers who submitted the image exceeds the threshold. Image analysis can also be used to determine whether an image (e.g., a particular signboard or flyer photographed around a viewer) has been posted or whether the number of viewers who submitted such an image exceeds the threshold. In addition, image analysis can be used to recognize the attitude, gaze, gesture, etc. of the viewer and to determine whether or not the viewer has performed the predetermined posture, gaze, or gesture, whether or not the predetermined posture or gaze, and whether or not the number of viewers who have made the gesture exceeds the threshold. In this case, the image analysis processing may be performed by the viewer terminal 1 and the analysis result is transmitted to the streaming server 2 or the distributor device 3, or the image data captured from the viewer terminal 1 may be transmitted to the distributor device 3 via the streaming, server 2 or directly to the distributor device 3 and image analysis processing may be performed in the distributor device 3.

For system event information, for example, the number of viewers viewing the delivered image may be conditional on whether the number of viewers exceeds the threshold. It is also possible to make it a condition that a predetermined time has elapsed tram the playback of the distributed image. In addition, when the weather in the location of the viewer or the distributor or in a given area is obtained as system event information, the conditions may be such as whether the weather is a predetermined weather (e.g., clear, rain, snow, wind of a strength greater than a predetermined temperature, etc.), in addition, when the material data is a 3D model or the like, the condition may be that the object collided in the delivered video.

The action is a variety of operations on the asset data, as described above. The action can also contain parameters and can be set in detail what specific operations are to be performed on the asset data. In still a seventh embodiment, the action may include processing such as executing or stopping other actions, waiting for the execution of other actions to be completed, as well as manipulating the asset data. The action can also be stored, for example, as programs written in scripting languages.

Figure 60:
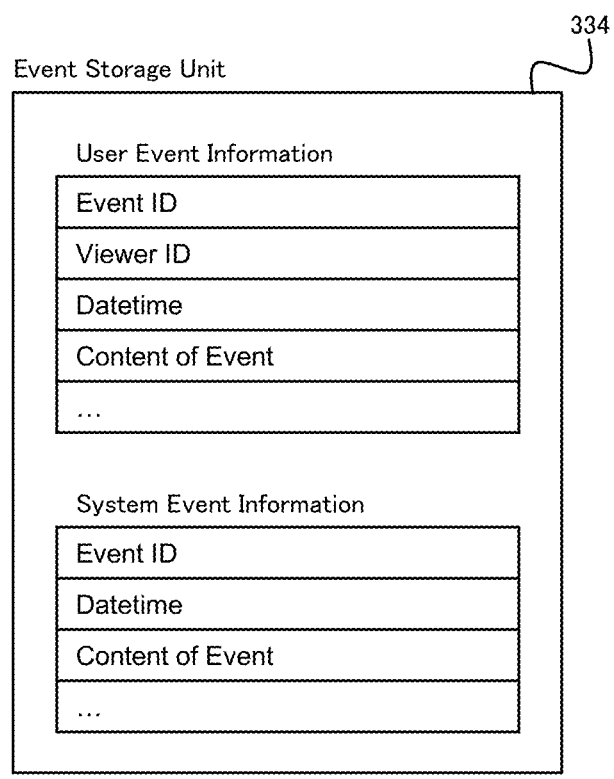
FIG. 60 is a figure illustrating an example of a configuration of an event storage unit 334.

The event storage unit 334 stores various events that have occurred. FIG. 60 is a figure illustrating an example of a configuration of an event storage unit 334. As described above, the event storage unit 334 stores the user event information and the system event information. Hereinafter, user event information and system event information are collectively referred to as event information. User event information includes the event ID representing the event, the viewer ID representing the viewer of the event, the datetime the event occurred, and the content of the event. The system event information includes the event ID, the date and time the event occurred, and the content of the event. The content of an event depends on the event, for example, in the case of user event information, when a viewer submits a comment to a distribution video, the submitted comment may be set as event content. In addition, when the viewer terminal 1 analyzes the image captured by the viewer and obtains the gaze or gesture of the viewer, information indicating these gazes or gestures can be set as the content of the event. For system event information, the number of viewers, weather, time, etc. can be set as event content.

Figure 61:
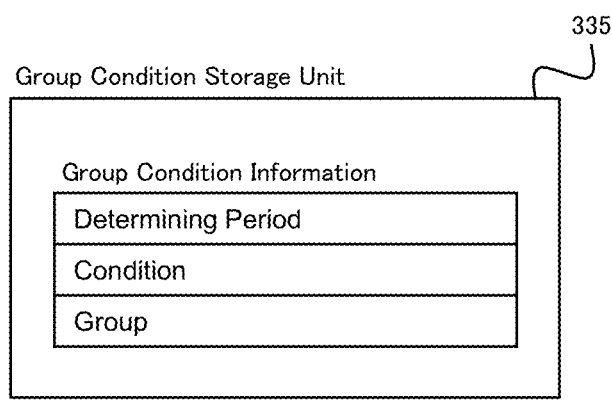
FIG. 61 is a figure illustrating an example of a configuration of a group condition storage unit 335.

The condition storage unit 335 stores a condition for grouping viewers (hereinafter referred to as the group condition information). FIG. 61 is a figure illustrating an example of a configuration of a group condition storage unit 335. The group condition information includes a determining period, a condition and a group. The determining period is information indicating the period during which the group is to be divided. The determining period may be, for example, the start and end dates, as well as the determining period for the action information described above, or it may be the specification of the action and the time at which the action was executed (e.g., 10 seconds from the start of the action, 10 seconds from the end of the action, etc.). The length of the determining period can be any time, e.g., 1 second, 1 minute, 1 hour, 1 day, etc. The condition is for a particular audience and may be for the latest user event, past user event, a group to which the viewer belongs, etc. In the seventh embodiment, the group condition information is set for all patterns that can be obtained by the viewer. For example, suppose that you include group condition information that specifies the condition of default (viewer who did not match other conditions).

Figure 62:
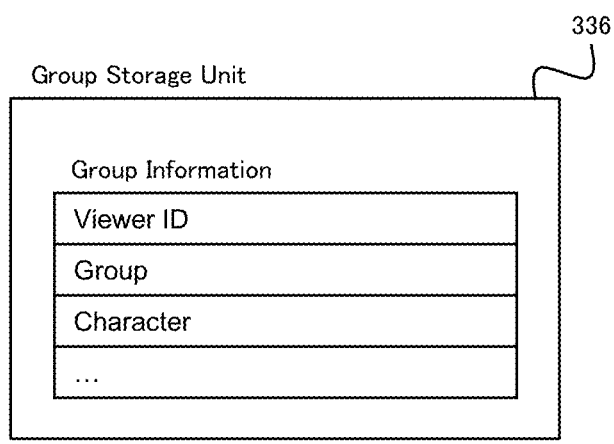
FIG. 62 is a figure illustrating an example of a configuration of a group storage unit 336.

The group storage unit 336 manages the group to which the viewer pertaining to the distribution video belongs. FIG. 62 is a figure illustrating an example of a configuration of a group storage unit 336. The group storage unit 336 stores group information, and the group information includes a viewer ID representing the viewer, a group to which the viewer belongs, and a character associated with the viewer. The character may be, for example, a character selected by the viewer, or it may be a character automatically assigned to the viewer. For example, if a viewer decides to track any of the characters in the video to be delivered, the input of the determined character can be accepted and registered as group information.

The video distribution unit 311 distributes video. The video distribution unit 311 can compose the output from the action (in which a plurality of actions may be executed) executed by the action processing unit 313, which will be described later (encoded as needed), and generate the distribution video. Further, the video distribution unit 311 can distribute the video to the viewer terminal 1 by transmitting the generated distribution video to the streaming server 2.

The event acquiring unit 312 acquires an event and registers the content of the acquired event as event information in the event storage unit 334. The event acquiring unit 312 acquires what events can be set by the user. Setting information indicating what event to acquire may be stored, for example, in memory 302 or storage device 303.

For example, the event acquiring unit 312 can register events such as keys, taps, and clicks entered by a viewer as user event information. For example, when the distribution video is viewed in the web browser at the viewer terminal 1, a script is set such that the click event generated on the web browser is transmitted to the streaming server 2 or the distributor device 3, and the event acquiring unit 312 can acquire the click event directly from the viewer terminal 1 or through the streaming server 2.

If, for example, the streaming server 2 provides an API for obtaining a submitted comment, the event acquiring unit 312 may retrieve the submitted comment by the viewer by calling the API. In addition, the event acquiring unit 312 may parse the comments and register that a predetermined keyword is included as the user event information.

The event acquiring unit 312 may, for example, receive the voice data captured from the viewer terminal 1, analyze the received voice data, and register that a specific pronunciation occurred as the user event information. The event acquiring unit 312 may receive the analysis result directly from the viewer terminal 1 or through the streaming server 2 and register the analysis result as the user event information in such a way that the voice analysis processing is performed by the viewer terminal 1. In addition, the event acquiring unit 312 may receive an image captured by a viewer from the viewer terminal 1, analyze the received image, and acquire the viewer's attitude, gaze, gesture, or the like. Alternatively, the image can be analyzed at the viewer terminal 1 to receive the results. The event acquiring unit 312 may register the number of viewers in the system event information by periodically counting the number of viewers. The event acquiring unit 312 may receive the analysis result directly from the viewer terminal 1 or through the streaming server 2 and register the analysis result as the user event information in such a way that the image analysis process is performed by the viewer terminal 1.

For example, the event acquiring unit 312 can register as system event information that a predetermined time has elapsed since the start of playback of the distributed image by acquiring a time-out event from a clock. The event acquiring unit 312 can also register a predetermined time (e.g., a date has changed, a date has reached 3:00 p.m.) as system event information.

The event acquiring unit 312 may, for example, acquire weather information from a server of a weather company and register weather elements in a specific region (e.g., the location of each viewer or the location of a distributor, or a predetermined region) as system event information.

For example, when the material data is a 3D model or the like, the event acquiring unit 312 can determine that an object has collided in the distribution video and register it as system event information.

The action processing unit 313 performs an action on the material data. The action processing unit 313 receives the designation of the first action to be executed and executes the received action. In this case, the action processing unit 313 can continue to start the action sequentially because some of the actions may include the activation of other actions. It should be noted that the action can be executed in parallel by branching multiple times.

The action processing unit 313 also executes an action corresponding to an event. The action processing unit 313 reads out and aggregates event information corresponding to the period from the event storage unit 334 with respect to each of the action information stored in the action storage unit 333, determines whether or not the condition is satisfied, and executes an action set to the action information when the condition is satisfied. This makes it possible to dynamically change the deployment of the video according to the event.

The action processing unit 313 also considers a group of viewers. That is, when a group is set in the action informa-tion, the action processing unit 313 executes the action according only to the event information corresponding to the viewer belonging to the set group. For example, in the case of a token, only the events from the viewer who belongs to the winner group should be performed. This allows the game to proceed correctly by not considering events from the losers in the progress of the fight.

The group setting unit 314 divides viewers into groups. In the seventh embodiment, the group setting unit 314 group the users into groups each time the action is executed by the action processing unit 313, but the groups may be grouped at any time. For example, when the event acquiring unit 312 acquires a preset event (e.g., when there is a response from a viewer such as a comment posting) or when a predetermined time elapses, grouping can be performed. The group setting unit 314 searches the group condition information registered in the group condition information storage unit 335 for each viewer and determines that the viewer belongs to the group set in the retrieved group condition information. The group setting unit 314 creates group information corresponding to the determined viewer and group and registers the group information in the group storage unit 336. If the group information corresponding to the viewer is already registered in the group storage unit 336, the group information shall be updated.

The aggregation output unit 315 can output various aggregations. For example, the aggregation output unit 315 may count the number of viewers from the user event information registered in the past or aggregate the number of viewers who submitted comments containing the word for each specific word. The aggregation output unit 315 may, for example, calculate the number of viewers for each group from the group effective unit 336, the response from the viewer includes at least one of manipulation of the device by the viewer, audio and text input from the viewer, an image captured by the viewer, an attitude, gaze and gesture of the viewer analyzed from the image, and measured data measuring the viewer's physical reaction. The output from the aggregation output unit 315 is transmitted to the viewer terminal 1 separately from the distributed image, and may be displayed on the viewer terminal 1 or may be superimposed on the distributed image.

The reward processing unit 316 performs processing to reward the viewer according to the group. The reward processing unit 316 may, for example, reward only viewers belonging to a particular group, or may provide different rewards for each group. The reward processing unit 316 provides compensation by adding points, transferring funds in virtual currencies, and granting items. The general reward processing is omitted here. In the seventh embodiment, the reward processing unit 316 provides compensation to each of the winners of the fight, i.e., the viewers belonging to the winner group.

Figure 63:
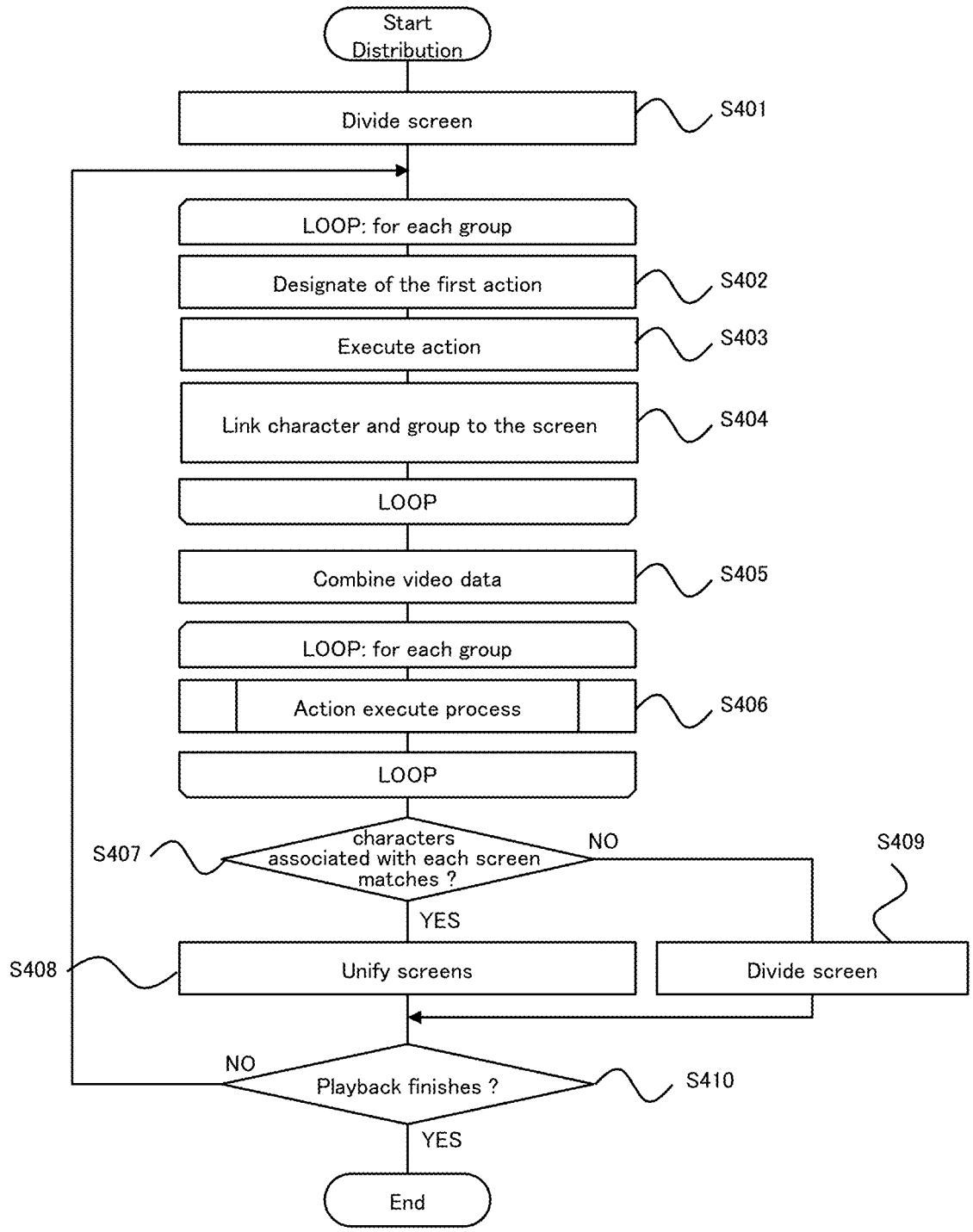
FIG. 63 is a figure illustrating a flow of processing executed by the video distribution system according to the present embodiment.

FIG. 63 is a figure illustrating a flow of processing performed by the video distribution system according to the seventh embodiment.

The video distribution unit 311 divides the screen in the distributed image (S401). In the seventh embodiment, the video distributing unit 311 achieves screen partitioning by combining a plurality of video to be displayed simultaneously. The screen shall be divided by the number of groups.

The action processing unit 313 receives the designation of the first action to be executed for each group (S402) and executes the specified action (S403). The video and audio output as a result of the action is synthesized and generated as video data. The action processing unit 313 links the group and a character corresponding to the material data used when executing the action to the screen (S404).

The video distributing unit 311 combines the video data generated for each group into a corresponding screen, generates the distribution video, and transmits the video to the streaming server 2 (8405).

Figure 64:
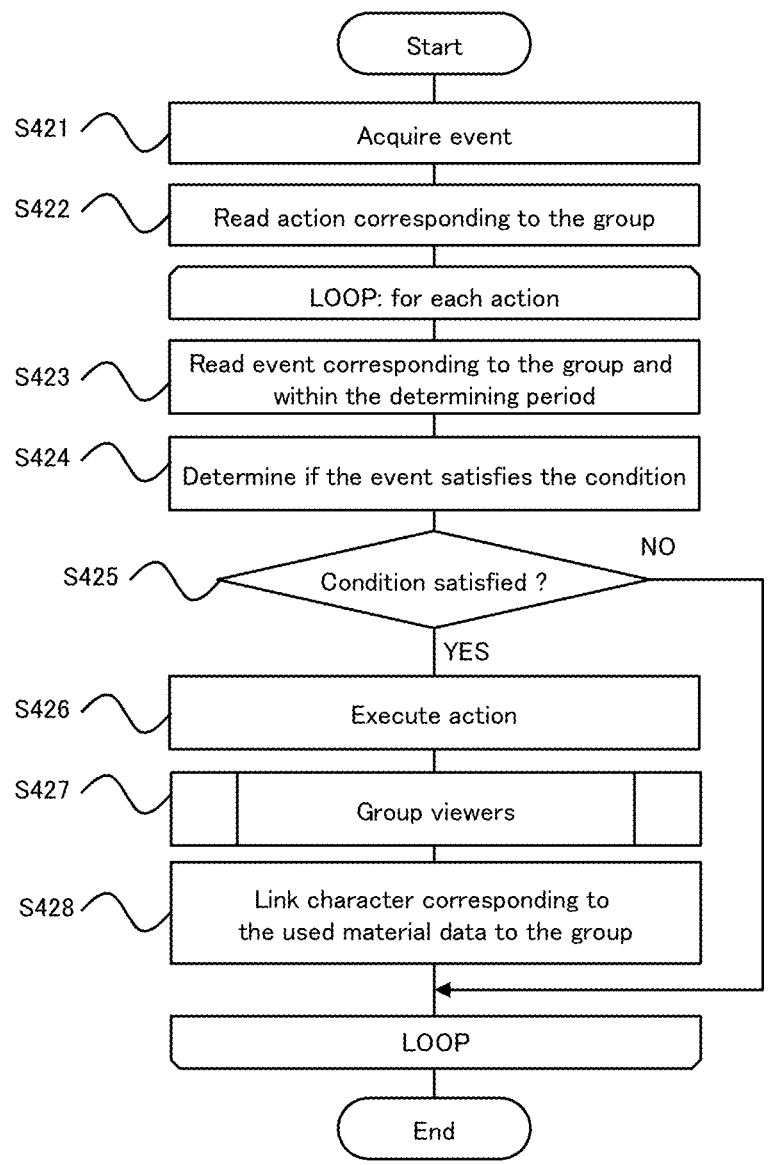
FIG. 64 is a figure illustrating a flow of an action execution process.

The action processing unit 313 performs the action execution processing shown in FIG. 64 for each group (S406).

The event acquiring unit 312 acquires an event periodically (S421). For example, by invoking the API provided by the streaming server 2, the event acquiring unit 312 can obtain a comment submitted to the distribution video. The event acquiring unit 312 can acquire that a predetermined time has elapsed using a timer function.

The action processing unit 313 reads event information of the date and time corresponding to the group and within the determining period from the event storage unit 334 (S423) for each of the actions corresponding to the group, and determines whether or not the event content of the read event information satisfies the condition of the action information (S424). If the action information includes information other than event information and group information that can be obtained try accessing the information managed by the distributor device 3 or other information processing devices, the information may be obtained to determine whether or not the conditions are met. When the event satisfies the condition (S425:YES), the action processing unit 313 executes the action included in the action information (S426). Here, the action processing unit 313 may stop the previously executed action, execute a new action in parallel with the previously executed action, or specify this behavior in the new action. The group setting unit 314, upon execution of the action, divides viewers into groups (427).

Figure 65:
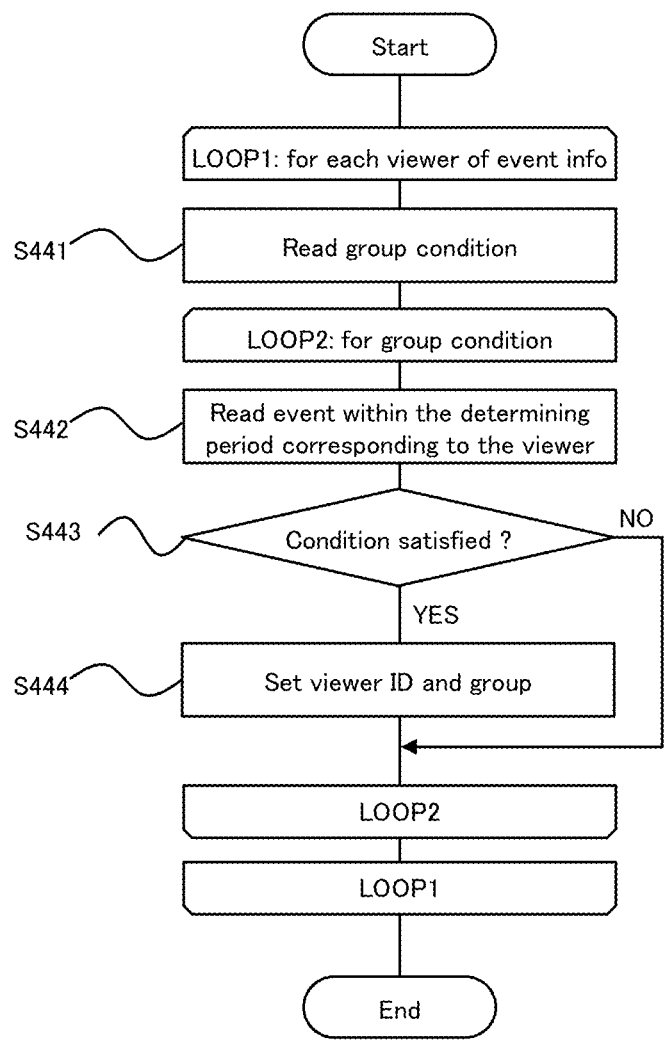
FIG. 65 is a figure illustrating a flow of a grouping process of a viewer according to the present embodiment.

FIG. 65 is a figure illustrating a flow of a grouping process of a viewer according to a seventh embodiment. The group setting unit 314 performs the following processing for each viewer related to event information. The group setting unit 314 reads the group condition information from the group condition storage unit 335 (S441) and registers the group information in the group storage unit 336, which sets the viewer ID representing the viewer and the group condition information group, with respect to each group condition information read from the event information corresponding to the viewer and entering the determining period (S442), when the read event information satisfies the condition of the group condition information (S443:YES). In this way, viewers are grouped.

Returning to FIG. 64, the action processing unit 313 acquires a character corresponding to the material data used when executing the action from the material library 331 and links the acquired character to the group (S428). The above-described processing is performed for each action, and the video distributing unit 311 returns to FIG. 63. When characters associated with each group matches (S407:YES), the video distributing unit 311 cancels the segmentation of the screen (S408). That is after that, the distribution processing unit 311 and the action processing unit 313 execute the creation of the moving pixel and the operation of the asset data based on the asset data for one screen (or a part of the integrated screen). Meanwhile, when the characters on each screen do not match (S407:NO), the screen is divided (S409).

If the action information action does not terminate the distribution video (S410:NO), the process from step S402 is repeated.

As described above, the video distribution system according to the seventh embodiment can distribute the distribution video to the viewer terminal 1 via the streaming server 2, and change the distribution video during playback according to various events during playback of the distribution video. Accordingly, it is possible to add various developments to the distribution video in response to the response of the viewer while using the recorded video, and it is possible to distribute the video without compromising the live feeling of the video by the method of distributing the video in a streaming format.

In the video distribution system according to the seventh embodiment, the screen can be divided (the display of the delivered video is divided) and the expansion of the video on the screen can be changed according to the response from only the viewer belonging to the corresponding group for each screen. Different groups of screens change the development of the video, allowing the story to be surprised.

Figure 66:
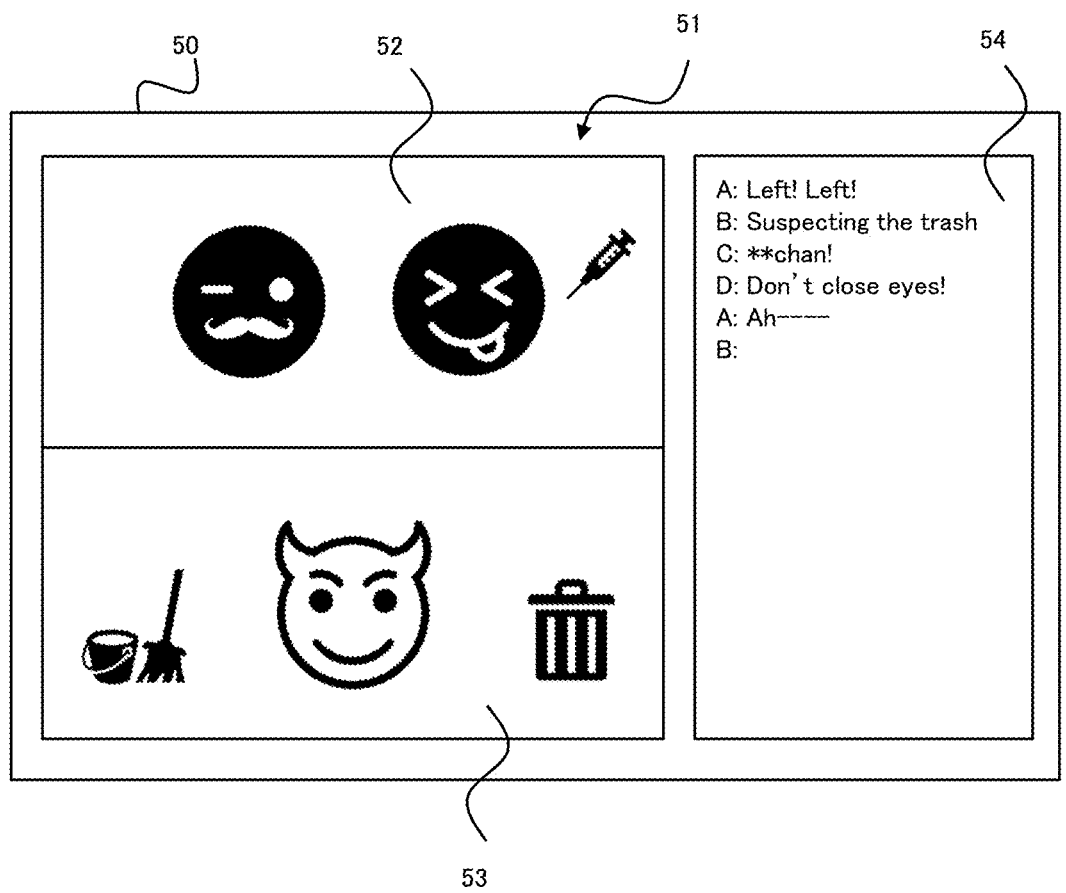
FIG. 66 is a figure illustrating an example of a screen 50 for displaying a distribution video.

FIG. 66 is a figure illustrating an example of a screen 50 for displaying a distribution video In the example of screen 50, the delivery video 51 is divided into two partial videos 52 and 53. A comment is submitted by the viewer as shown in the comment display field 54. For each group, the viewer is associated with each screen and, in response to the viewer's comments, the action is applied to the material data pertaining to the video data displayed on the screen corresponding to the group to which the viewer belongs. This will change the development of the video independently of the partial video 52 and the partial video 53 according to the comments from the viewers belonging to each corresponding group. A separate parallel deployment of the partial video 52 and the partial video 53 can be displayed to provide a viewing experience for the new distribution video. As described above, when the characters appearing in the partial video 52 and the partial video 53 overlap, the division of the distribution video 51 is resolved and is displayed as a single video. In other words, if there is an overlap of independently developed stories, the screen will be integrated, and if it is independent, the screen will be divided. In this way, the interplay of multiple characters can be changed according to the response from the viewer, thereby enabling a less predictable story development to be performed.

Although the seventh embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in the present embodiment, it is assumed that the video transmitted from the distributor device 3 is distributed to the viewer terminal 1 via the streaming server 2, but it is also possible to distribute the video directly from the distributor device 3 to each viewer terminal 1.

In the present embodiment, even while the video is being played, if the comment satisfies the condition, it is set to transition to the next part video data (step S426 of FIG. 64). However, the current action may be executed until the end of the action, and then the next action may be executed.

In the present exemplary embodiment, viewers are grouped according to each action executed. However, depending on the material data and the content of the action, it is possible to decide whether or not to group the viewers.

In the present exemplary embodiment, the video distributing unit 311 performs a screen division by combining a plurality of videos into simultaneous displays. For example, the viewer terminal 1 may divide the screen and transmit a plurality of videos from the video distributing unit 311 to the viewer terminal 1 to realize a screen division.

EXPLANATION OF SYMBOLS

1 Viewer Terminal
2 Streaming Server
3 Distributor Device
311 Video Distributing Unit
312 Comment Acquiring Unit
313 switch determining Unit
331 Video Library
332 Scenario Storage Unit
333 Condition Storage Unit
334 Comment Storage Unit Second Embodiment 1 Viewer Terminal
2 Streaming Server
3 Distributor Device
311 Video Distributing Unit
312 Event Acquiring Unit
313 Action Processing Unit
331 Material Library
333 Action Storage Unit
334 Event Storage Unit Third Embodiment 1 Viewer Terminal
2 Streaming Server
3 Distributor Device
311 Music Distribution Unit
312 Comment Acquiring Unit
313 Switch Determining unit
331 Video Library
332 Scenario Storage
333 Condition Storage
334 Comment Storage Fourth Embodiment 1 Viewer Terminal
2 Streaming Server
3 Distributor Device
311 Video Distributing Unit
312 Comment Acquiring Unit
313 Switch Determining Unit
331 Video Library
332 Scenario Storage Unit
333 Condition Storage Unit
334 Comment Storage Unit
335 Viewer Information Storage Unit 5th Embodiment 1 Viewer Terminal
2 Streaming Server
3 Distributor Device
311 Video Distributing Unit
312 Event Acquiring Unit
313 Action Processing Unit
331 Material Library
333 Action Storage Unit
334 Event Storage Unit Sixth Embodiment 1 Viewer Terminal
2 Streaming Server
3 Distributor Device
311 Video Distributing Unit
312 Event Acquiring Unit
313 Action Processing Unit
314 Group Setting Unit
315 Aggregation Output Unit
316 Reward Processing Unit
331 Material Library
333 Action Storage Unit
334 Event Storage Unit
335 Group Condition Storage Unit
356 Group Storage Unit 7th Embodiment 1 Viewer Terminal
2 Steaming Server
3 Distributor Device
311 Video Distributing Unit
312 Event Acquiring Unit
313 Action Processing Unit
314 Group Setting Unit
315 Aggregation Output Unit
316 Reward Processing Unit
331 Material Library
333 Action Storage Unit
334 Event Storage Unit
335 Group Condition Storage Unit
336 Group Storage Unit

The invention claimed is:

1. A video distribution system comprising:
a memory that stores a plurality of video data; and
a CPU connected to the memory and that:
distributes the video data;
acquires, from viewer terminals of viewers, reaction information indicating reactions of the viewers at least during a playback of a first video data; and
determines a second video data to be distributed subsequent to distribution of the first video data according to the reaction information,
wherein:
the memory further stores scenario data including information representing next video data to be distributed for each of the video data;
the memory further stores information representing a condition for the reaction information and next video data to be distributed;
when the condition which satisfies the reaction information is present, the CPU specifies the next video data to be distributed corresponding to the condition satisfying the reaction information and determines the specified next video data to be distributed as the second video data; and
when the condition which satisfies the reaction information is not present, the CPU specifies the next video data to be distributed from the scenario data and determines the specified next video data as the second video data.

2. The video distribution system according to claim 1, wherein the CPU:
transmits the first video data to a video distribution server that distributes the video data to each of the viewer terminals of the viewers;
acquires comments as the reaction information from the video distribution server, wherein the comments are input from the viewers at the viewer terminals and transmitted from the viewer terminals to the video distribution server; and determines the second video data according to the number of predetermined words included in the comment or the number of viewers who submitted the comment including the predetermined words.

3. A music distribution system comprising:

a memory that stores multiple music data;

a CPU connected to the memory and that:

distributes the music data;

acquires, from viewer terminals of viewers, reaction information indicating a reaction of the viewers during the reproduction of at least a first music data; and determines a second music data to be distributed subsequent to distribution of the first music data in response to the reaction information, wherein:

the memory further stores scenario data including information representing next music data to be distributed for each of the music data;

the memory further stores information representing a condition for the reaction information and the next music data to be distributed;

when the condition which satisfies the reaction information is present, the CPU specifies the next music data to be distributed corresponding to the condition satisfying the reaction information and determines the specified next music data as the second music data; and when the condition which satisfies the reaction information is not present, the CPU specifies the next music data to be distributed from the scenario data and determines the specified next music data as the second music data.

4. The music distribution system according to claim 3, wherein the CPU:

transmits the first music data to a distribution server that distributes the music data to the viewer terminal of the viewer;

acquires comments as the reaction information from the distribution server, wherein the comments are input from the viewers at the viewer terminals and transmitted from the viewer terminals to the video distribution server; and determines the second music data according to the number of predetermined word included in the comments.

5. A video distribution system comprising:

a memory that stores multiple video data;

a CPU connected to the memory and that:

distributes the video data;

acquires reaction information indicating a reaction from one or more viewers during the playback of at least the first video data based on a priority; and determines a second video data to be distributed subsequent to distribution of a first video data in accordance with the reaction information, wherein:

the memory further stores scenario data including information representing next video data to be distributed for each of the video data;

the memory further stores information representing a condition for the reaction information and next video data to be distributed;

when the condition which satisfies the reaction information is present, the CPU specifies the next video data to be distributed corresponding to the condition satisfying the reaction information and determines the specified next video data to be distributed as the second video data; and when the condition which satisfies the reaction information is not present, the CPU specifies the next video data to be distributed from the scenario data and determines the specified next video data as the second video data.

6. The video distribution system according to claim 5, wherein the CPU:

transmits the first video data to a video distribution server that distributes the video data to each of the viewer's viewer terminal, and acquires comment as the reaction information from the video distribution server wherein the comments are input from the viewers at the viewer terminals and transmitted from the viewer terminals to the video distribution server, and determines the second video data in response to the comment.

7. The video distribution system according to claim 5, wherein the priority is based on the amount which is charged to the viewer.

8. The video distribution system according to claim 5, wherein the priority is based on status information of the viewer.

* * * * *